(12) United States Patent
Yue et al.

(10) Patent No.: US 9,094,145 B2
(45) Date of Patent: Jul. 28, 2015

(54) COORDINATED MULTIPOINT TRANSMISSION AND RECEPTION (COMP)

(71) Applicant: NEC Laboratories America, Inc., Princeton, NJ (US)

(72) Inventors: Guosen Yue, Princeton, NJ (US); Narayan Prasad, Princeton, NJ (US); Meilong Jiang, Princeton, NJ (US); Sampath Rangarajan, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 22 days.

(21) Appl. No.: 13/948,409

(22) Filed: Jul. 23, 2013

(65) Prior Publication Data

US 2014/0044061 A1 Feb. 13, 2014

Related U.S. Application Data

(60) Provisional application No. 61/675,541, filed on Jul. 25, 2012, provisional application No. 61/706,301, filed on Sep. 27, 2012, provisional application No. 61/678,882, filed on Aug. 2, 2012, provisional application No. 61/683,263, filed on Aug. 15, 2012, provisional application No. 61/706,752, filed on Sep. 27, 2012.

(51) Int. Cl.
*H04W 72/04* (2009.01)
*H04J 11/00* (2006.01)
(Continued)

(52) U.S. Cl.
CPC .......... *H04J 11/0053* (2013.01); *H04B 7/024* (2013.01); *H04B 7/0456* (2013.01);
(Continued)

(58) Field of Classification Search
USPC ......... 370/329, 432, 433, 437, 458, 462, 478; 455/464, 24, 517, 69, 126
See application file for complete search history.

(56) References Cited

U.S. PATENT DOCUMENTS

| | | | |
|---|---|---|---|
| 2011/0086659 A1 | 4/2011 | Yoon et al. | |
| 2011/0170435 A1 | 7/2011 | Kim et al. | |

(Continued)

FOREIGN PATENT DOCUMENTS

| | | |
|---|---|---|
| JP | 2015-503881 A | 2/2015 |
| WO | 2011-087272 A2 | 7/2011 |

(Continued)

OTHER PUBLICATIONS

NTT DoCoMo, "Investigation of specification impact for Rel. 11 CoMP" 3GPP TSG RAN WG1 R1-112600 Meeting#66, Athens, Greece, Aug. 2011.

(Continued)

*Primary Examiner* — Benjamin H Elliott, IV
(74) *Attorney, Agent, or Firm* — Akitaka Kimura; Joseph Kolodka

(57) ABSTRACT

A communications method implemented in a transmission point (TP) used in a coordinated multipoint transmission and reception (CoMP) system is disclosed. The communications method comprises transmitting, to a user equipment (UE), attributers for up to four indicators indicating at least physical downlink shared channel (PDSCH) resource element (RE) mapping, and transmitting, to the UE, one of the four indicators, each of which is conveyed in 2 bits, wherein the four indicators comprises '00', '01', '10', and '11' corresponding to a first set, a second set, a third set, and a fourth set of parameters, respectively. Other methods, apparatuses, and systems are also disclosed.

15 Claims, 10 Drawing Sheets

(51) Int. Cl.

| | | |
|---|---|---|
| *H04L 5/00* | (2006.01) | |
| *H04L 1/00* | (2006.01) | |
| *H04B 7/04* | (2006.01) | |
| *H04W 24/10* | (2009.01) | |
| *H04B 7/02* | (2006.01) | |
| *H04B 7/06* | (2006.01) | |

(52) U.S. Cl.
CPC ............ *H04B 7/063* (2013.01); *H04B 7/0632* (2013.01); *H04L 1/0026* (2013.01); *H04L 1/0077* (2013.01); *H04L 5/005* (2013.01); *H04L 5/0035* (2013.01); *H04L 5/0048* (2013.01); *H04L 5/0057* (2013.01); *H04W 24/10* (2013.01); *H04W 72/042* (2013.01); *H04L 1/0068* (2013.01); *H04L 5/0044* (2013.01); *H04L 5/0053* (2013.01); *H04L 5/0073* (2013.01); *H04L 5/0091* (2013.01)
USPC ........................................................ 370/392

(56) References Cited

U.S. PATENT DOCUMENTS

| | | | |
|---|---|---|---|
| 2012/0113816 A1 | 5/2012 | Bhattad et al. | |
| 2012/0134273 A1 | 5/2012 | Bhattad et al. | |
| 2012/0176884 A1 | 7/2012 | Zhang et al. | |
| 2012/0176939 A1 | 7/2012 | Qu et al. | |
| 2013/0322350 A1* | 12/2013 | Gaur et al. | 370/329 |
| 2014/0044061 A1* | 2/2014 | Yue et al. | 370/329 |
| 2014/0064135 A1* | 3/2014 | Chen | 370/253 |

FOREIGN PATENT DOCUMENTS

| | | |
|---|---|---|
| WO | 2012/087000 A2 | 6/2012 |
| WO | 2012/094608 A2 | 7/2012 |

OTHER PUBLICATIONS

NEC Group, "PDSCH mapping issues in CoMP" 3GPP TSG RAN WG1 Meeting#69, R1-122603, Prague, Czech, May 2012.
3GPP, "Final Report of 3GPP TSG RAN WG1 #66bis v1.1.0," 3GPP TSG RAN WG1 R1-114352, Nov. 14, 2011.
3GPP, "Draft Report of 3GPP TSG RAN WG1 #67 v0.1.0," Feb. 6, 2012.
3GPP, "Evolved Universal Terrestrial Radio Access (E-UTRA); Physical channels and modulation. TS 36.211 V10.1.0," Mar. 2011.
NTT DoCoMo, "Investigation of specification impact for Rel.11 CoMP" 3GPP TSG RAN WG1 R1-112600 Meeting#66, Athens, Greece, Aug. 2011.
3GPP, "Evolved Universal Terrestrial Radio Access (E-UTRA); Physical layer procedures. TS 36.213 V10.1.0," Mar. 2011.
TR36.819, "Coordinated multi-point operation for LTE physical layer aspects", 3GPP, v11.1.0, Dec. 2011.
RP-111365 "Coordinated Multi-Point Operation for LTE", 3GPP TSG RAN-P #53, Sep. 15, 2011.
NEC Group, "PDSCH mapping issues in CoMP" 3GPP TSG RAN WG1 Meeting#69, R1-122603, Prague, Czech, May 2012.
Ericsson, "Control Signaling in Support of CoMP" 3GPP TSG RAN WG1 R1-122843 Meeting#69, Prague, Czech, May 2012.
[0014] [10] Intel, "Views on CRS/PDSCH RE Collision in Joint Transmission", 3GPP TSG RAN WG1 R1-122655 Meeting#69, Prague, Czech, May 2012.
3GPP TSG RAN WG1 Meeting #69, R1-122039, On CSI feedback modes for CoMP, CATT, May 21-25, 2012.
3GPP TSG-RAN WG1 #69, R1-122836, Ericsson, ST-Ericsson, RI and PMI sharing between multiple CSI processes, May 21-25, 2012.
3GPP TSG RAN WG1 Meeting #68, R1-120037, Signaling requirements for PDSCH mapping for OL CoMP, Huawei, HiSilicon, Feb. 6-10, 2012.
Renesas Mobile Europe Ltd., On the feedback options for multipomt transmission, 3GPP TSG-RAN WG1 Meeting #67 R1-114426, 3GPP, Nov. 21, 2011, pp. 1-5, URL http://www.3gpp.org/ftp/tsg_ran/WG1_RL1/TSGR1_67/Docs/RI-114416.zip

* cited by examiner

COORDINATED MULTIPOINT TRANSMISSION AND RECEPTION (COMP)

This application claims the benefit of U.S. Provisional Application No. 61/675,541, entitled "Coordinated Multi-Point Transmission and Reception in Heterogenous Networks: Approximation Algorithms and System Evaluation," filed on Jul. 25, 2012, U.S. Provisional Application No. 61/706,301, entitled "Resource Allocation Schemes for Heterogeneous Networks," filed on Sep. 27, 2012, U.S. Provisional Application No. 61/678,882, entitled "CSI Feedback and PDSCH Mapping for Coordinated Multipoint Transmission and Reception," filed on Aug. 2, 2012, U.S. Provisional Application No. 61/683,263, entitled "PDSCH Mapping in Coordinated Multipoint Transmission and Reception (CoMP)," filed on Aug. 15, 2012, and U.S. Provisional Application No. 61/706,752, entitled "PDSCH mapping for Coordinated Multipoint Transmission and Reception (CoMP)," filed on Sep. 27, 2012, the contents of all of which are incorporated herein by reference.

BACKGROUND OF THE INVENTION

The present invention relates to coordinated multiple point transmission and reception (CoMP) and more particularly to channel state information (CSI) feedback, physical downlink shared channel (PDSCH) mapping, resource allocation, and some other features for CoMP.

In this document, we investigate the channel state information (CSI) feedback and the resource mapping for cooperative communication or specifically, coordinated multipoint transmission and reception (CoMP) which is now in discussion for release-11 3GPP standardization. In particular, we first present a CSI feedback framework with better tradeoff between the performance and the feedback overhead. It has been agreed that three CoMP transmission schemes, namely, joint transmission (JT) or joint processing (JP), coordinated scheduling or beamforming (CS/CB), and dynamic point selection (DPS), are supported in the new 3GPP cellular system. To support all possible CoMP transmission schemes, we proposed the CSI feedback schemes based on the size of measurement set which is configured by the network and signalled to the user terminal or user equipment (UE). Then we provide the resource mapping solutions for the problems related to different cell-specific reference signal (CRS) in different cells and consequently the collision between the CRS and the data sent on the physical downlink shared channel (PDSCH). We also address the PDSCH mapping to solve the mismatch of the PDSCH starting points due to the different size of orthogonal frequency division multiplexing (OFDM) symbols allocated for the physical downlink control channel (PDCCH) transmission.

REFERENCES

[1] 3GPP, "Final Report of 3GPP TSG RAN WG1 #66bis v1.1.0," 3GPP TSG RAN WG1 R1-114352.
[2] 3GPP, "Draft Report of 3GPP TSG RAN WG1 #67 v0.1.0".
[3] 3GPP, "Evolved Universal Terrestrial Radio Access (E-UTRA); Physical channels and modulation. TS 36.211V10.1.0".
[4] NTT DoCoMo, "Investigation of specification impact for Rel.11 CoMP" 3GPP TSG RAN WG1 R1-112600 Meeting#66, Athens, Greece, August 2011.
[5] 3GPP, "Evolved Universal Terrestrial Radio Access (E-UTRA); Physical layer procedures. TS 36.211V10.1.0".
[6] TR36.819, "Coordinated multi-point operation for LTE physical layer aspects", 3GPP, v11.1.0.
[7] RP-111365 "Coordinated Multi-Point Operation for LTE", 3GPP TSG RAN-P #53.
[8] NEC Group, "PDSCH mapping issues in CoMP" 3GPP TSG RAN WG1 Meeting#69, R1-122603, Prague, Czech, May 2012.
[9] Ericsson, "Control Signaling in Support of CoMP" 3GPP TSG RAN WG1 R1-122843 Meeting#69, Prague, Czech, May 2012.
[10] Intel, "Views on CRS/PDSCH RE Collision in Joint Transmission", 3GPP TSG RAN WG1 R1-122655 Meeting#69, Prague, Czech, May 2012.

BRIEF SUMMARY OF THE INVENTION

An objective of the present invention is to provide efficient CSI feedback, PDSCH RE mapping, and resource allocation for CoMP.

An aspect of the present invention includes a communications method implemented in a transmission point (TP) used in a coordinated multipoint transmission and reception (CoMP) system. The communications method includes transmitting, to a user equipment (UE), an indication of a channel state information (CSI) process in a CSI pattern comprising a set of CSI processes, wherein the UE is configured with the CSI process for at least one of the other CSI processes in the CSI pattern, and wherein a reported rank indication (RI) for the CSI process is the same as an RI for said at least one of the other CSI processes.

Another aspect of the present invention includes a communications method implemented in a user equipment (UE) used in a coordinated multipoint transmission and reception (CoMP) system. The communications method includes receiving, from a transmission point (TP), an indication of a channel state information (CSI) process in a CSI pattern comprising a set of CSI processes, wherein the UE is configured with the CSI process for at least one of the other CSI processes in the CSI pattern, and wherein a reported rank indication (RI) for the CSI process is the same as an RI for said at least one of the other CSI processes.

Still another aspect of the present invention includes a communications method implemented in a coordinated multipoint transmission and reception (CoMP) system. The communications method includes indicating, to a user equipment (UE), a channel state information (CSI) process in a CSI pattern comprising a set of CSI processes, configuring the UE with the CSI process for at least one of the other CSI processes in the CSI pattern, and reporting, from the UE, a rank indication (RI) for the CSI process that is the same as an RI for said at least one of the other CSI processes.

Still another aspect of the present invention includes a transmission point (TP) used in a coordinated multipoint transmission and reception (CoMP) system. The TP includes transmitter to transmit, to a user equipment (UE), an indication of a channel state information (CSI) process in a CSI pattern comprising a set of CSI processes, wherein the UE is configured with the CSI process for at least one of the other CSI processes in the CSI pattern, and wherein a reported rank indication (RI) for the CSI process is the same as an RI for said at least one of the other CSI processes.

Still another aspect of the present invention includes a user equipment (UE) used in a coordinated multipoint transmission and reception (CoMP) system. The user equipment includes a receiver to receive, from a transmission point (TP), an indication of a channel state information (CSI) process in a CSI pattern comprising a set of CSI processes, wherein the UE is configured with the CSI process for at least one of the other CSI processes in the CSI pattern, and wherein a reported rank indication (RI) for the CSI process is the same as an RI for said at least one of the other CSI processes.

Still another aspect of the present invention includes a coordinated multipoint transmission and reception (CoMP) system including a user equipment (UE), and a transmission point (TP) to transmit, to the UE, an indication of a channel state information (CSI) process in a CSI pattern comprising a set of CSI processes, wherein the UE is configured with the CSI process for at least one of the other CSI processes in the CSI pattern, and wherein a reported rank indication (RI) for the CSI process is the same as an RI for said at least one of the other CSI processes.

Still another aspect of the present invention includes a communications method implemented in a transmission point (TP) used in a coordinated multipoint transmission and reception (CoMP) system. The communications method comprises transmitting, to a user equipment (UE), attributers for up to four indicators indicating at least physical downlink shared channel (PDSCH) resource element (RE) mapping, and transmitting, to the UE, one of the four indicators, each of which is conveyed in 2 bits, wherein the four indicators comprises '00', '01', '10', and '11' corresponding to a first set, a second set, a third set, and a fourth set of parameters, respectively.

Still another aspect of the present invention includes a communications method implemented in a user equipment (UE) used in a coordinated multipoint transmission and reception (CoMP) system. The communications method comprises receiving, from a transmission point (TP), attributers for up to four indicators indicating at least physical downlink shared channel (PDSCH) resource element (RE) mapping, and receiving, from the TP, one of the four indicators, each of which is conveyed in 2 bits, wherein the four indicators comprises '00', '01', '10', and '11' corresponding to a first set, a second set, a third set, and a fourth set of parameters, respectively.

Still another aspect of the present invention includes a communications method implemented in a coordinated multipoint transmission and reception (CoMP) system. The communications method comprises transmitting, from a transmission point (TP) to a user equipment (UE), attributers for up to four indicators indicating at least physical downlink shared channel (PDSCH) resource element (RE) mapping, and transmitting, from the TP to the UE, one of the four indicators, each of which is conveyed in 2 bits, wherein the four indicators comprises '00', '01', '10', and '11' corresponding to a first set, a second set, a third set, and a fourth set of parameters, respectively.

Still another aspect of the present invention includes a transmission point (TP) used in a coordinated multipoint transmission and reception (CoMP) system. The transmission point comprises a first transmitter to transmit, to a user equipment (UE), attributers for up to four indicators indicating at least physical downlink shared channel (PDSCH) resource element (RE) mapping, and a second transmitter to transmit, to the UE, one of the four indicators, each of which is conveyed in 2 bits, wherein the four indicators comprises '00', '01', '10', and '11' corresponding to a first set, a second set, a third set, and a fourth set of parameters, respectively.

Still another aspect of the present invention includes a user equipment (UE) used in a coordinated multipoint transmission and reception (CoMP) system. The user equipment comprises a first receiver to receive, from a transmission point (TP), attributers for up to four indicators indicating at least physical downlink shared channel (PDSCH) resource element (RE) mapping, and a second receiver to receive, from the TP, one of the four indicators, each of which is conveyed in 2 bits, wherein the four indicators comprises '00', '01', '10', and '11' corresponding to a first set, a second set, a third set, and a fourth set of parameters, respectively.

Still another aspect of the present invention includes a coordinated multipoint transmission and reception (CoMP) system comprising a user equipment (UE), and a transmission point (TP) to transmit, to a user equipment (UE), attributers for up to four indicators indicating at least physical downlink shared channel (PDSCH) resource element (RE) mapping, wherein the UE receives, from the TP, one of the four indicators, each of which is conveyed in 2 bits, and wherein the four indicators comprises '00', '01', '10', and '11' corresponding to a first set, a second set, a third set, and a fourth set of parameters, respectively.

DETAILED DESCRIPTION

1 System Description

Figure 1:
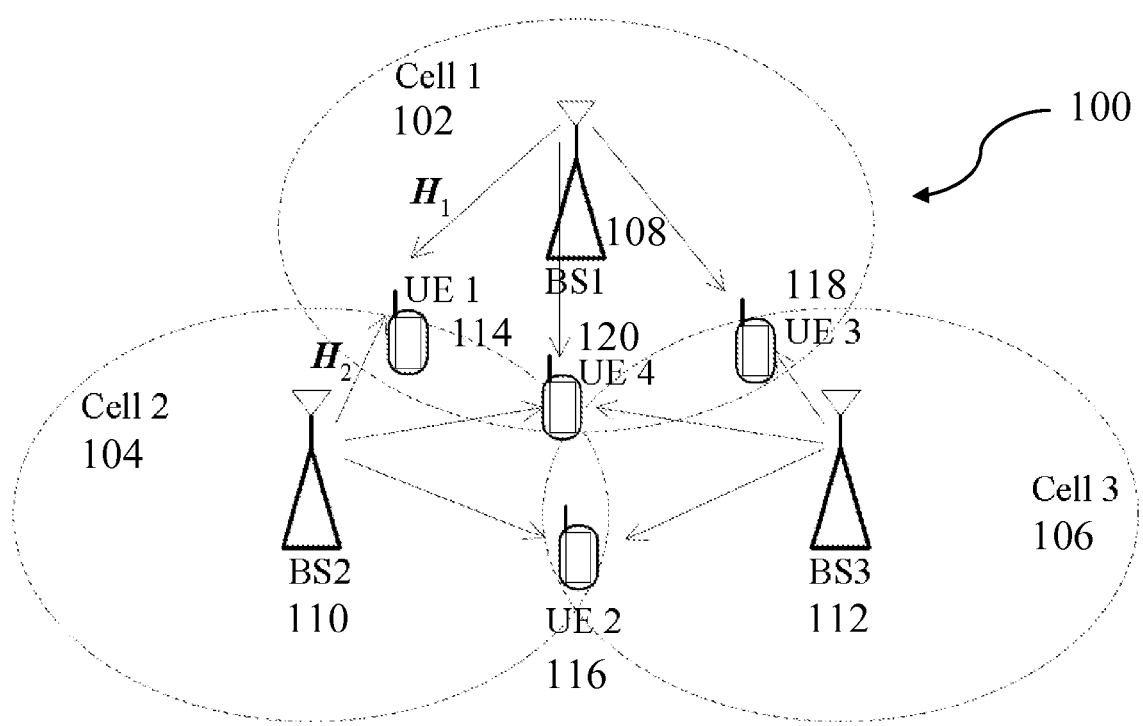
FIG. 1 depicts a homogenous CoMP network with M=3 macrocell BSs.
Figure 2:
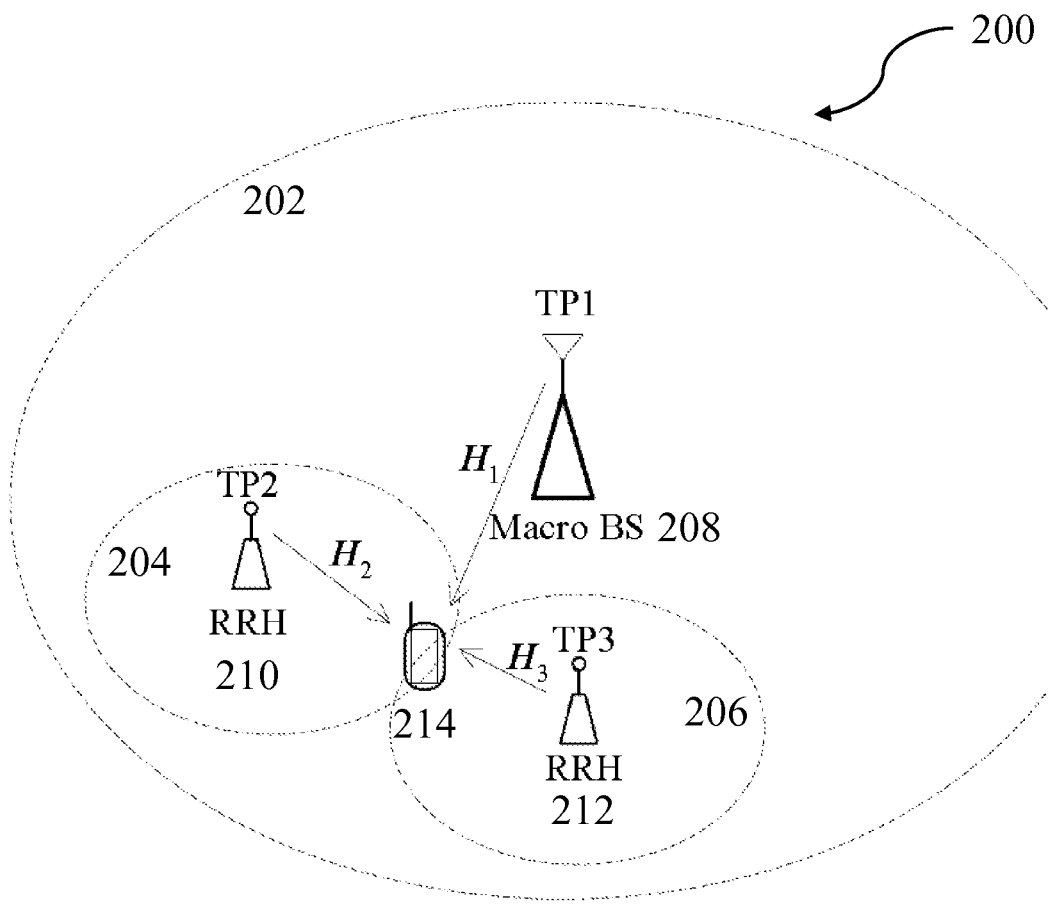
FIG. 2 depicts a heterogenous CoMP network with M=3 macrocell BSs.

We consider a cluster which consists of M transmission points (TPs). Each TP can be either a macro-cell base station (BS) or a low power remote radio head (RRH). Therefore, the CoMP network could be a homogeneous network consisting of all macro-cell BSs, i.e., homogeneous network, as shown in FIG. 1 or a heterogeneous network (HetNet) which is mixture of macro-cell BSs and lower power RRHs as shown in FIG. 2. The received signal for the target user equipment (UE) at a resource element (RE) over which data is transmitted to that UE, is given by $$y = \sum_{i=1}^{M} \sqrt{\frac{\rho_i}{r_i}} H_i W_i s_i + \tilde{H}\tilde{W}\tilde{s} + n. \quad (1)$$

where $H_i$, $i=1, \ldots, M$ denotes the channel seen by the UE from the ith transmission point in its CoMP set, where the composition of the latter set is decided in a semi-static manner by the network controller based on long-term signal-to-interference-plus-noise (SINR) ratio measurements and is held fixed across many sub-frames; $\rho_i$ is the transmission power or energy per resource element (EPRE) used by the ith transmission point; $W_i$ and $s_i$ are the precoding matrix (with $r_i$ columns) and the data symbol vector transmitted by the ith transmission point; $\tilde{H}$, $\tilde{W}$, and $\tilde{s}$ are the composite channel matrix, precoding matrix, and data symbol vector transmitted by all the other transmission points outside the UE's CoMP set. Then, if the UE receives a data stream sent only along the jth layer of the mth transmission point, received SINR corresponding to that stream at the UE is given by $$\gamma_{mj} = \frac{\frac{\rho_m}{r_m} F_{mj}^\dagger H_m W_{mj} W_{mj}^\dagger H_m^\dagger F_{mj}}{F_{mj}^\dagger \left( \frac{\rho_m}{r_m} \sum_{j',j' \neq j} H_m W_{mj'} W_{mj'}^\dagger H_m^\dagger + \sum_{i \neq m} \frac{\rho_i}{r_i} H_i W_i W_i^\dagger H_i^\dagger \right) F_{mj} + F_{mj}^\dagger R F_{mj}}, \quad (2)$$

where $F_{mj}$ is the receive filter to retrieve signal $s_{mj}$ from the jth layer of the mth transmission point and R is the covariance of the interference outside CoMP set plus noise, i.e., $R = \tilde{H}\tilde{W}\tilde{W}^\dagger \tilde{H}^\dagger + I$. The corresponding information rate is then $$\eta_{mj} = \log(1 + \gamma_{mj}) \quad (3)$$

Without loss of generality, we assume the transmission point 1 is the serving cell that is supposed to send the data symbols to the UE for conventional single cell transmission (without CoMP) as well as the control signaling and is the TP to which the UE reports its CSI feedback on the uplink channel. Therefore without CoMP, the SINR is $\gamma_{1j}$, $j \in S_1$, where $S_1$ is the set of layers intended for this UE. The total rate for the UE of interest is then given by $\eta_1 = \sum_{j \in S_1} \eta_{1j}$. We note that all CSI can be passed to the network controller in a CoMP network which then does the scheduling.

For CS/CB CoMP transmission scheme, the data is still transmitted from the serving cell (or equivalently the anchor cell where the control signalling is received from). Although the SINR is still $\gamma_{1j}$ as given in (2) (with m=1), transmit precoding matrices $W_i$, $i=1, \ldots, M$ are jointly optimized so that the interference from the intra-CoMP set is reduced.

For DPS scheme, based on the CSI feedback from all UEs, the network controller selects the transmission points for each UE so that the weighted sum rate of the system is maximized. Assume that m* is the transmission point selected by the network controller for the UE. The SINR corresponding to the $j^{th}$ layer is then $\gamma_{m*j}$ and the transmission rate is then $\eta_{m*j}$.

On the other hand in the JT scheme, the same data symbols are transmitted through multiple, say $M_{JT}$ transmission points in the CoMP set. Denote the set of transmission points for JT as $\mathcal{V}$, where $\mathcal{V} \subseteq \{1, \ldots, M\}$ and let its complement set be denoted by $\bar{\mathcal{V}}$. For convenience suppose that all TPs in $\mathcal{V}$ serve only the UE of interest over the resource block. Then, we can rewrite the signal model in (1) as $$y = \sum_{i \in \mathcal{V}} \sqrt{\frac{\rho_i}{r_i}} H_i W_i e^{j\varphi_i} s + \sum_{i \in \bar{\mathcal{V}}} \sqrt{\frac{\rho_i}{r_i}} H_i W_i s_i + \tilde{H}\tilde{W}\tilde{s} + n, \quad (4)$$

where $\phi_i$ is the coherent phase adjustment to improve the SINR for coherent JT. We assume the serving cell BS with index 1 is always present in $\mathcal{V}$ for the JT. We then fix $\phi_1 = 0$. In non-coherent JT, we do not need the feedback on $\phi_i$, i.e., $\phi_i = 0 \forall i \in \mathcal{V}$ is applied. We can see for JT, a common transmission rank r is employed for all $W_i$, $i \in \mathcal{V}$. Define $$H_{\mathcal{V}} \triangleq \sum_{i \in \mathcal{V}} \sqrt{\frac{\rho_i}{r_i}} H_i W_i e^{j\varphi_i}.$$

The SINR for the $j^{th}$ layer is then given by $$\gamma_{\mathcal{V},j} = \frac{F_{\mathcal{V},j}^\dagger H_{\mathcal{V},j} H_{\mathcal{V},j}^\dagger F_{\mathcal{V},j}}{F_{\mathcal{V},j}^\dagger \left( \sum_{j',j' \neq j} H_{\mathcal{V},j'} H_{\mathcal{V},j'}^\dagger + \sum_{i \in \bar{\mathcal{V}}} \frac{\rho_i}{r_i} H_i W_i W_i^\dagger H_i^\dagger \right) F_{\mathcal{V},j} + F_{\mathcal{V},j}^\dagger R F_{\mathcal{V},j}}, \quad (5)$$

where $F_{\mathcal{V}}$ denotes the receiver filter on the signal in (4) for CoMP JT transmissions. The corresponding rate for the CoMP JT transmission is then $\eta_{\mathcal{V}} = \sum_{j=1}^{r} \log(1 + \gamma_{\mathcal{V},j})$.

2 CSI Feedback for CoMP

We now consider the CSI feedback for CoMP schemes. To support all agreed CoMP transmission schemes including JT, CS/CB, and DPS, a general CSI feedback framework has been discussed during the last several 3GPP-RAN1 meetings. From at-least one port of each transmission point in the CoMP set, a reference signal (RS) is sent in one or more resource elements (whose positions are conveyed by the network in advance to the UE) in order to let UE estimate the channel from that port of that TP. Let $H_i$ be the channel matrix estimated by the UE, corresponding to all such ports of the ith TP. In release-10 and earlier legacy systems, an implicit CSI feedback is adopted such that a CSI feedback for a set of contiguous resource blocks (RBs) (which map to a time-frequency resource comprising of a set of consecutive sub-carriers and OFDM symbols) consists of a wideband preferred precoding matrix index (PMI) that indicates a preferred precoder matrix $\hat{G}$, a wideband rank index (RI) $\hat{r}$, along with up-to two channel quality indices (CQIs), which are essentially quantized SINRs estimated by the UE. As seen from Section 1 for CB/CS and DPS, such CSI feedback from the UE for each transmission point in its CoMP set to its anchor BS is sufficient as this allows the controller to select one TP for transmission to that UE (on each sub-band if needed) and to obtain a good SINR estimate in order to assign an appropriate modulation and coding scheme (MCS) for the UE. However, for JT, aggregated SINR (CQI) feedback is essential to realize the performance gain by CoMP. For coherent JT, feedback of the inter CSI-RS resource phase information is also necessary. In the sequel we will use per-TP and per-CS-RS resource inter-changeably. In RAN1 #67 meeting, the following agreement has been reached [2].

CSI Feedback for CoMP Uses at Least Per-CSI-RS-Resource Feedback.

However the contents of this per-CSI-RS-resource feedback have not yet been decided.

Based on this agreement, we now provide efficient approaches for CoMP CSI feedback. We first discuss the alternative solutions for per CSI-RS resource feedback either with or without the common rank restriction, and moreover, the options for inter-CSI-RS-resource feedback. Later we propose a best-$\tilde{M}$ CSI feedback scheme for CoMP.

2.1 Per CSI-RS Resource Feedback without Common Rank Restriction

Since per-CSI-RS-feedback has been agreed to be mandatory for all CoMP transmission schemes, it raises an issue on the rank feedback for each transmission point. Whether or not to enforce a common rank feedback for all the transmission points in the CoMP set is yet to be decided. We first discuss the pros/cons on the per-CSI-RS-feedback based feedback scheme for CoMP, without the common rank restriction and provide our solutions.

With per CSI-RS resource feedback, each UE sends the CSI feedback for each transmission point in its CoMP set, which is computed assuming single-point transmission hypothesis. Therefore, it is possible that preferred rank varies in the CSI feedback computed for different transmission points. In this option, the UE is allowed to send the best rank for each transmission point along with corresponding PMI/CQIs to the BS.

For CS/CB and DPS CoMP transmission schemes, the transmission to the UE (if it is scheduled) is performed from one transmission point in its CoMP set (on each of its assigned RBs) which corresponds to one CSI-RS resource. For wideband DPS (henceforth referred to as DPS-w) each UE is served by one TP on all its assigned RBs, whereas for subband DPS (DPS-s) the UE can be served by a different TP on each assigned RB. Then, for DPS-w a higher CoMP performance gain can be achieved without common rank restriction as the CSI feedback for each TP computed using a preferred rank is available to the controller. Next, supposing that the CSI-RS feedback is determined based on the assumption that the other TPs in the CoMP set are silent (or muted), the interference from other TPs in the aftermath of scheduling can be approximated by the controller using CSI-RS resource feedback corresponding to the other TPs. Further, even with different assumptions on the interference from other TPs which will be discussed later, the controller can estimate the post-scheduling SINR for the selected TP reasonably well. Thus, per-CSI-RS-resource feedback without common rank seems suitable for DPS-w. Similarly for CS/CB, where each UE is served data only by its pre-determined anchor or serving cell TP, there is no significant performance degradation since each UE reports more accurate CSI for other transmission points using the respective preferred ranks. This option also facilitates the fallback from CoMP to non-CoMP single-cell transmissions.

However, for JT enforcing the common per-UE transmission rank will necessitate rank-override when the UE reports different ranks for different transmission points in its CoMP set. Further in this case, another important issue is the mechanism to send the inter-CSI-RS resource feedback or aggregated feedback across multiple CSI-RS resources when there is no common rank restriction.

To accommodate CoMP JT scheme, we now provide the following solution for the case without common feedback rank restriction.

Solution 1:

If preferred ranks for different CSI-RS resources are different, the inter-CSI-RS resource feedback or aggregated feedback is computed based on the lowest rank among all preferred ranks. Assume the lowest rank is $\hat{r}=\min\{\hat{r}_i\}$, then in each reported precoding matrix the column subset corresponding to the $\hat{r}$ strongest SINRs is determined. The inter-CSI-RS resource phase feedback or aggregated feedback is computed based on these precoding matrix column subsets and these subsets are used to design the transmit precoder.

We consider an example with a CoMP set having two transmission points. For the cases with three or more transmission points, the results discussed below can be applied similarly. The CSI feedbacks including preferred precoding matrices, quantized SINRs (feedback using CQIs), and rank indices are $(\hat{G}_1, \hat{\gamma}_1, \hat{r}_1)$ and $(\hat{G}_2, \hat{\gamma}_2, \hat{r}_2)$ for the transmission point 1 (TP1) and TP2, respectively. The UE then selects the rank $\hat{r}=\min\{\hat{r}_1, \hat{r}_2\}$. Then the precoding matrix $V_1$ used in CoMP JT is assumed to be formed using $\hat{r}$ columns of $\hat{G}_1$ which correspond to $\hat{r}$ highest SINRs. If there are two or more layers having the same SINR CQI index, a predetermined rule (known to all UEs and TPs) can be applied for column subset selection. The precoding matrix $V_2$ can then be formed similarly. With the inter CSI-RS resource phase $\phi=[\phi_1\ \phi_2]^T$, the composite precoding matrix is formed as $$V_{JT} = \begin{pmatrix} V_1 e^{j\phi_1} \\ V_2 e^{j\phi_2} \end{pmatrix}.$$

The inter CSI-RS resource phase feedback is determined by finding the best $\phi$ from a predetermined set assuming the composite precoding matrix $V_{JT}$ is employed for CoMP JT. Without loss of generality, we set $\phi_1=0$ so that only $\phi_2$ needs to be reported.

Similarly, the aggregated SINR or aggregated CQI feedback is computed assuming that $V_{JT}$ is employed for coherent CoMP JT or non-coherent CoMP JT with $\phi=[0\ 0]^T$.

As mentioned earlier, with Solution 1, the rank override is needed in case of JT. With Solution 1, a better DPS-w and CS/CB performance may be achieved. The performance of JT will degrade as the first few dominant right singular vectors of the composite channel are not accurately available at the controller. Moreover, common rank feedback is also better suited for DPS-s since in this case a rank override is necessitated if a UE is served by different TPs (for which it has reported different ranks) on its different assigned RBs.

For the feedback overhead, assuming a feedback mode similar to 3-1, i.e. a wideband PMI feedback, wideband rank along with subband CQI feedback, each CSI-RS resource feedback consists of one RI (to indicate a rank say r), and one PMI, and N min$\{2, r\}$ CQIs, where N is number of subbands that the UE is configured to report. Thus with Solution 1, the total feedback for per-CSI-RS resource feedback with M CSI-RS resources is $\Sigma_{m=1}^{M}$ N min$\{\hat{r}_m, 2\}n_{CQI}+Mn_{RI}+Mn_{PMI})$, where $n_{CQI}$, $n_{RI}$, and $n_{PMI}$ are number of bits for each feedback of CQI, RI and PMI, respectively. Here, we assume that a set of CQIs for N subband resources are sent back for each per-CSI-RS resource. Note that in case of JT CoMP per-subband inter point phase and/or aggregate CQI(s) could also need to be reported. Such overhead can be reduced by imposing restrictions on CQI feedback, which we will explain later.

If the UE can report feedback for a subset of CSI-RS resources, we propose the following solution.
Solution 2:
The standard does not specify the common rank restriction for per CSI-RS resource feedback. With UE centric CSI feedback, UE decides preferred CoMP scheme. If UE prefers JT CoMP scheme, the UE sends per-CSI-RS resource feedback with a common or uniform rank for multiple CSI-RS resources possibly along with aggregated CQI feedback (aggregated across all those CSI-RS resources) and/or inter-CSI-RS resource phase feedback. If UE prefers DPS-w or CB/CS, per-CSI-RS resource feedback is sent without common rank restriction. Further, if the UE prefers DPS-s then it sends per-CSI-RS resource feedback with a common rank. However, such feedback scheme does not restrict the CoMP scheme that the controller should use.

We can see with Solution 2, the rank override is not necessary for JT and DPS-s. Also if BS employs the CoMP scheme that the UE prefers as indicated in its CSI feedback, the system is able to achieve maximal gain with respect to that UE. Additional feedback is needed to indicate the preferred CoMP scheme. But such feedback overhead is minimal. Note that we have assumed a wideband indication of one preferred CoMP scheme that is common across all subbands that the UE is configured to report. This reduces the signaling overhead with negligible performance degradation. Further, as an option to reduce overhead the system may decide in a semi-static manner to allow only one of DPS-s and DPS-w.

The feedback overhead for Solution 2 is discussed as follows.

For JT, the total feedback overhead is $\min\{\hat{r}, 2\}Nn_{CQI}+n_{RI}+Mn_{PMI}$, where $\hat{r}$ is the uniform rank selected by the UE. Additional overhead is required for aggregated CQI feedback and/or inter-CSI-RS resource phase feedback.

For CB/CS and DPS-w, the maximum overhead is $\Sigma_{m=1}^{M} \min\{r_m, 2\}Nn_{CQI}+Mn_{RI}+Mn_{PMI}$ which is same as that for solution 1. However, this can be reduced since with UE centric CSI measurement, UE may only measure the CSI for a subset of M CSI-RS resources. In particular, for DPS, UE may only need to feedback one CSI feedback for the anchor point and one for the best preferred TP. Then in case of DPS-w there is one wideband indication needed for indicating the preferred TP, whereas one indication per subband is needed for DPS-s. Extending this approach, we may also allow UE to only feedback CSI for the best preferred TP (per subband for DPS-s). With this alternative, while the overhead is reduced the scheduling gain may also reduce since the network will be forced to use the UE preferred TP for the transmission to this UE if it is scheduled. Furthermore, for CB/CS the system can enforce that each user use a specified rank in the feedback of CSI for each TP in its CoMP set that is different from its serving TP. This reduces rank indication overhead and may simplify UE determination of PMI for its non-serving TPs. These specified ranks can be conveyed by the network in a semi-static manner to the UE. Optionally, the specified ranks can be identical for all other non-serving TPs (for example rank-1).

To reduce the performance loss for the fallback to single-cell transmission, we also propose the following CoMP CSI feedback solution for JT.

The UE sends the CSI feedback for the serving TP under single TP transmission hypothesis. For CoMP, UE also reports a wideband PMI for each CSI-RS resource including serving TP with a uniform rank, which can be different from the reported rank for the single serving cell transmission, along with the aggregated CQI for CoMP JT and/or the inter CSI-RS phase feedback.

2.2 Per CSI-RS Resource Feedback with Common Rank Restriction

We may specify the common rank restriction to ensure that a common rank is employed when the UE sends per-CSI-RS resource feedback. With common rank restriction on per CSI-RS resource feedback, there may be a performance degradation if DPS-w or CB/CS CoMP scheme is employed at the BS, as the preferred precoding and rank may not be the best for the transmission point that the network eventually uses. There may also be a performance degradation if the system falls back to the single cell (serving TP) transmission for this UE. We now propose the following solution based on UE centric CSI feedback that may mitigate this possible performance loss.

Solution 3:
The standard specifies the common rank restriction for per CSI-RS resource feedback but does not specify which rank to use. With UE centric CSI feedback, in case the UE prefers and indicates JT CoMP or CS/CB the UE may send per-CSI-RS resource feedback with a uniform rank for a subset of CSI-RS resources (possibly along with inter-CSI-RS resource feedback and/or aggregated CQI feedback in case of JT CoMP). With this flexibility, in case DPS-w (DPS-s) is indicated by the UE, the UE may send the CSI feedbacks for the serving cell and the preferred transmission point (preferred TP per subband) with a common rank. UE can also send the CSI feedback for only serving cell and indicate that it prefers to fall back to single cell transmission.

With this approach, the performance degradation for DPS-w and falling back single-cell transmission can be reduced.

As an option to reduce overhead, the system in a semi-static manner can further restrict the common rank to be 1 for solution 3 in case JT and/or CS-CB is preferred. The rationale is as follows. For JT, the CoMP performance gain via coherent phase combining is achieved mostly for rank-1 transmissions. Also with common rank-1 feedback the UE only needs to feedback one aggregate CQI (per subband). For CB/CS, with rank-1 channel feedback, it is easier for the coordinated BSs to control the precoding beams for different TPs to reduce the intra CoMP set interference.

With UE centric feedback, UE can choose the preferred CSI feedback scheme. One simple case is that UE can choose between JT CoMP CSI feedback with a lower rank, e.g., rank-1 feedback with aggregated CQI feedback, or the CSI feedback for the single serving TP with higher rank, e.g., rank 2, (which has less overhead) by comparing the effective rates it deems it can get under these two, i.e., $\eta_1$ and $\eta_\mathcal{V}$, where $\mathcal{V}$ is the set of TPs being considered by the UE for JT. The one corresponding to the higher rate is the type of transmission scheme (CoMP or fall-back to single serving TP) that the UE prefers and sends the CSI feedback accordingly. However, although this comparison is the best approach on selecting the CSI feedback for this particular UE, it is not a good choice on the system efficiency because when UE selects fall-back to single serving TP, the BS can schedule some data transmissions on the other TPs. To accommodate the potentially scheduled UEs on the other TPs, we suggest the following three alternative approaches.

Alternative 1:
An offset $\overline{\eta}_i$ for the ith TP is imposed and signalled to the UE in a semi-statical manner. So the UE compares the sum rate assuming single TP for the UE, $\eta_1 + \Sigma_{i \in \mathcal{V}} \overline{\eta}_i$ and the CoMP rate $\eta_V$ to select preferred transmission scheme and send the CSI feedback accordingly. The value $\bar{\eta}_i$ can be the average single-cell transmission rate from the TP i.

Alternative 2:

Fractional EPREs or powers $\{\alpha_i \rho_i\}$ are assumed when the UE computes CoMP CQI so that the rate for CoMP JT computed by UE is scaled (or equivalently for each TP i the UE scales its effective estimated channel that includes the power $\rho_i$ by a factor $\sqrt{\alpha_i}$). The scaling factors $\{\alpha_i\}$ (which can be UE specific) can be signalled by the network to the UE semi-statically. UE then computes CoMP SINR according to (5) but with the scaled power $\alpha_i \rho_i$, $i \in V$, and obtains the CoMP rate $\eta_V(\{\alpha_i \rho_i\})$. The rate comparison is between $\eta_1$ and $\eta_V(\{\alpha_i \rho_i\})$. With the SINR (CQI) feedback based on the fractional powers and knowing $\{\alpha_i\}$, the BS can re-scale the SINR back for appropriate MCS assignment. Note that the role of these $\{\alpha_i\}$ is to bias the UE towards making a choice. To get a finer control each $\alpha_i$ (on a per-TP basis) can be different for different cardinality of the set V and/or they can be different for different rank hypothesis.

Alternative 3:

The UE computes the rate from each transmission point, $\eta_m$, and compare the sum rate $\eta_1 + \kappa \Sigma_{i=2}^{M} \eta_i$ with the rate of CoMP JT $\eta_V$, where $\kappa$ is a scaling factor that can be informed by the BS in a semi-statical manner. When $\kappa=0$, it reduces to the original comparison between the single serving TP transmission rate and CoMP JT rate.

2.3 Best-$\check{M}$ CSI Feedback

Usually, the BS pre-allocates certain uplink (UL) resources for a UE to send its CSI feedback. Since per-CSI-RS resource feedback is agreed in order to support all CoMP schemes, a large number of UL feedback resources have to be pre-allocated to be able to accommodate the worst case, i.e., the highest transmission ranks for each TP along with N CQIs for each stream (maximum 2 data stream for rank 2 or higher). Even with UE centric CSI feedback, in which the actually feedback bits can be much less, it still could not reduce the signaling overhead since the UL feedback resources are pre-allocated. We now propose a so-called best-M CSI Feedback schemes and provide two alternative approaches. This scheme can be applied to the systems either with or without the common rank restriction.

Alternative 1:

The BS configures and semi-statically sends a signal of $\check{M}$ and ask the UE selects $\check{M}$, $\check{M} \leq M$, CSI-RS resources or TPs to send the CSI feedback for each resources. The BS then pre-allocate the UL feedback channel which is able to accommodate the CSI feedback for $\check{M}$ CSI-RS resources or TPs. If aggregated CQI or inter CSI-RS resource phase feedback is specified, additional UL feedback resources for these feedback are also allocated. UE is able to select the preferred $\check{M}$ TPs to send the CSI feedback accordingly. Additional signaling on the CSI feedback corresponding to which CSI-RS resource or TP is needed. $\check{M}$ can be UE specific or uniform for all UEs.

We can see that with above approach, the signalling overhead is greatly reduced when $\check{M} < M$. The reason doing this is that although the CoMP cluster consists of several multiple UE, for a particular UE, the number of effective coordinated TPs may be only two, or three at most. As shown in FIG. 1, a CoMP set consists of 3 TPs. However, for UE1-UE3, there are only two effective TPs for coordination. For UE4, by selecting best $\check{M}=2$ of 3 coordinated TPs, there should not be any significant performance degradation. Of course the UE can send CSI feedback for less-than $\check{M}$ CSI-RS resources or TPs.

Although the above approach reduces feedback overhead significantly, the worst scenarios for CSI feedback, particularly, for the CQI feedbacks have be considered when allocating the UL feedback resources, i.e., the maximum rank for a TP or a CSI-RS resource within the CoMP set. This scenario is for both the case without common rank restriction and the case with common restriction but not specifying which rank to use. Hence, we propose the following approach to further reduce unnecessary feedback resource allocations.

Alternative 2:

The BS configures and semi-statically sends a signal of $\check{M}$ and ask the UE selects CSI-RS resources or TPs to send the CSI feedback for total $\check{M}$ data streams. The BS then pre-allocate the UL feedback channel which is able to accommodate the CSI feedback for $\check{M}$ data streams. If aggregated CQI or inter CSI-RS resource phase feedback is specified, and configure additional UL feedback resources for these feedback are also allocated. UE is able to select the preferred TPs and ranks for each TP or the common rank for all select TPs with this $\check{M}$ data stream constrain.

With Alternative-2 approach, UE can select the TPs with total number of CQI feedback sets being $\check{M}$. For example, the UE can send CSI feedback for $\check{M}/2$ TPs if the common rank is 2 or above, or for $\check{M}$ TPs if the common rank is 1, or any number of TPs as long as $\Sigma_{i \in V_{UE}} \min\{r_i, 2\} \leq \check{M}$ for the case without common rank restriction.

One variation of above alternative-2 scheme is that the restriction of $\check{M}$ sets of CQI feedback includes the aggregated CQI. The UE may be able to choose if aggregate CQI is needed and occupy the feedback resources so that less per-CSI-RS resource CSI feedbacks are reported.

2.4 CoMP Feedback Format

As discussed before, with per CSI-RS resource feedback, each UE sends the CSI feedback for each transmission point in its CoMP set, and this per CSI-RS resource feedback is computed assuming single-point transmission hypothesis (i.e., transmission only from the TP corresponding to that CSI-RS resource). Therefore, it is possible that preferred rank varies in the CSI feedback computed for different transmission points. In this option, the UE is allowed to send the best rank for each transmission point along with corresponding PMI/CQIs to its serving TP.

A simple way in which the network controller can control a UE's per CSI-RS resource feedback is to employ a separate codebook subset restriction for each TP in a UE's CoMP set (a.k.a. CoMP measurement set). In other words the controller can inform each UE in a semi-static manner about the codebook subset it should employ for each TP in its CoMP set, so that the UE then searches for and reports a precoder only in the respective subset corresponding to each TP in its CoMP set. This allows the controller to tune the per CSI-RS resource feedback it receives, for instance in case it decides that CS/CB is a more preferable scheme it can configure the subsets corresponding to all non-serving TPs in a UE's CoMP set to include only rank-1 precoding vectors. This allows for better quantization of dominant interfering directions and better beam coordination which is particularly helpful for CS/CB.

Additionally, as an option the controller can also configure a separate maximum rank limit on the rank that can be reported by the UE for each TP in its CoMP set and convey these maximum rank limits to the UE in a semi-static manner. While this can be accomplished also via codebook subset restriction, setting a separate maximum rank limit can decrease the feedback load. For example, if a TP has four transmit antennas, with codebook subset restriction the feedback overhead need not be decreased since it has to be designed to accommodate the maximal subset size, which in this case translates to six bits, two bits for rank (up-to rank 4) and four bits for the PMI per rank. On the other hand, by imposing a maximum rank limit of 2, the overhead is 5 bits, one bit for rank (up-to rank 2) and four bits for the PMI per rank. Note that codebook subset restriction can be used in conjunction with maximum rank limit.

Optionally, the network can also have the ability to semi-statically configure a separate feedback mode for each per CSI-RS resource feedback reported by a UE. For instance the network may configure a UE to use a feedback mode for its serving-TP that allows reporting per-subband PMI and CQI(s) and a mode that allows reporting a wideband PMI with per-subband CQI(s) for some or all of the other TPs in its CoMP set. This allows the controller to reduce the overall CoMP feedback load without a significant degradation in performance.

Let us denote the overall CoMP CSI feedback from a UE for a particular choice of: per CSI-RS resource feedback modes, possible accompanying restrictions such as common rank report for all TPs in the CoMP set and additional aggregate CQI(s) or inter-point phase resource(s): as a CoMP feedback format. A key bottleneck in designing CoMP CSI feedback schemes is that the size of the UL resource used for reporting a particular CoMP feedback format must be pre-allocated and must be designed to accommodate the worst-case load. This is because the TP which receives the feedback should know the physical layer resources and attributes used for the UE feedback in order to decode it. Then, if the UE is allowed to dynamically select the feedback format from a set of permissible formats, the TP which receives its feedback will have to employ blind decoding in order to jointly determine the format used by the UE and the content within it. Such blind decoding increases the complexity and thus it is better to allow only a small cardinality for the set of permissible CoMP feedback formats, say 2. Another even simpler solution is for the controller to semi-statically configure a feedback format for a UE which then employs that format for its CSI feedback until it is re-configured by the network.

We now provide some useful guidelines for CoMP feedback format design.

1. CoMP set size dependent feedback format: The CoMP set for a UE is configured by the network. Thus one feedback format can be defined for every possible CoMP set size in the CoMP cluster. However, a simple network design also demands a small number of feedback formats. Typical possible values of CoMP set size are: a set size of 2 and a set size of 3. Accordingly we can define a separate feedback format for size 2 and another one for size 3. Additionally, as an option one other format common for all sizes greater than 3 can be defined. Alternatively, the network can restrict itself to configure a CoMP set for each UE which is of size no greater than 3 and hence this additional format need not be defined. The UE will use the format corresponding to the size of its CoMP set. Then, each of these formats can be designed separately and a key idea we can exploit is that for a given feedback load, the format for a smaller set size can convey more information about the TPs in the CoMP set.

2. CQI feedback in each CoMP feedback format: Note that at-least one CQI per sub-band must be reported by the UE for each TP in its CoMP set (or for each TP in its preferred set of TPs if the CoMP set size is large and the UE has been configured to report CSI for only its preferred TP set which can be any subset (of a configured cardinality) of its CoMP set). We highlight some approaches to configure the CQI feedback. For simplicity we consider the case where the UE must report at-least one CQI per sub-band for each TP in its CoMP set. The other case follows after straightforward changes.

The UE can be configured to report one or at-most two CQI(s) per sub-band for each TP in its CoMP set. Each of these CQI(s) are computed under the assumption that the other TPs in the CoMP set are muted so that only the outside CoMP set interference is captured in these CQI(s). Then, the controller can approximate the whitened downlink channel from each TP to the user on each sub-band using the corresponding reported PMI and CQI(s), i.e., with reference to the model in (1) the whitened channel from the $i^{th}$ TP to the user is $R^{-1/2}H_i$ which is approximated using the reported PMI and CQI(s) corresponding to TP i as $\hat{H}_i$. The controller can then model the signal received by the user in the aftermath of scheduling as $$y \approx \sum_{i=1}^{M} \hat{H}_i x_i + \tilde{n}. \tag{6}$$

where $\tilde{n}$ is the additive noise with $E[\tilde{n}\tilde{n}^\dagger]=I$. Using the model in (6) the controller can design the transmit precoders and obtain estimates of received SINRs for each choice of transmit precoders and choice of CoMP transmission schemes, i.e., CS/CB or DPS or JT. This allows the controller to select an appropriate transmission scheme. In addition to these CQI(s), the UE can also report per sub-band "fallback" CQI(s) for only the serving TP. These CQI(s) are computed using the PMI reported for the serving cell after incorporating the interference measured by the UE from TPs outside CoMP set as well as all other TPs in the CoMP set. Using these CQI(s) along with the PMI reported for the serving cell, the controller can first approximate the whitened downlink channel from the serving TP to the user on each sub-band (the whitening is now with respect to both intra-CoMP set and outside CoMP set interference) and then model the signal received by the user in the aftermath of scheduling as $$y=\hat{H}'_1 x_1 + \tilde{n}' \tag{7}$$

where again $E[\tilde{n}'\tilde{n}'^\dagger]=I$. Using the model in (7) the controller can schedule the user as a conventional single-cell user. This allows single cell fall-back scheduling.

In addition, as an option the network can also configure each UE to report per sub-band aggregate CQI(s) where the set of TPs from the CoMP set used by the UE to compute the aggregate CQI(s) are configured by the network (a.k.a. controller). Recall that the aggregate CQI(s) are computed assuming joint transmission from a set of TPs (with the other TPs if any in the CoMP set assumed to be silent). While the model in (6) allows for obtaining post-scheduling SINR estimates under JT, the SINRs so obtained need not be accurate enough for good JT gains. The SINRs estimates obtained using aggregate CQI(s) allow for better link adaptation and hence larger gains via joint transmission. Alternatively, instead of reporting these aggregate CQI(s) on a per sub-band basis, they may be reported only for the best M sub-bands (along with indices of the corresponding sub-bands) where M is configured by the network. Furthermore, as an option the network can also enforce that these aggregate CQI(s) are computed as per a configurable maximum rank limit. For example, if the network sets this limit to one, then only one aggregate CQI is reported per sub-band and this is computed using the best (strongest) column from each of the PMIs that have been determined by the UE in the per-CSI resource feedback corresponding to the TPs over which it is computing the aggregate CQI. In case of a higher maximum rank limit, two aggregate CQIs are reported per sub-band and are computed using the best (strongest) column subsets which can be determined via the procedure described previously for CSI feedback for JT without the common rank constraint.

The UE can be configured to report one or at-most two CQI(s) per sub-band for each TP in its CoMP set. Each of these CQI(s) are computed after incorporating the interference measured by the UE from TPs outside CoMP set as well as all other TPs in the CoMP set. Note that the post-scheduling interference that the UE will see from TPs in its CoMP set that are not serving data to it will depend on the transmit precoders that are assigned to these TPs. Then, the controller can also exploit its knowledge of the specific transmit precoders that were used by the TPs in the UE's CoMP set in the subframes over which the UE computed the CQI(s). This allows the controller to modify the reported CQIs to obtain estimates for the post-scheduling SINRs. The modification can be done using any appropriate rule that considers the choice of transmit precoders that the network wants to employ and those that were used at the time of CQI computation. Such SINR estimates can provide reasonable CoMP gains when CS/CB or DPS is used. Notice that no additional fall-back CQI is needed since such CQI is already reported for the serving TP. However JT gains may be degraded due to inaccurate link adapation. As discussed for the previous case, as an option the UE can be configured to report additional aggregate CQI(s) to enable JT CoMP gains. These aggregate CQI(s) are computed assuming joint transmission from a (configured) set of TPs incorporating the interference from other TPs if any in the CoMP set.

We now consider some further variations that can be employed in the CoMP feedback format design.

1. Different degrees of flexibility in the rank reports: The two cases that have been discussed before are the one where full flexibility is allowed in that a separate rank report (with or without maximum rank limit) can be reported for each TP in the CoMP set. The other one is where a common rank must be reported for all TPs in the CoMP set. Another possibility that has a level of flexibility in between these two options is one where a separate rank can be reported for the serving TP along with one other separate rank that is common for all other non-serving TPs in the CoMP set. Furthermore, separate maximum rank limits can be imposed on these two rank reports. Note that this option has lower feedback compared to the full flexibility case and can convey CSI more accurately compared to the case where a common rank must be reported for all TPs in the CoMP set.

2.5 CoMP Feedback Formats: CoMP Measurement Set Size 2 or 3

In this section we will further specify the feedback format design by focusing on measurement set sizes 2 and 3. In the following we will assume that each CSI-RS can be mapped to (or corresponds to) a TP. These principles can be extended in a straightforward manner to the case where a CSI-RS corresponds to a virtual TP formed by antenna ports from multiple TPs. Let us first consider measurement set size 2. We will list the various alternatives in the following.

Per-point CSI-RS resource feedback for each of the two CSI-RS resources configured for the measurement set. Each such feedback comprises of PMI/CQI(s) computed assuming single-point transmission hypothesis from the TP corresponding to that CSI-RS resource with the remaining TP (corresponding to the other CSI-RS resource) being silent, henceforth referred to as Per-point CSI-RS resource feedback with muting. Note that the frequency granularity of the PMI and the CQI(s) to be sent by the user in a per-point CSI-RS resource feedback can be separately and independently configured by the network in a semi-static manner. For instance, the user can be configured to send per-subband CQI(s) and wideband PMI in one per-point CSI-RS resource feedback, while reporting per-subband CQI(s) and per-subbband PMI in the other per-point CSI-RS resource feedback.

Per-point CSI-RS resource feedback with muting for each of the two CSI-RS resources. In addition, separate fallback PMI/CQI(s) (henceforth referred to as fallback CSI) are also reported. This fallback CSI is computed under the assumption of single-point transmission from the serving TP and interference from all TPs outside the CoMP set as well as interference from the other non-serving TP in the CoMP set. For simplicity and to avoid additional signaling overhead, the frequency granularities of the PMI and CQI(s) in the fallback CSI can be kept identical to those of their counterparts in the per-point CSI-RS resource feedback with muting for the serving TP. Note that the covariance matrix for the interference from all other TPs can be estimated by the UE using resource elements configured for that purpose by the network. Alternatively, the UE can be configured by the network to estimate the covariance matrix for the interference from outside the CoMP set using certain resource elements. Then, the user can be made to leverage the fact that it has already estimated the unprecoded downlink channel matrix from the other TP in its CoMP set. Using this channel estimate the UE can assume a scaled identity matrix to be the precoder used by the other TP and compute the covariance matrix, which then is added to the covariance matrix computed for outside the CoMP set. The sum covariance matrix is then used to determine the fallback PMI and compute the associated fall back SINRs and fallback CQIs. Note that the scaling factor in the scaled identity precoder can be informed to the UE in a semi-static manner and can be based on factors such as the average traffic load being served by the other TP (which is known to the network). A higher scalar corresponds to a higher traffic load. Similarly, the covariance matrix for the other TP can also be computed by the UE assuming the precoder for the other TP to be a scaled codeword matrix where the codeword can be uniformly drawn from the codebook subset. The choice of subset and the scaling factor can be conveyed to the UE by the network in a semi-static manner.

Per-point CSI-RS resource feedback with muting for each of the two CSI-RS resources. To save signaling overhead, in the fallback CSI only fall CQI(s) are reported, where in each subband these CQI(s) are computed using the PMI reported for the serving TP (in the per-point CSI-RS resource feedback with muting) corresponding to that subband and the procedure described above. Alternatively, since the rank reported for the serving TP under muting can be an aggressive choice for fallback (recall that the fallback also assumes interference from the other TP) a separate rank indicator can be allowed for fallback. Specifically the UE can choose and indicate any rank R less than or equal to the one reported for the serving TP under muting. Then R columns of the PMI reported for the serving TP (corresponding to the R highest SINRs recovered from the associated CQI(s) under muting) are obtained. The fall back CQI(s) are then computed using this column subset.

Per-point CSI-RS resource feedback with muting for each of the two CSI-RS resources. The network can configure in a semi-static manner the TP that the UE must assume to be the serving TP for computing the fallback CQI(s). The remaining TP is then treated as the interferer and the procedure described above is employed.

Per-point CSI-RS resource feedback with muting for each of the two CSI-RS resources. The UE dynamically chooses the serving TP for computing the fallback CQI(s). The remaining TP is then treated as the interferer and the procedure described above is employed. The choice of serving TP for computing fallback can be configured to be the one which offers a higher rate as per the CQI(s) computed under muting. Note that in this case the choice is implicity conveyed to the network via the CQI(s) computed under muting and hence need not be explicitly indicated. Moreover, the choice can vary across subbands based on the per subband CQI(s). However, to enable simpler fallback operation the UE can be configured to determine a wideband choice based on the sum rate across all subbbands so that even in this case the choice is implicitly conveyed. Alternatively, a separate wideband indicator can be employed to enable the UE to indicate its choice which allows the UE to arbitrarily decide its choice albeit on a wideband basis.

Per-point CSI-RS resource feedback with muting for each of the two CSI-RS resources. A common rank constraint on the two CSI-RS resource feedbacks is enforced so that only one rank indicator needs to be reported. Optionally, fallback CSI as per any one of the above listed options is also reported. Further optionally, aggregate CQI(s) computed using the two PMIs (determined for per-point CSI-RS resource feedback with muting) are also reported.

Let us now consider measurement set size 3. We will list the various alternatives in the following.

Per-point CSI-RS resource feedback for each of the three CSI-RS resources. Each such feedback comprises of PMI/CQI(s) computed assuming single-point transmission hypothesis from the TP corresponding to that CSI-RS resource with the remaining TPs (corresponding to the other two CSI-RS resources) being silent, henceforth referred to as Per-point CSI-RS resource feedback with muting. Note that the frequency granularity of the PMI and the CQI(s) to be sent by the user in a per-point CSI-RS resource feedback can be separately and independently configured by the network in a semi-static manner. The configuration can be different for different TPs in the user's CoMP set.

Per-point CSI-RS resource feedback with muting for each of the three CSI-RS resources. In addition, separate fallback PMI/CQI(s) (henceforth referred to as fallback CSI) are also reported. These CQI(s) assume single-point transmission from the serving TP and interference from all TPs outside the CoMP set as well as interference from the other TPs in the CoMP set. Note that the covariance matrix for the interference from all other TPs can be estimated by the UE using resource elements configured for that purpose by the network. Alternatively, the UE can be configured by the network to estimate the covariance matrix for the interference from outside the CoMP set using certain resource elements. Then, the user can be made to leverage the fact that it has already estimated the unprecoded downlink channel matrix from each of the other TPs in its CoMP set. Using these channel estimates the UE can assume a scaled identity precoder for each of the other TPs and compute the respective covariance matrices, which then are added together to the covariance matrix computed for outside the CoMP set. The sum covariance matrix is then used to compute the fall back SINRs and fallback CQIs. Note that the scaling factors in the scaled identity precoders, respectively, can be informed to the UE in a semi-static manner and can be based on factors such as the average traffic loads being served by the other TPs (which are known to the network). A higher scalar corresponds to a higher traffic load. Similarly, the covariance matrices for the other TPs can also be computed by the UE assuming the precoder for each other TP to be a scaled codeword matrix where the codeword can be uniformly drawn from a codebook subset. The choice of subset and the scaling factor (associated with each other TP) can be conveyed to the UE by the network in a semi-static manner.

Per-point CSI-RS resource feedback with muting for each of the three CSI-RS resources. To save signaling overhead, in the fallback CSI only fall CQI(s) are reported, where these CQI(s) are computed using the PMI reported for the serving TP and the procedure described above. Alternatively, since the rank reported for the serving TP under muting can be an aggressive choice for fallback (recall that the fallback also assumes interference from the other TP) a separate rank indicator can be allowed for fallback. Specifically the UE can choose any rank R less than or equal to the one reported for the serving TP under muting. Then R columns of the PMI reported for the serving TP (corresponding to the R highest SINRs recovered from the associated CQI(s) under muting) are obtained. The fall back CQI(s) are then computed using this column subset.

Per-point CSI-RS resource feedback with muting for each of the three CSI-RS resources. The network can configure in a semi-static manner, the TP that the UE must assume to be the serving TP for computing the fallback CQI(s). The remaining TPs are then treated as the interferers and the procedure described above is employed. Alternatively, even the subset among the two other remaining TPs to be treated as interferers can be conveyed to the UE by the network in a semi-static manner. The TP (if any) not in the subset is assumed to be silent while computing these CQI(s). Notice that there are multiple hypotheses under which the fallback CQI(s) can be computed depending on the configured fallback choice of serving and interfering TPs. In one feedback embodiment, the fallback CQI(s) corresponding to multiple such choices can be simultaneously reported. Alternatively, to save feedback overhead they can be reported in a time multiplexed manner. In particular, the user can be configured to follow a sequence of reporting in which each report in the sequence includes fallback CQI(s) computed according to a particular choice of serving and interfering TPs. The sequence configuration can be done by the network in a semi-static manner.

Per-point CSI-RS resource feedback with muting for each of the three CSI-RS resources. The UE dynamically chooses the serving TP for computing the fallback CQI(s). The remaining TPs are then treated as the interferers and the procedure described above is employed. The choice of serving TP can be configured to be the one which offers the highest rate as per the CQI(s) computed under muting. Note that in this case the choice is implicity conveyed to the network via the CQI(s) computed under muting and hence need not be explicitly indicated. Moreover, the choice can vary across subbands based on the per subband CQI(s). However, to enable simpler fallback operation the UE can be configured to determine a wideband choice based on the sum rate across all subbands so that even in this case the choice is implicitly conveyed. Alternatively, a separate wideband indicator can be employed to enable the UE to indicate its choice which allows the UE to arbitrarily decide its choice albeit on a wideband basis.

Per-point CSI-RS resource feedback with muting for each of the three CSI-RS resources. A common rank constraint on the three CSI-RS resource feedbacks is enforced. Optionally, in addition fallback CSI as per any one of the above listed options can also be reported. Further optionally aggregate CQI(s) computed using the three PMIs (determined for per-point CSI-RS resource feedback with muting) assuming joint transmission from all three TPs are also reported.

Per-point CSI-RS resource feedback with muting for each of the three CSI-RS resources. A common rank constraint on the three CSI-RS resource feedbacks is enforced. Aggregate CQI(s) computed using the serving PMI and one other PMI (both determined for per-point CSI-RS resource feedback with muting) assuming joint transmission from the corresponding two TPs, with the remaining TP being silent, are also reported. The wideband choice of the other TP is also indicated. Optionally, in addition fallback CSI as per any one of the above listed options can also be reported.

We now consider some further variations that can be employed in the CoMP feedback format design for measurement set sizes 2 and 3.

For both measurement set sizes 2 and 3, one option that has been discussed is the per-point CSI-RS resource feedback with muting for each of the CSI-RS resources in the measurement set along with a separate fallback CSI, wherein a common rank restriction can be imposed on back be identical to that in the fallback CSI. Thus only one rank indicator needs to be signalled.

We remark that by imposing the fallback rank restriction we bias a CoMP UE (i.e., a user with more than one TP in its measurement set) to report per-point CSI with a lower rank. This is because the fallback CSI is computed under the assumption of interference from all non-serving TPs and hence will choose a lower rank. Put another way, a CoMP user is likely to be a cell-edge user under fallback single-point scheduling and hence will support a lower rank. Clearly, imposing this fallback rank restriction on all per-point CSI will result in disabling higher-rank transmission for a CoMP user, which might potentially lower the rate. However, it also has a key advantage. Note that under rank restriction for each per-point CSI, the user essentially first determines the optimal un-quantized channel approximation of the given rank and then quantizes it. Then, an important fact is that given a fixed quantization load (decided by the codebook size) quantization error is smaller for lower ranks. The net effect of this is that the first few dominant singular vectors (which represent preferred directions) along with the corresponding singular values are more accurately reported by the user at the expense of not reporting the remaining ones at all. In the case without rank restriction the user will typically pick a larger set of singular vectors to quantize. This results in the central scheduler knowing more directions and associated gains, albeit more coarsely.

We provide the results to highlight the impact of this fallback rank restriction in Table 1. For brevity we consider two CoMP schemes and a suitable CoMP scheduling algorithm. From the results we see that fallback rank restriction results in almost no degradation which suggests that accurately knowing a fewer directions from each CoMP user allows the newtork to better manage interference thereby offsetting the loss due to disabling higher rank transmission to those users. Thus, fallback rank restriction can be a useful feedback reduction strategy under limited quantization load.

Dynamic Feedforward Indication of the Feedback Hypothesis

Recall that we have discussed multiple hypotheses under which the fallback CQI(s) can be computed depending on the configured fallback choice of serving and interfering TPs, and where interference from outside CoMP set is always included. In general we can refer to each

TABLE 1

Spectral Efficiency (bps/Hz) of CoMP schemes with (RR = 1) and without (RR = 0) fallback rank restriction.

| Scheduling scheme | DPS (RR = 1) | DPS (RR = 0) | CS/CB (RR = 1) | CS/CB (RR = 0) |
|---|---|---|---|---|
| cell average | 2.3981 (1.70%) | 2.3579 | 2.4461 (0.26%) | 2.4397 |
| 5% cell-edge | 0.0976 (2.20%) | 0.0955 | 0.0898 (−0.44%) | 0.0902 |
| Actual BLER | 6.02% | 7.08% | 5.54% | 6.10% |
| Empty RB ratio | 7% | 7% | 0% | 0% | all reported feedback. Here, we outline an approach (or procedure) to impose this common rank restriction. In this approach, the UE first computes its fallback CSI (now including PMI/CQI(s) and rank indicator) and then computes the other per-point CSI-RS resource feedback under the restriction that the rank of the quantization codebook used in each per-point CSI-RS resource feed-hypothesis as a CSI-process which is associated with one "channel part" which represents the choice of the serving TP (or equivalently a non-zero power (NZP) CSI-RS resource in its measurement set using which a channel estimate can be obtained) and one "interference part". This interference part can in turn be associated with a set of REs (which is a zero-power (ZP) CSI-RS resource referred to as the interference measurement resource (IMR)). As discussed before the UE can be simply told to directly measure or estimate the covariance matrix of the interference[1] on those REs and it is up-to the controller to configure on those REs the interference it wants the UE to measure. Alternatively, the UE can be configured to measure the interference on an IMR (for instance the interference from outside CoMP set) and also emulate additional interference from a subset of TPs in its CoMP set using the channel estimates determined for those TPs from the corresponding NZP CSI-RS resources, along with scaled identity precoders as discussed before. We note that to achieve the maximal CoMP gains, the network must allow different CSI-processes to be configured for a UE, with different IMRs and/or different NZP CSI-RS resources for emulation of respective interferences. Clearly, all the feedback format designs discussed earlier (excluding the ones including aggregate CQI(s)) can be instead described in terms of configuring multiple CSI-processes. For instance, each per-point CSI-RS resource feedback described previously is simply a CSI-process in which the IMR is configured for the UE to measure the outside CoMP set interference and the NZP-CSI-RS resource is configured to allow the UE to obtain a channel estimate from the corresponding TP.

[1] For brevity we will henceforth drop the term "covariance matrix" and just use "measure/estimate the interference".

In order to limit the overhead and complexity a limit can be placed on the number of distinct CSI-processes that can be configured for a UE. Also, we can define the notion of a CSI-pattern that comprises of a set of CSI-processes. A codebook of such patterns can be defined and disclosed to the UE in a semi-static manner. Then, the controller can dynamically signal an index from the codebook to the UE which identifies a pattern. The UE can then compute CSI as per each CSI-process in that pattern and feed them back.

To reduce the overhead, while defining a pattern one or more of its CSI-processes can be marked CQI-only, i.e, the UE does not compute PMI/RI in the CSI computed for these CSI-processes. Instead, for each such process it will use the PMI of another process in that pattern which is not marked CQI-only and has the same "channel part" (i.e., NZP-CSI-RS-resource), to compute the CQI(s) associated with the marked process. The process whose PMI is to be used is also fixed separately for each such CQI-only marked process. Furthermore, some processes can be marked as those requiring wideband PMI and/or wideband CQI(s) and consequently, the UE will only compute and report wideband PMI and/or wideband CQI(s) for such processes. Additionally, a separate codebook subset restriction can be placed on each process and/or a separate maximum rank limit can be placed on each process. Optionally, a common rank restriction can be imposed on all processes in a pattern. Further specializing this restriction, a CSI process in the pattern can be marked to indicate that the UE should first compute CSI (including RI) for that process and then use the computed RI for all the remaining processes. All such optimizations can be done semi-statically while defining a codebook and the codebook and attributes (or markings) of each process in each pattern in the codebook are conveyed to the UE semi-statically. Then the index of a pattern can be conveyed in a dynamic manner and the UE will report CSI following the indexed pattern and the attributes of its constituent CSI processes. Notice that the codebook can be defined on a UE-specific manner. Alternatively, a codebook can be defined for each possible measurement set so that each UE can know the codebook based on its configured measurement set.

Let us consider a specific example of a codebook of patterns by considering a UE with a CoMP measurement set formed by TPs 0, 1, 2. Then, we use three NZP-CSI-RS resources denoted by NZP-CSI-RS0, NZP-CSI-RS1, NZP-CSI-RS2, respectively, for the "channel parts" associated with TPs 0, 1 and 2, respectively. The IMR for measuring the interference outside the CoMP measurement set is denoted by IMR012. Further, let us define CSI0, CSI1 and CSI2 to be CSI processes in which "channel parts" are determined from NZP-CSI-RS0, NZP-CSI-RS1 and NZP-CSI-RS2, respectively, and the interference parts are denoted by I0, I1 and I2, respectively, where I0 is computed by first measuring/estimating interference directly on IMR012 and then emulating the interferences from TPs 1 and 2 and adding them. The emulation of interference from TP 1 (TP2) is done using the channel estimated from NZP-CSI-RS1 (NZP-CSI-RS2) and a scaled identity precoder (or an average over a configured precoder codebook subset). I1 and I2 are similarly computed by directly estimating interference in IMR012 and emulating and adding interference using (NZP-CSI-RS0 and NZP-CSI-RS-2) and (NZP-CSI-RS0 and NZP-CSI-RS-1), respectively. Finally, let us define CSIij, where i and j lie in $\{0, 1, 2\}$, in which the channel part is determined using NZP-CSI-RSi and the interference is computed by measuring/estimating interference directly on IMR012 and then emulating and adding the interference from TP in the set $\{0, 1, 2\}\backslash\{i, j\}$ using corresponding NZP-CSI-RS resource. Then a codebook can be defined as the one including a pattern containing (CSI0, CSI1, CSI01, CSI10) and another pattern comprising of (CSI0, CSI2, CSI02, CSI20). Dynamically, the controller can signal an index corresponding to any one of these two patterns to the UE. Furthermore, as an option to reduce feedback overhead, in the pattern (CSI0, CSI1, CSI01, CSI10) CSI01 and CSI10 can be marked CQI-only and where the CQIs must be computed using the PMIs determined for CSI0 and CSI1, respectively. Similarly, in the pattern (CSI0, CSI2, CSI02, CSI20) CSI02 and CSI20 can be marked CQI-only and where the CQIs must be computed using the PMIs determined for CSI0 and CSI2, respectively.

In another example the codebook can be defined as before with the following exceptions. In the pattern (CSI0, CSI2, CSI02, CSI20), the CSI for the process CSI02 is computed using the channel part determined as before using NZP-CSI-RS0 but the interference is directly measured on IMR02 which signifies that in the REs indicated to the UE via this IMR the controller will ensure that the TPs 0 and 2 will remain silent so that the UE can directly measure/estimate interference from outside its CoMP set and the TP 1. Similarly, the CSI for the process CSI20 is computed using the channel part determined using NZP-CSI-RS2 and the interference is directly measured on IMR02. On the other hand, the CSI for the process CSI0 is computed using the channel part determined using NZP-CSI-RS0 and the interference directly measured on IMR02 plus the interference emulated using NZP-CSI-RS2, whereas the CSI for the process CSI2 is computed using the channel part determined using NZP-CSI-RS2 and the interference directly measured on IMR02 plus the interference emulated using NZP-CSI-RS0. The CSI computation procedure that the UE must follow for pattern (CSI0, CSI1, CSI01, CSI10) can be similarly specified using IMR01 which signifies that in the REs indicated to the UE via this IMR the controller will ensure that the TPs 0 and 1 will remain silent so that the UE can directly measure/estimate interference from outside its CoMP set and the TP 2. Note that in the second codebook we need one extra IMR but the UE needs to emulate fewer interferences compared to the first codebook.

Thus by appropriately defining patterns and their CSI computation procedures, the controller can control the overhead (in terms of reserving REs for IMRs on a UE specific manner) and the complexity of interference emulation at the UE. We note that the complexity of interference emulation at the UE need not be significantly higher than that of direct measurement/estimation. Note that in emulation, the UE calculates interference covariance matrix using estimated channel and pre-computed "representative" precoder (for example isotropic or an average across a precoder codebook subset). Even direct measurement of interference requires implementing covariance estimation algorithm so there need not be a large complexity saving. Further, the direct measurement in-fact measures interference resulting from a particular choice of precoders being employed by the interfering TPs during the time of measurement. The interference caused to the UE in the aftermath of scheduling will most likely result from a different choice of precoders. While the controller may do some compensation to account for this mismatch it is complicated by the fact that it does not know the algorithm adopted by the UE to do the direct measurement. Considering this the emulation method seems less biased since it assumes a random or average precoder.

Figure 3:
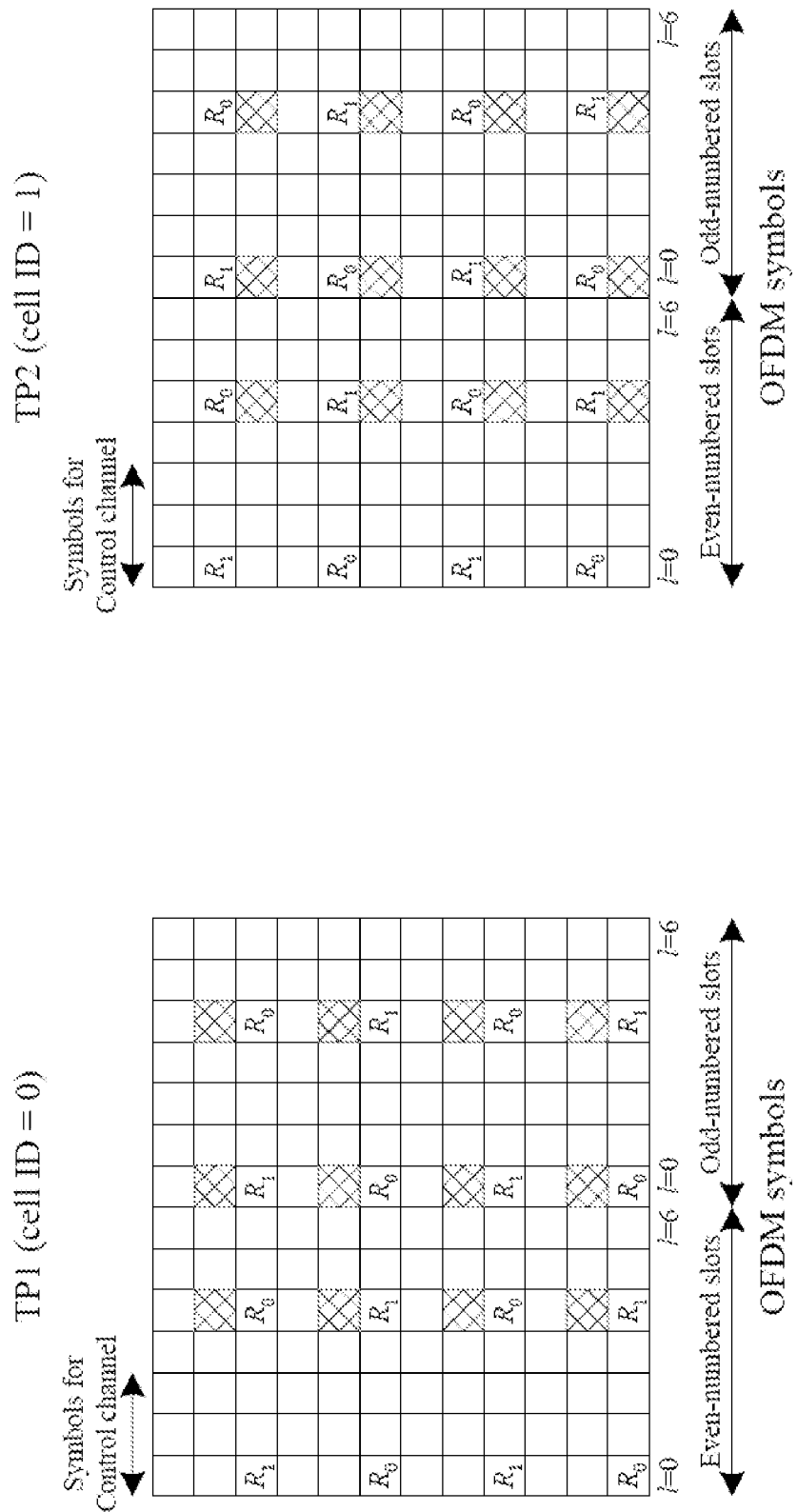
FIG. 3 depicts an example of CRS/PDSCH collisions for two TPs with different cell IDs. Both TPs have two CRS antenna ports.

3 PDSCH Mapping in CoMP 3.1 Problems of PDSCH Mapping in CoMP 3.1.1 CRS-PDSCH Collision Issues In order to support legacy (Release 8) UEs, the CRS has to be sent out periodically [3]. The 3GPP LTE cellular system supports CRS for up to 4 antenna ports. The CRS is positioned on the REs with a cell-specific frequency shift. Thus, if the CRS is transmitted on a subframe, the cell-specific frequency shift and the number of CRS ports specify all the CRS RE positions on this subframe. Therefore, for the cells or the TPs with different cell IDs, the CRS RE positions are different. This will cause the collision with data symbols transmitted on the PDSCH for the CoMP transmissions An example of 2 CoMP TPs is shown in FIG. 3. For the CoMP JT, the data have to be transmitted through both TPs. Then it is question according to which TP the PDSCH mapping should be configured by the network and assumed by the UE. On the other hand, for DPS, since CoMP transmission is transparent to the UE, the UE does not know which TP is eventually selected to serve him. Therefore, the UE does not have the knowledge of the exact CRS RE positions sent from this TP. Again, for DPS, although the UE may still assume the CRS positions based on the serving TPs where the UE receives the control signalling, the mismatch between the data symbol and CRS signal will cause the performance degradation. This seems more severe than the problem in JT as all the data symbols on the collided REs are missed for detection. There is no such collision issue for the CoMP CS/CB transmission scheme since in CS/CB as the transmission is always performed from the serving TP.

Figure 4:
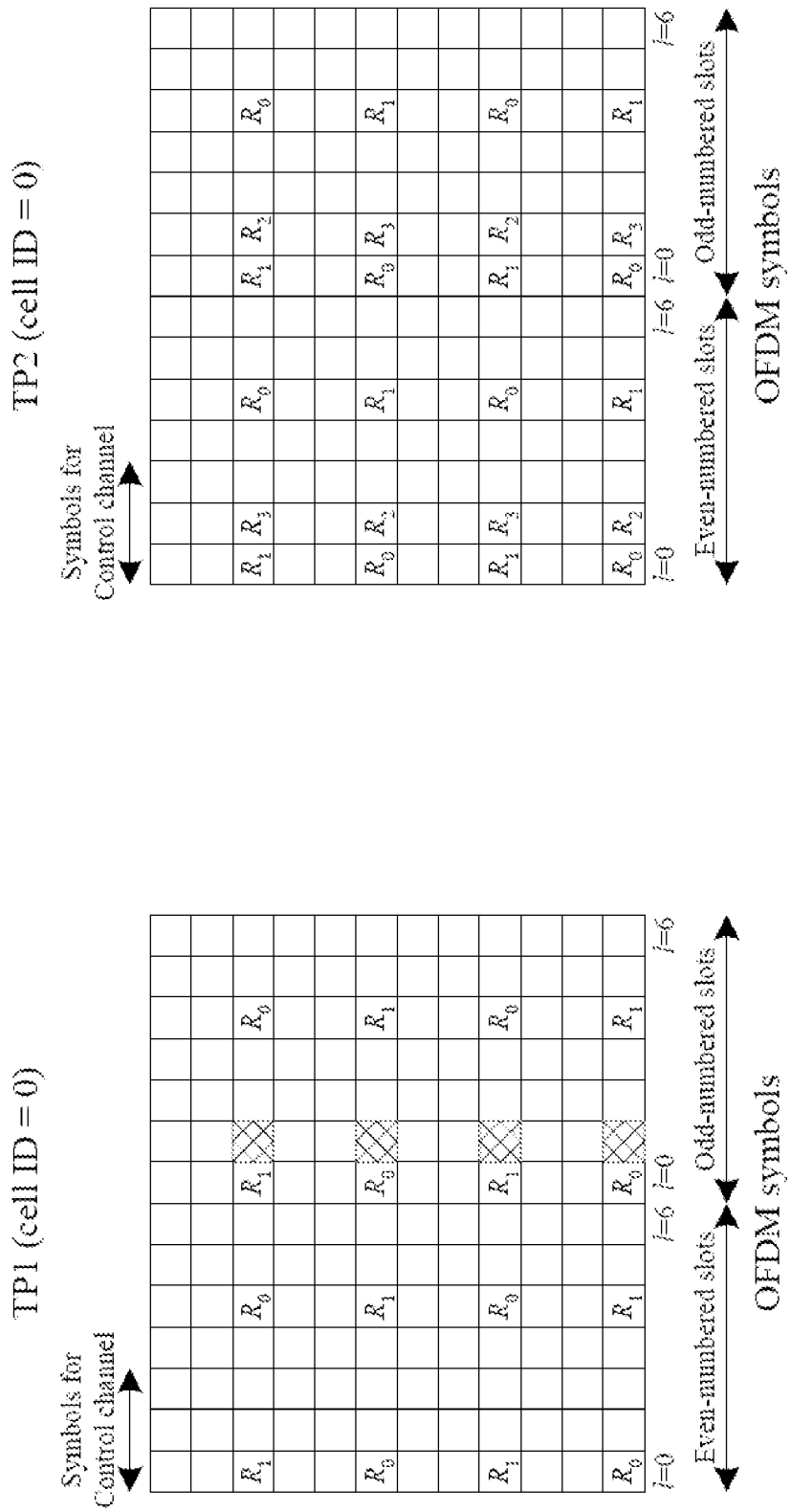
FIG. 4 depicts an example of CRS/PDSCH collisions for the TPs with the same cell IDs but different number of CRS antenna ports. One TP (left) has two CRS antenna ports and the other (right) has four antenna ports.

Such collision problem is also arise for the CoMP TPs with the same cell ID. When the number of antenna ports is the same among all the TPs with the same cell ID, there is no issue since the CRS positions are exactly the same for all the TPs. However, in some cases, e.g., the HetNet, the number of antenna ports may be different among the coordinated TPs. The low power nodes might be equipped with less antennas than the macro base station. For the CoMP TPs with the same cell ID but different number of antenna ports, i.e., asymmetric antenna settings, the CRS for the TP with more antenna ports will collide with the PDSCH for the TP with less antenna ports. An example is shown in FIG. 4, where the TP on the right has 4 antenna ports and the left has 2 antenna ports. We can see that the TP with 4 antenna ports has 4 CRS REs collided with the TP with 2 antenna ports on the data REs. Please note that the asymmetric antenna setting also exists for the CoMP TPs with different cell IDs. Since the coded QAM modulated symbol sequence is sequentially mapped to the PDSCH RE resources, if the number of CRS REs are different, the UE will not be able to decode the sequence at all due to the shifting of QAM symbol sequence. This is more severe than the CRS interference. If the number of CRS ports is fixed to be the same for different TPs in the cluster with the same cell ID even when the number of physical antennas for those TPs is different, then there is no collision issue. However, the CRS based channel estimation will have some performance degradation.

In the DL transmission there are some subframes which are configured as MBSFN subframes[2]. The CRS is not transmitted on those MBSFN subframes. Hence, CRS-PDSCH collision will also occur when the CoMP TPs do not have the same MBSFN subframe configurations. For example, at a time instance, one TP is on the non-MBSFN subframe with CRS transmitted on some REs, while at the same time, another TP in the measurement set is on the MBSFN subframe. The PDSCH mapping is then different for these two TPs on this subframe. Then if CoMP JT or DPS is realized among these two TPs, CRS-PDSCH collision occurs.

Figure 5:
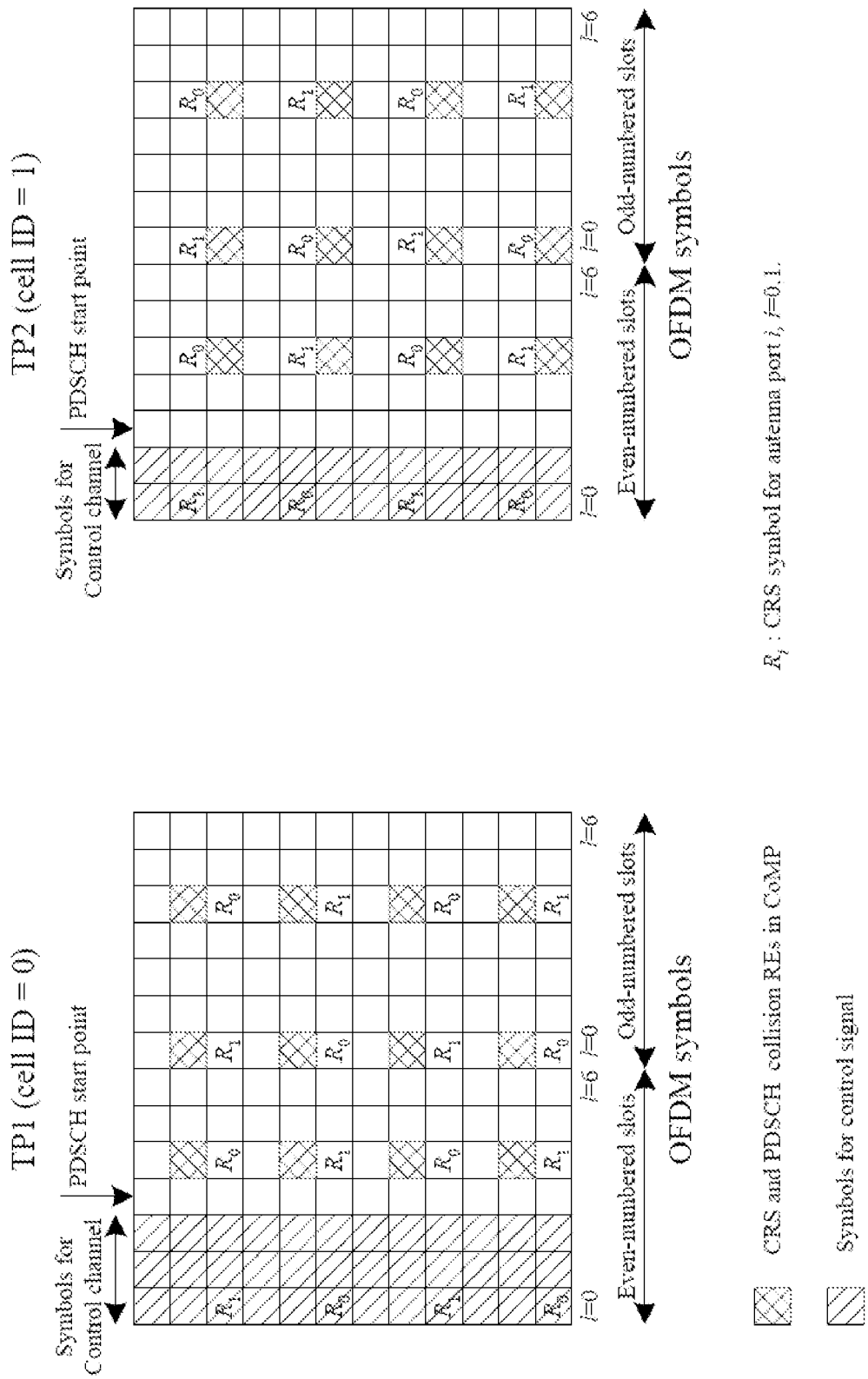
FIG. 5 depicts an example of PDSCH starting point mismatch for the TPs with different cell IDs.

[2]MBSFN stands for Multicast/Broadcast over a Single Frequency Network 3.1.2 PDSCH Starting Point In a subframe, the first several OFDM symbols are allocated for sending control signaling, i.e., PDCCH, in LTE and LTE-A systems. The data channel PDSCH starts from the next OFDM symbol after PDCCH. For different transmission points, the numbers of OFDM symbols for PDCCH transmission can be different. Consequently, the starting points for PDSCH may be different. Again, since the coded QAM sequence is sequentially mapped to the PDSCH RE resources, the mismatch of PDSCH starting points among TPs in the CoMP set will cause the issue for both joint transmission and DPS in CoMP transmissions if UE does not know the start point of PDSCH. An example is shown in FIG. 5.

3.2 PDSCH Mapping in CoMP

We can see due to the aforementioned issues of PDSCH RE mapping in CoMP, some assumptions have to be made or some signaling is needed to solve the problems in order to make CoMP work properly in LTE-A systems. We now consider the following alternatives on the PDSCH mapping in CoMP.

3.2.1 Alignment with the Serving Cell

All the information and signalling of the serving cell are known to the UE. Thus, a simple solution without additional signaling is described as follows The CoMP UE assumes that the PDSCH mapping is always aligned with that in the serving cell including the PDSCH starting point and the CRS RE positions. The network follows this assumption to perform PDSCH mapping for CoMP transmissions. No additional control signal is needed as the UE always assumes such PDSCH mapping in the single-cell non-CoMP transmissions. However, this mutual assumption needs to be specified so that the network will follow this principle for the PDSCH mapping to allocate QAM data symbols when CoMP JT or DPS transmissions are scheduled, which is different from the single-cell non-CoMP transmissions.

For CoMP JT, if the PDCCH region (number of OFDM symbols for PDCCH) from a co-scheduled CoMP TP (other than the serving cell) is larger than that in the serving cell, with above PDSCH mapping approach, the PDSCH data symbols in the PDCCH mismatching region are only transmitted from the serving cell, i.e., non-CoMP transmissions, and will experience the interference from PDCCH signals from this co-scheduled CoMP TP. If the PDCCH region from a co-scheduled CoMP TP (other than the serving cell) is smaller than that in the serving cell, then no data will be transmitted on the PDSCH REs in the PDCCH mismatching region at the co-scheduled CoMP TP. Those REs can be muted.

For DPS CoMP scheme, if the selected TP for transmission is the serving cell TP, there is no PDCCH (or PDSCH starting point) mismatch. Thus there is no spectral efficiency loss. If the PDCCH region of the selected TP is larger than that of the serving cell, the PDSCH mapping is still configured as that of the serving cell, but with the QAM symbols in the PDCCH mismatching region being punctured. Since the selected transmit TP is transparent to the UE and the UE does not have the knowledge of the QAM symbol being punctured in the PDCCH mismatching region, UE receives totally irrelevant PDCCH signals on these RE positions to decode. If the PDCCH region of the selected TP is smaller than that of the serving cell, since the UE assumes that the PDSCH mapping is aligned with that of the serving cell, the OFDM symbol or symbols after PDCCH of the selected TP that collides with the PDCCH region of the serving cell will not be used for data transmission. The network will configure the PDSCH starting point of the selected transmit TP same as that of the serving TP.

Similarly for the CRS/PDSCH collision case. For CoMP JT, on all CRS RE positions in the transmit TPs other than the serving cell, fully CoMP joint transmission among all CoMP transmit TPs cannot be achieved. Only JT on the TP subset is possible. The data symbols on these RE positions will experience the interference from the CRS transmissions in other TPs in the CoMP transmission set. For the CRS RE positions of the serving cell, no data will be transmitted at other TPs in the CoMP set as the UE assumes that these RE are the CRS. For CoMP DPS, if the selected transmitting TP is different from the serving cell, the network will puncture (not to transmit) the symbols on the CRS positions of the selected transmit TP and skip the REs that are the CRS RE positions of the serving cell for the data symbols.

We can see that this approach incurs no additional signal thus has the minimum standard impact. However the spectral efficiency is low due to possible waste of resources and strong interference in the CRS-PDSCH RE collision region.

3.2.2 Collision Avoidance with Semi-Static Signaling

Several methods to solve the CRS/PDSCH collision issue are summarized in [4]. Among the transparent approaches described in [4], one scheme is to transmit the data for CoMP UEs on the MBSFN subframe in which there is no CRS transmission. This restriction limits the resource utilization for CoMP transmissions. The second solution is not to transmit data at all for the CRS OFDM symbols, meaning that the entire OFDM symbol containing the CRS for any TP in the CoMP set is excluded for data transmissions in CoMP systems. Obviously this approach wastes the resources and degrades the spectral efficiency performance for CoMP. Another transparent solution is just to perform the CoMP for the TPs with the same cell ID. However, it has been agreed that CoMP transmissions can be performed for the cells with different cell IDs. Also as aforementioned, single cell ID CoMP does not solve the collision problem for the CoMP TPs with different number of antenna ports. We can see that all these approaches are not efficient. There are also some other non-transparent approaches, e.g., signaling the UE the CoMP transmission TP or TPs (for DPS or JT) so that the UE knows the active TP set and the data can be allocated to the REs without collision. Another non-transparent approach is dynamic or semi-static CRS mapping pattern signalling Also since the CoMP transmission is dynamic scheduled and UE specific, the signaling of the active CoMP TP set or CRS mapping patterns will significantly increase the DL signaling overhead.

We now provide some efficient CoMP transparent solutions to address the CRS/PDSCH collision issue. We know that in the CoMP system, the network configures and signals the UE the TP set for which UE measures the channels. Such TP set is called measurement set. The CoMP transmission TP or TPs will be selected from the measurement set. First we assume that the UE knows the number of CRS antenna ports for each TP in the measurement set and provide the following resource mapping approach.

The union of the REs allocated for CRS transmissions for the TPs in the measurement set of a CoMP UE are excluded from the resource mapping for the CoMP (JT or DPS) data transmissions in PDSCH for this UE. In other words, the resource mapping on the PDSCH for a CoMP UE should avoids any RE position that is allocated for a CRS transmission in any TP in the measurement set for this UE.

Figure 6:
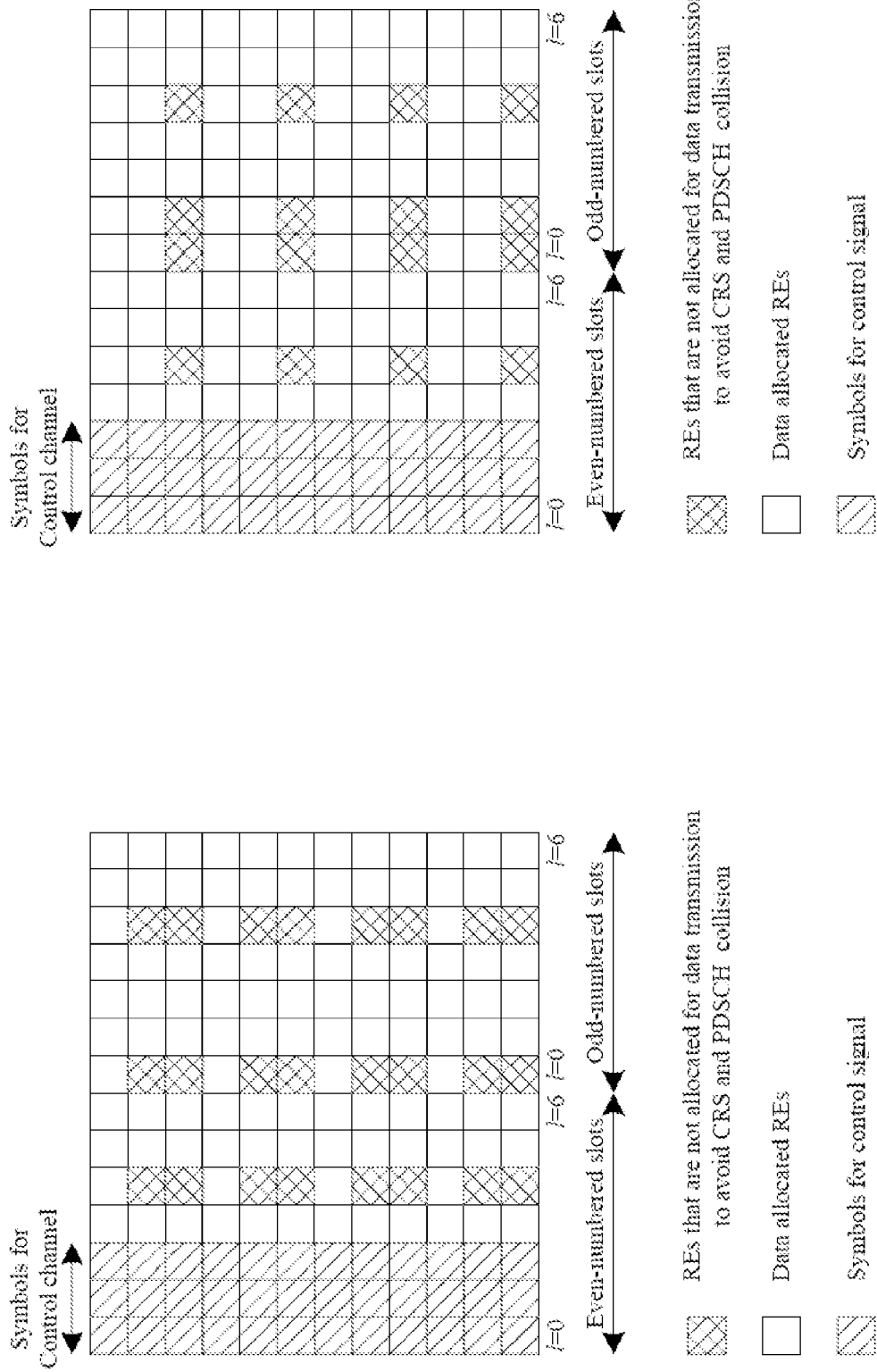
FIG. 6 depicts resource mapping for CRS/PDSCH collision avoidance. Left: the resource mapping for the example in FIG. 3. Right: the resource mapping for the example in FIG. 4.

If the CoMP UE already knows the CRS information of TPs in its measurement set, the union of the CRS RE positions are then known to the UE. Thus the resource mapping on an RB is known to both network and the UE for transmission and detection. Also since the measurement set is usually small, the union of the CRS RE positions are less than the number of REs on the OFDM symbols containing a CRS for any TP. Therefore, the proposed transparent approach is more efficient than the existing approaches. Although this resource mapping is user specific, however, it does not increase much complexity on the network side as the network already manages the user specific CoMP transmissions dynamically. Moreover, this proposed approach can be applied to both the collision cases with the different cell ID and with the same cell ID but asymmetric antenna settings. The resource mapping solutions for the examples shown in FIG. 3 and FIG. 4 are illustrated on the left portion and right portion of FIG. 6, respectively. We assume that for each example there are only two TPs in the measurement set. We can see that from the left plot of FIG. 6, the union of CRS RE positions in PDSCH from two TPs with different cell ID are excluded for data mapping. On the right side, the union of the CRS RE positions excluded from the data transmission are essentially the same CRS REs for the TP with 4 CRS antenna ports. Therefore, for the TPs with the same cell ID, the solution can be rewritten as follows.

For the CoMP TPs with the same cell ID, the resource mapping for either JT or DPS CoMP data transmissions on the PDSCH for the CoMP UE is according to that of the TP with the maximum number of CRS antenna ports in the measurement set of this UE.

A variation of the proposed scheme is that the network broadcasts the CRS pattern information, which may include the cell ID or the frequency shift of the CRS RE position, and the number of CRS antenna ports, of all TPs in the CoMP cluster, the largest TP set for CoMP network based on the network deployment.[3] For the CoMP cluster with the same cell ID, since the cell ID is known to the UE, only the maximum number of CRS antenna ports is broadcasted to all UEs served by the CoMP cluster. Then the resource mapping for all CoMP UE is to avoid the union of the CRS RE positions for all TPs in the CoMP cluster with different cell ID, or the CRS RE positions according to the TP with the maximum number of CRS antenna ports. This approach is not UE specific, thus does not introduce additional complexity on the resource mapping on the network side. However, this approach may be only suitable for the scenario of the same cell ID CoMP as the excluded RE positions are at most the ones corresponding to the largest possible number, which is 4, of CRS antenna ports. For the CoMP cluster with different cell IDs, this approach is not efficient since the size of the CoMP cluster is usually much larger than the size of the UE specific CoMP measurement set. With a large size of CoMP cluster, this approach might eventually exclude the any OFDM symbol which contains a CRS RE for some TP.

[3]CoMP measurement set is a UE specific subset of TPs in the CoMP cluster.

CRS is mainly used for LTE (release 8) UEs for channel estimation and data symbol detection. In LTE Advanced (release 10 or later) systems, a UE uses CSI-RS to estimate the channel. The UE may not monitor or detect the CRS. Thus, the UE may not be able to know the frequency shift of CRS position or the number of CRS antenna ports, consequently the CRS RE mapping pattern, for the TPs in its measurement set. For this case, we then propose the following alternatives.

(Alt-CRS-1.1): The network semi-statically signals the UE the CRS frequency shift for each TP and maximum number of CRS antenna ports of the TPs in the UE's measurement set. The UE then assumes that the CRS pattern for each TP follows the CRS positions corresponding to the maximum number of CRS antenna ports. The PDSCH mapping at the base station for the CoMP data transmission thus follows the same assumption of the union of CRS positions for this CoMP UE or according to the PDSCH mapping of the serving cell, which is known to the UE with a semi-statically signalled indicator.

(Alt-CRS-1.2): The network semi-statically signals the UE the CRS frequency shift and the number of CRS antenna ports for each TP in the UE's measurement set. The UE can then obtain the CRS pattern for each TP in the measurement set. The PDSCH mapping at the base station for the CoMP data transmission thus follows the same assumption of the union of CRS positions for this CoMP UE or according to the PDSCH mapping of the serving cell.

(Alt-CRS-1.3): The network semi-statically signals the UE the cell ID and the number of CRS antenna ports for each in the measurement set. The UE can then obtain the CRS pattern for each TP in the measurement set. The PDSCH mapping at the base station for the CoMP data transmission thus follows the same assumption of the union of CRS positions for this CoMP UE or according to the PDSCH mapping of the serving cell.

With the knowledge of CRS frequency shift and number of CRS antenna ports, the UE knows the CRS pattern or RE positions. Also the CRS RE positions for less antenna ports are the subset of that for more antenna ports. Knowing the cell ID and the CRS pattern of each TP in the measurement set, the UE is able to detect CRS signal and can then perform interference cancellation to improve the receiver performance if some data are transmitted in some PDSCH REs at one TP that are collided with the CRS REs on the other TP in the CoMP set. The information of MBSFN subframes, MBSFN subframe configuration, at each TP in the measurement set can also be signalled to the CoMP UE semi-statically. For above three alternatives, we may reduce the number of muted CRS REs, consequently increase the spectral efficiency by only excluding the union of CRS REs of the TPs in the measurements that are on the non-MBSFN subframe from the PDSCH mapping.

To obtain the union of the CRS RE patterns at the CoMP UE, the network first semi-statically signal the frequency shift, $v_m$, and number of CRS ports, $p_m$, m=1, . . . , M for M TPs in the measurement set as in Alt-CRS-1.2 listed above. Denote the set $\mathcal{A}_m^{RE}(v_m, p_m)$ as the set of CRS RE positions of the mth TP in the measurement set. The union of all CRS REs in the measurement set is then given by $\cup_m \mathcal{A}_m^{RE}(v_m, p_m)$. In Alt-CRS-1.1, the maximum number of CRS antenna ports of the TPs in the measurement set, i.e., $p^* = \max_m p_m$ is signalled to the UE. The set of CRS REs for TP-m assumed at the UE is then $\mathcal{A}_m^{RE}(v_m, p^*)$. Note that we have $\mathcal{A}_m^{RE}(v_m, p_m) \subseteq \mathcal{A}_m^{RE}(v_m, p^*)$. Then for Alt-CRS-1.1, all CRS REs in the $\cup_m \mathcal{A}_m^{RE}(v_m, p^*)$ are excluded from the PDSCH mapping. For Alt-CRS-1.3, if the cell-ID of the TPs in the CoMP set is signalled to the UE, the UE is then able to deduce the CRS frequency shift $v_m$. With the number of CRS ports or maximum number of CRS ports informed to the UE, the PDSCH mapping in Alt-CRS-1.3 is again to avoid the union of the CRS REs, i.e., $\cup_m \mathcal{A}_m^{RE}(v_m, p_m)$ or $\cup_m \mathcal{A}_m^{RE}(v_m, p^*)$, as in Alt-CRS-1.2 or Alt-CRS-1.1. Denote $I_m(t) \in \{0, 1\}$ as the indicator of MBSFN subframe on the mth subframe for the mth TP in the measurement set, i.e., $I_m(t)=1$ indicates that the subframe-t of TP-m is a MBSFN subframe, and $I_m(t)=0$ otherwise. If the MBSFN subframe configurations are signalled to the CoMP UE, the UE is able to obtain $I_m(t)$, $\forall m, t$. Then the union of the CRS REs on the subframe

TABLE 2

CoMP PDSCH RE mapping indication with only the semi-statical signalling (1-bit).

| CoMP PDSCH mapping indicator | CoMP PDSCH RE Mapping |
|---|---|
| 0 | according to that of the serving cell |
| 1 | PDSCH RE mapping on a subframe excluding the union of the CRS REs of the TPs in the measurement set on that subframe | t, $\cup_{m|I_m(t)=0} \mathcal{A}_m^{RE}(v_m, p_m)$ or $\cup_{m|I_m(t)=0} \mathcal{A}_m^{RE}(v_m, p^*)$, are excluded from the PDSCH RE mapping on the tth subframe in Alt-CRS-1.1, Alt-CRS-1.2, or Alt-CRS-1.3.

To also support the CoMP CS/CB transmissions which the PDSCH mapping is configured according to that for the anchor serving cell, we then use one additional bit along with the signals of the CRS RE patterns to the UE to indicate that the PDSCH RE mapping is according to the serving cell or around all CRS positions in the measurement set, as shown in Table 2. Note that the union of the CRS REs is the union of the existing CRS REs in that subframe if MBSFN subframe configurations of the TPs in the measurement set are known to the UE.

Figure 9:
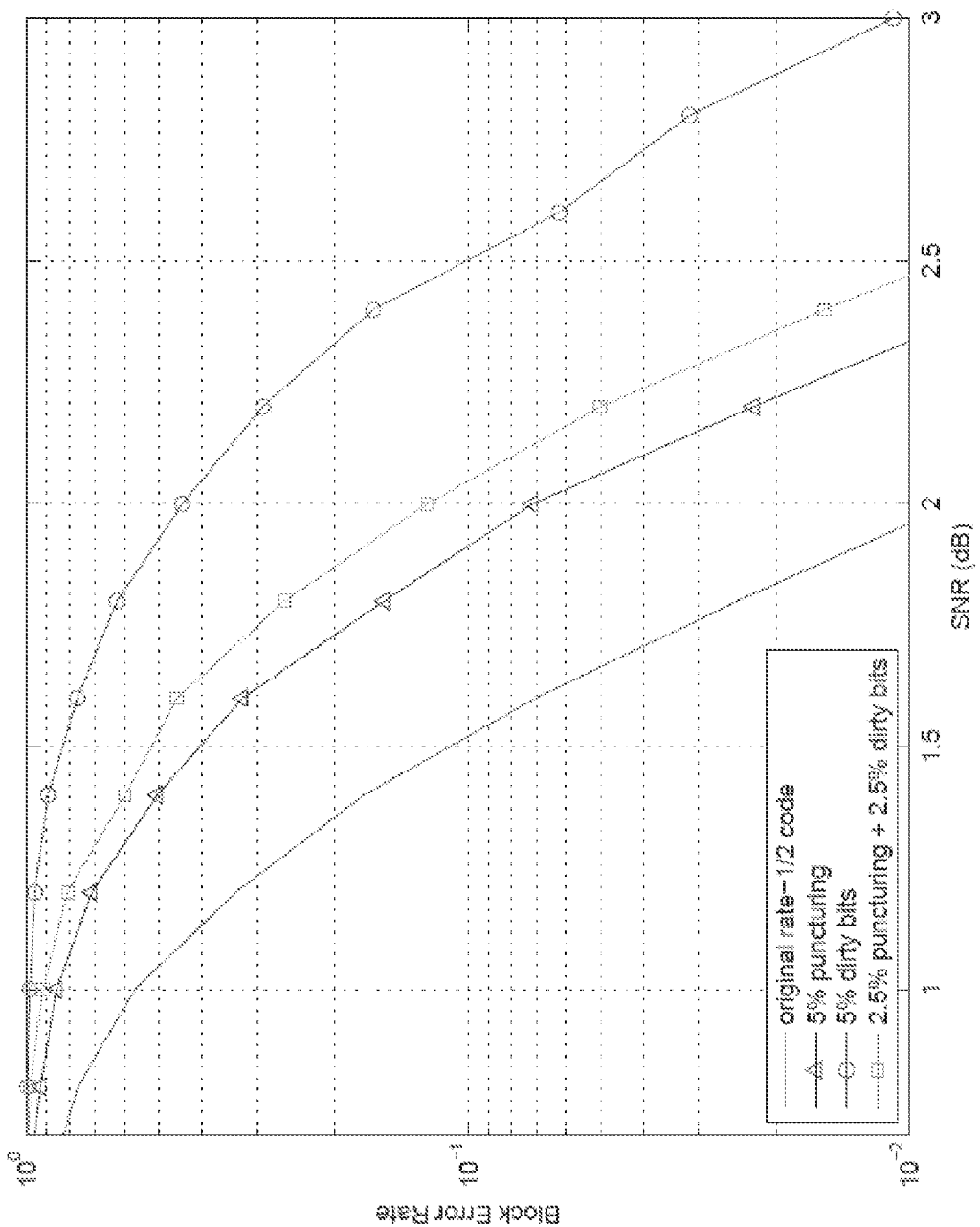
FIG. 9 depicts BLER performance of a rate-½ LTE turbo code with puncturing (muting) and/or dirty received bits.

We now discuss the benefit of the above semi-static approaches over the default approach which always assumes the PDSCH mapping of the anchor serving cell. In the default approach, eNB configures PDSCH RE mapping for any transmitting TP as that for the serving cell. In DPS, when a TP other than the serving TP in the measurement set is transmitting, the PDSCH on the CRS positions for this TP will not be used for data transmission. If the UE assumes the serving cell PDSCH mapping, it would still try to decode the data on these CRS positions which actually do not carry any data information, resulting in receiving some noise signals, so called dirty data/bits. A simple simulation is then performed to evaluate the performance of these scenarios. A length-576 information bits are encoded using the LTE turbo code of rate-½. We assume there are total 5% coded bits affected by CRS/PDSCH collisions. We compare the performance of this rate-½ code in AWGN channel with puncturing 5% coded bits (PDSCH muting), 5% dirty received data (purely noise), and 2.5% puncturing plus 2.5% dirty data. Puncturing or muting 5% coded bits represents the above approaches that avoid the transmission on the collided REs. The case of 2.5% punctured bits plus 2.5% dirty data represents the DPS with default PDSCH mapping. The case of 5% dirty data represents the DPS scenario in which the TP other than the serving TP is transmitting on a non-MBSFN subframe, while the serving TP is on its MBSFN subframe. The block error rate (BLER) results of these cases are shown in FIG. 9. We can see that with 5% dirty bits, there is significant performance degradation. With a half of dirty bits on the collided RE positions, there is still an observable performance loss compared to RE muting.

Figure 7:
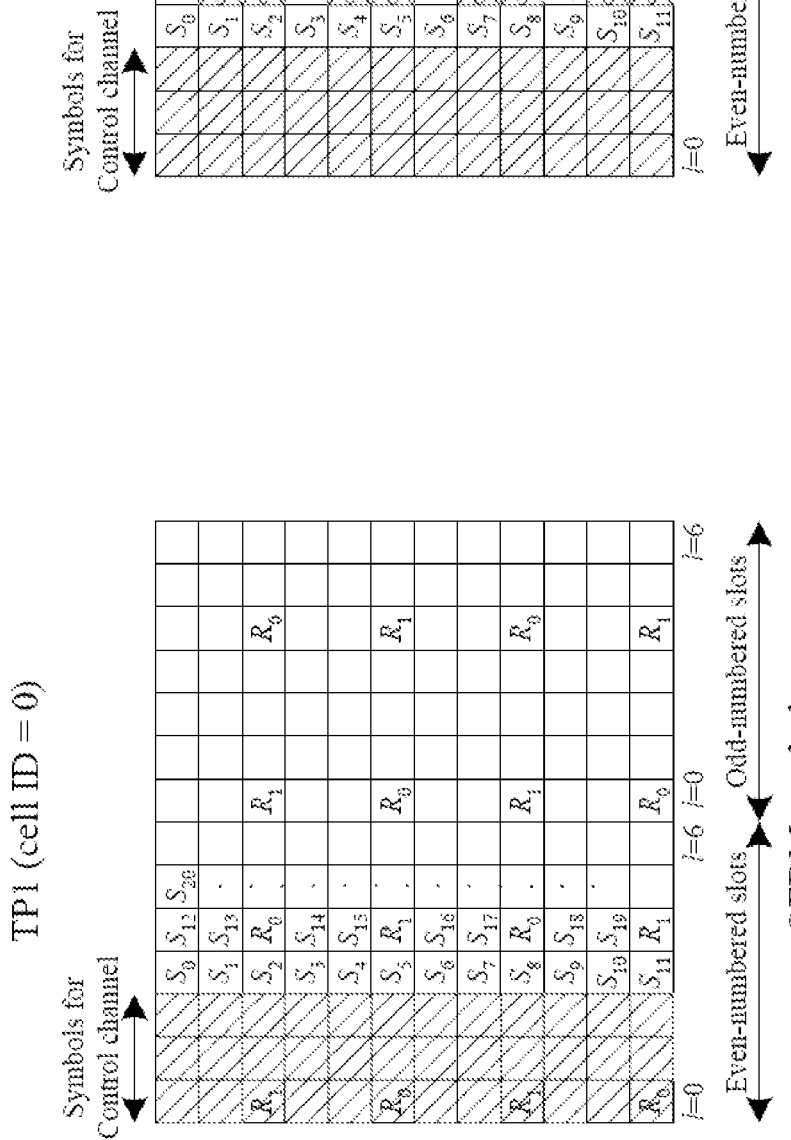
FIG. 7 depicts data symbol allocations for CRS/PDSCH collision avoidance. Left: Original data symbol allocation assuming the serving TP single cell transmissions. Right: Data symbol allocations for CoMP transmissions (JT or DPS) with CRS/PDSCH collision avoidance, method 1.

We now consider the data symbol sequence mapping or allocations for the proposed resource mapping with CRS/PDSCH collision avoidance. For any method with CRS/PDSCH collision avoidance, the number of REs in an RB for the CoMP data transmission will be less than that for conventional single-cell or CoMP CS/CB transmissions. Then the assigned transmission block size (TBS) should be changed corresponding to the change of available RE for data transmission to maintain the same effective data rate for the same modulation and coding scheme (MCS). However, to accommodate the change of assigned TBS for the proposed schemes for CRS/PDSCH collision avoidance, we might need to change the entire TBS table in [5] eventually which will have a large impact on the specification. Therefore, we propose the following approach. The TBS assignment still follows the same TBS table in [5] and obtain the same data symbol sequence, e.g. $S_0, S_1, \ldots$. We take the case in the FIG. 3 as the example. We first allocate the data symbol for the UE according to the data transmission on the serving cell or TP as shown in the left part of FIG. 7. For the resource mapping with CRS/PDSCH collision avoidance, as shown in the right part of FIG. 7, the network or CoMP active TP or TPs simply puncture and do not transmit the originally allocated data symbols that collides with the CRS RE positions on other TPs in the CoMP measurement set of this UE. Since the proposed resource mapping for CRS/PDSCH collision avoidance does not exclude many REs for data transmission, the slight increase of the final effective information rate will have nearly no impact on the receiver performance.

Figure 8:
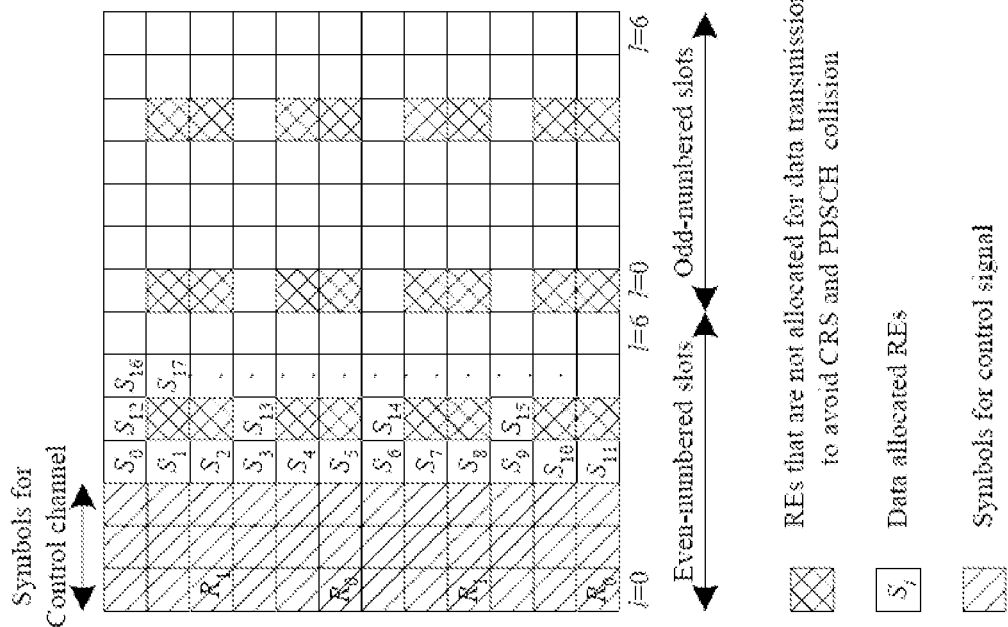
FIG. 8 depicts data symbol allocations for CRS/PDSCH collision avoidance. Left: Original data symbol allocation assuming the serving TP single cell transmissions. Right: Data symbol allocations for CoMP transmissions (JT or DPS) with CRS/PDSCH collision avoidance, method 2.
Figure 8:
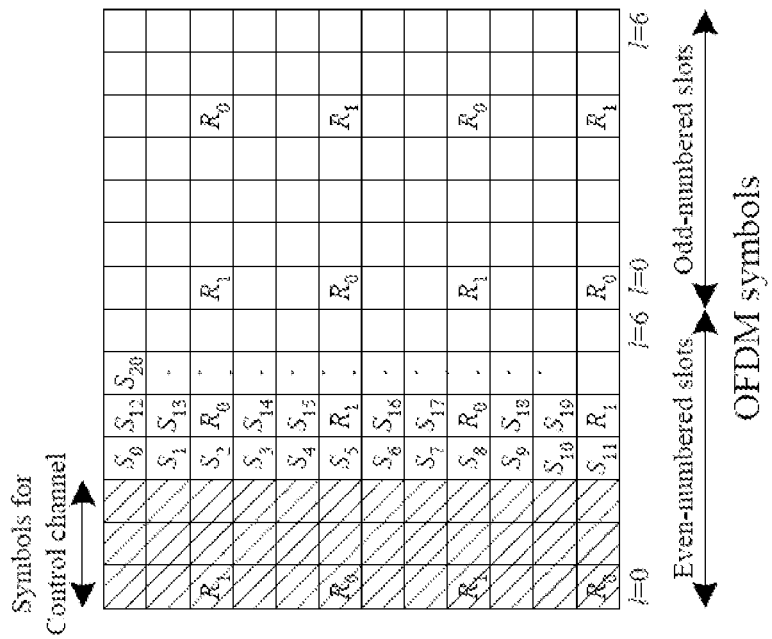

The alternative approach is shown on the right side of FIG. 8, in which the network sequentially allocates the data symbols to the REs without placing any symbol on the collided RE. Then with this approach, some data symbols at the end of symbol sequence will not be allocated or transmitted. Although the final effective information rate is the same as that in the previous approach, due to sub-block interleaving, puncturing consecutive data symbols at the end of sequence may incur relatively larger performance degradation.

The PDSCH starting point might also need to be signalled to the UE in a semi-static manner. The following schemes thus take care of the PDSCH starting point, if this is necessary.

The network semi-statically informs the UE the union of the CRS RE positions in the CoMP measurement set of the UE. The network also semi-statically configures and signals the UE the starting point of the PDSCH. The network then configures the QAM symbol to PDSCH RE mapping from the configured semi-static PDSCH starting point. Then network either follows the serving cell CRS pattern for the sequential QAM symbol to PDSCH RE mapping or perform the QAM symbol to PDSCH RE mapping sequentially to avoid the union of CRS positions in the CoMP measurement set.

The network semi-statically informs the UE either the frequency shift of CRS position or the cell ID, and the number of antenna ports for each TP in the CoMP measurement set of the UE. The network also semi-statically configures and signals the UE the starting point of the PDSCH. The network then configures the QAM symbol to PDSCH RE mapping according to the semi-statically configured PDSCH starting point. And the network either follows the serving cell CRS pattern for the sequential QAM symbol to PDSCH RE mapping or configures the QAM symbol to PDSCH RE mapping sequential to avoid the union of CRS positions in the CoMP measurement set.

Note that in above approaches the PDSCH start point is assumed to be signaled to UE separately. We can also consider the following semi-static approach with a 2-bit indicator. Semi-statically signalling the PDSCH start point can then be embedded to this approach without increasing the number of bits for the CoMP PDSCH mapping indicator.

The network semi-statically informs the UE either the frequency shift of CRS position or the cell ID, and the number of CRS ports for each TP in the CoMP measurement set of the UE. The network also semi-statically configures and signals the UE the starting point of PDSCH and which CRS pattern for the PDSCH mapping. The network then configures the QAM symbol to PDSCH RE mapping according to the PDSCH mapping of one TP or the PDSCH mapping by excluding the union of CRS RE position of the TPs in the measurement set on that subframe, which is informed to the UE with a semi-statically signaled indictor from the network. The network also configures the PDSCH mapping according to the semi-statically configured PDSCH starting point if it is necessary, which is known to the UE with the same indicator.

This can be implemented by tagging the CRS information and PDSCH starting point with the TP index. Then the network signals the UE to indicate the index of TP which the network will configure the PDSCH mapping according to. Since there are at most 3 TPs in a CoMP measurement set in current standard, a two-bit indicator is enough to carry such information. We can also include the option of the PDSCH mapping around of all the CRS REs in a subframe as shown in Table 3. This approach is particularly useful when the cell range expansion is applied to some UEs in the HetNet scenario, in which the network may always configure the macro cell eNB for the DL data transmission. As aforementioned, the indicator in above table can be applied to PDSCH RE mapping to avoid the CRS/PDSCH collision only, or also including the PDSCH starting point. For the case of indicator being 11, the PDSCH starting point can be the largest or the smallest number of the PDSCH starting points among that of the TPs in the measurement set.

TABLE 3

CoMP PDSCH RE mapping indication with semi-statical signaling only (2-bit).

| CoMP PDSCH mapping indicator | CoMP PDSCH RE Mapping |
| --- | --- |
| 00 | PDSCH RE mapping according that of TP-1 in the measurement set (assuming it is serving cell without loss of generality) |
| 01 | PDSCH RE mapping according that of the TP-2 in the measurement set |
| 10 | PDSCH RE mapping according that of the TP-3 in the measurement set |

TABLE 3-continued

CoMP PDSCH RE mapping indication with semi-statical signaling only (2-bit).

| CoMP PDSCH mapping indicator | CoMP PDSCH RE Mapping |
|---|---|
| 11 | PDSCH RE mapping on a subframe excluding the union of CRS RE positions of the TPs in the measurement set on that subframe |

3.2.3 Dynamic Signaling of the PDSCH Mapping

Although the network can semi-statically inform the UE the PDSCH start point, however for DPS, if there is a mismatch between the PDSCH start points for the TPs in the CoMP measurement set, it will cause spectral efficiency loss and reduce the performance gain of CoMP. To improve the CoMP performance, the PDSCH mapping information including the starting point and CRS pattern can be dynamically conveyed to the UE. We then list the following alternatives to achieve this goal and support all CoMP transmission schemes with a small signal overhead.

(Alt-CRS-2.1)

The network semi-statically informs the UE either the frequency shift of the CRS position or the cell ID, and the number of CRS antenna ports for each TP in the CoMP measurement set of the UE. Then the network dynamically signals the UE the PDSCH starting point that will be configured for the PDSCH mapping. The network then configures the QAM symbol to PDSCH RE mapping from the configured PDSCH starting point. And the network either follows the serving cell CRS pattern for the sequential QAM symbol to PDSCH RE mapping or configures the QAM symbol to PDSCH RE mapping sequential to avoid the union of CRS positions in the CoMP measurement set.

(Alt-CRS-2.2)

The network semi-statically informs the UE either the frequency shift of CRS position or the cell ID, and the number of CRS antenna ports for each TP in the CoMP measurement set of the UE. The network also semi-statically signals the UE which TP or which CRS pattern for the PDSCH mapping. Then the network dynamically signals the UE the PDSCH starting point that will be configured for the PDSCH mapping. The network then configures the QAM symbol to PDSCH RE mapping starting from the dynamically configured PDSCH starting point and the sequential PDSCH mapping according to the semi-statical configured CRS pattern or TP for PDSCH mapping.

(Alt-CRS-2.3)

The network semi-statically informs the UE either the frequency shift of CRS position or the cell ID, and the number of CRS antenna ports for each TP in the CoMP measurement set of the UE. Then the network dynamically signals the UE the PDSCH starting point that will be configured for the PDSCH mapping and which TP or which CRS pattern for the PDSCH mapping. The CRS pattern for the PDSCH can be dynamically conveyed to the UE with the indices of the TPs or the CRS patterns in the CoMP measurement set that have been semi-statically signaled to the UE. The network then configures the QAM symbol to PDSCH RE mapping starting from the dynamically configured PDSCH starting point and the sequential PDSCH mapping according to the dynamic configured CRS pattern or TP for PDSCH mapping.

We can see the approach Alt-CRS-2.1 is a simply extension of the previous semi-static approach with the 1-bit indicator dynamically sent to UE. In the approach Alt-CRS-2.2, the PDSCH RE mapping around the CRS is still following the semi-static approach, but the PDSCH starting point is dynamically signaled to the UE. The approach Alt-CRS-2.3 is the extension of the semi-static approach with the 2-bit indicator in Table 3 becoming dynamically signaled to the UE. However, with dynamical signaling, in Alt-CRS-2.3, it is not efficient to configure the same PDSCH mapping when the indicator is 11 as that in Table 3 for the semi-static approach. With first three indicator values in Table 3, i.e., the indicator being 00, 01, 10, the PDSCH mapping issues for DPS is already handled. Only the mapping issues for CoMP JT are left, where more than one TP will be involved in the transmission. For this case, in the hybrid approach with dynamical signaling available, instead of mapping avoiding the CRS positions for all TPs in the cell, it is better to perform the PDSCH RE mapping sequentially occupying all possible REs. Just on the collided CRS REs, only single TP or the subset of TPs (for 3TP JT) involve in the transmissions. We then have the following alternative scheme.

(Alt-CRS-2.3A) The network semi-statically informs the UE either the frequency shift of CRS position or the cell ID, and the number of CRS antenna ports for each TP in the CoMP measurement set of the UE. The network then informs the UE dynamically the CRS pattern that the PDSCH mapping (and the PDSCH starting point if needed) will follow by conveying the indices corresponding to them or indicating the UE the PDSCH mapping (1) excluding the intersection of all CRS RE set of the TPs in the measurement on that subframe or (2) simply

TABLE 4

CoMP PDSCH RE mapping indication with dynamic indicator signaling (2-bit approach).

| CoMP PDSCH mapping indicator | CoMP PDSCH RE Mapping |
|---|---|
| 00 | PDSCH RE mapping according that of the serving cell (assume TP-1 in the measurement set) |
| 01 | PDSCH RE mapping according that of the TP-2 in the measurement set |
| 10 | PDSCH RE mapping according that of the TP-3 in the measurement set |
| 11 | PDSCH RE mapping by (1) excluding the intersection of all CRS RE set of the TPs in the measurement on that subframe or (2) simply occupying all of the CRS REs of the TPs in the measurement on that subframe | occupying all of the CRS REs of the TPs in the measurement on that subframe.

Note that (1) and (2) described in Alt-CRS-2.3A are two options of this approach. The dynamic indicator for Alt-CRS-2.3A is then given in Table 4. Mathematically, in Alt-CRS-2.3A, when the indicator being 11, the sets of CRS REs $\underline{A} = \cap_m A_m^{RE}(v_m, p_m)$ (or $\underline{A} = \cap_{m|I_m(t)=0} A_m^{RE}(v_m, p_m)$) is excluded from PDSCH mapping or $\underline{A} = \emptyset$.

Figure 10:
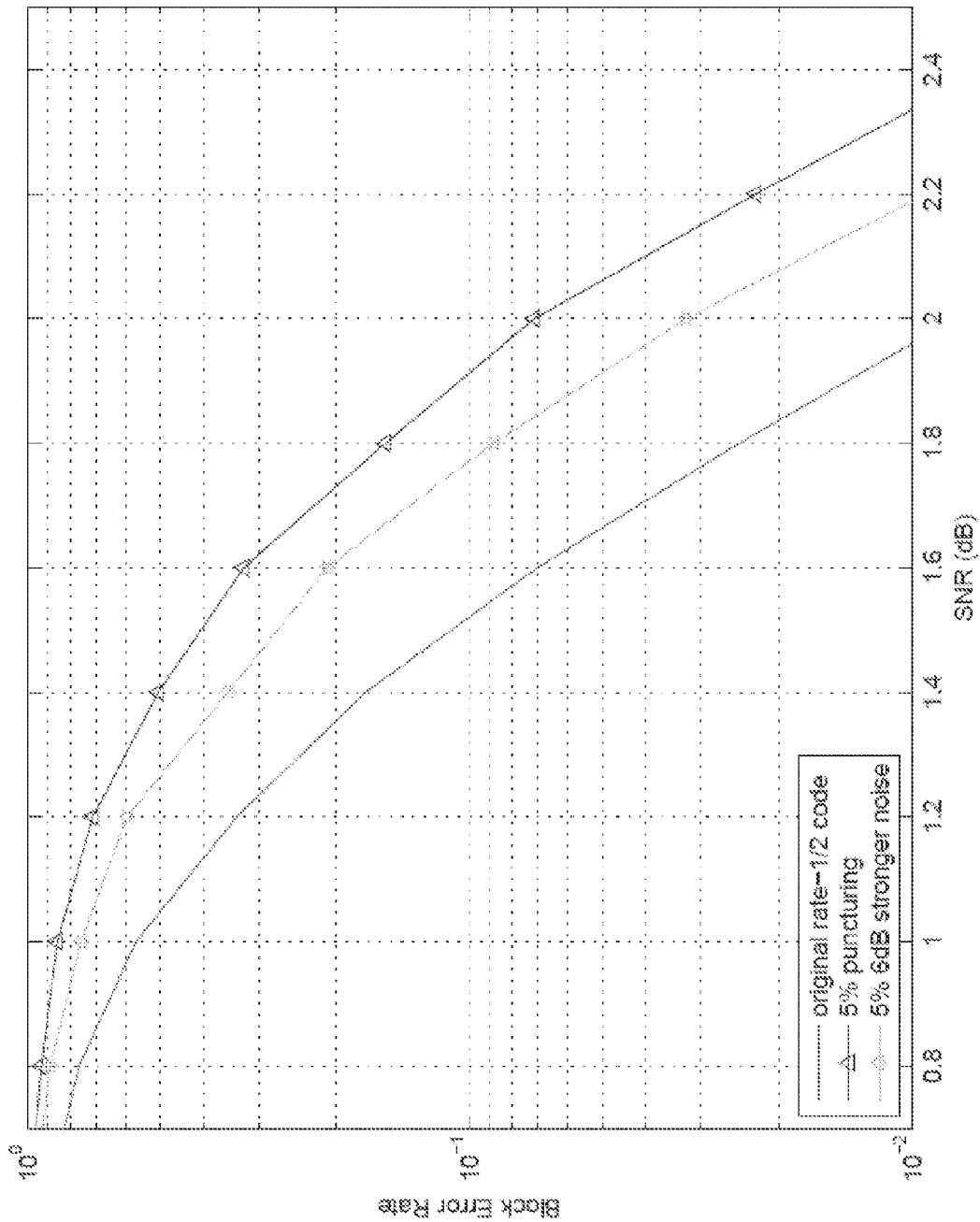
FIG. 10 depicts BLER performance of a rate-½ LTE turbo code with puncturing (muting) and partial data with stronger noise.

Since the effective code rate of Alt-CRS-2.3A will be lower than the PDSCH mapping which avoids the union of CRS positions for the TPs in the joint transmission, there will be a performance gain even with the strong interference. To illustrate this, we use the previous simple example to compare the performances of PDSCH mapping avoiding the CRS in CoMP JT (puncturing/muting) or occupying the CRS REs with transmitting on single TP or subset of CoMP TPs (experiencing stronger noise) using the case of rate-½ LTE turbo code in AWGN channel as previously described. The results are shown in FIG. 10. We can see that even with a 6 dB stronger noise, we still observe the performance gain over the puncturing case, meaning that for CoMP JT it is better to transmit the coded symbol on the RE positions for some TPs if they are collided with the CRS REs for other TPs.

If the CRS information of all the CoMP TPs is available at the CoMP UE and CRS interference cancellation can be implemented, the approach Alt-CRS-2.3A certainly provides better performance than the PDSCH RE mapping around the CRS RE positions. Or the UE can at least cancel the interference of the CRS from the serving cell. If the interfering CRS is too strong, it is then up to UE to decide where to demodulate the CRS collided data symbol or not. When the PDSCH mapping indicator is set to be 11, the PDSCH starting point can be set with assuming the minimum or maximum size of PDCCH regions (or PDCCH OFDM symbols) of the TPs in the measurement set, which are semi-statically informed to the UE.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Further System Details A

In this paper we consider Coordinated Multi-Point transmission and reception (CoMP) schemes over heterogenous wireless networks. These heterogenous networks comprise of a set of disparate transmission points serving multiple users on an available spectrum. To enable better resource allocation, the set of transmission points is partitioned into several clusters and each cluster is assigned a set of users that it should serve. Joint resource allocation (scheduling) using all transmission points in a cluster and a suitable CoMP scheme is possible due to the availability of fibre backhaul within each cluster. Our contributions in this paper are in the design of approximation algorithms for this joint scheduling problem. We show that the joint scheduling problem is strongly NP-hard and then design an approximation algorithm that yields a constant factor approximation. To further obtain algorithms with a substantially reduced complexity, we adopt an iterative framework and design three polynomial time approximation algorithms, all of which yield constant factor approximations for a fixed cluster size. The design of these algorithms also reveals a useful connection between the combinatorial auction problem with fractionally sub-additive valuations and the submodular set-function maximization problem. We then conduct a thorough evaluation using models and topologies developed by the 3GPP standards body to emulate such networks. Our evaluations show that by exploiting all the feedback provisioned in the standard in a certain manner and by using well-designed algorithms, significant CoMP gains can be realized over realistic heterogenous networks.

1 Introduction

Explosive growth in data traffic is a reality that network operators must provision for. The most potent approach to cater to this explosive growth is considered to be cell splitting in which multiple transmission points are placed in a cell traditionally covered by a single macro base station. Each such transmission point can be a high power macro enhanced base-station (a.k.a. eNB) but is more likely to be a low-power remote radio head or a pico base-station of more modest capabilities. The networks formed by such disparate transmission points are referred to as heterogeneous networks (a.k.a. HetNets) and are rightly regarded as the future of all next generation wireless networks. In order to keep the network expenditure in check most operators are considering HetNet architectures wherein a majority of transmission points (TPs) have very limited functionalities but rely instead on directions from the eNBs via a reliable ultra-low latency backhaul. In such a HetNet architecture the basic coordination unit is referred to as a cluster which consists of multiple TPs and can include more than one eNB. Coordinated resource allocation within a cluster must be accomplished at a very fine time scale, typically once every millisecond. This in turn implies that all TPs within each cluster must have fibre connectivity and hence impacts the formation of clusters (a.k.a. clustering) which is dictated by the available fibre connectivity among transmission points. On the other hand, coordination among different clusters is expected to be done on a much slower time-scale since it is assumed that inter-cluster message exchange can happen only using a much slower backhaul such as an X2 interface of about 20 ms round trip delay. Consequently, in such an architecture each user can be associated with only one cluster and the association of users to clusters depends mainly on user locations, which in turn depend on their mobilities and hence this association needs to be done once every few seconds.

In this paper our interest is on the dynamic coordination within each cluster. Since user association and clustering happen on time scales which are several orders of magnitude coarser, we assume them to be given and fixed. The design of joint resource allocation within a cluster of multiple TPs has been considered in depth in recent years. These techniques range from assuming global knowledge of user channels states and their respective data at a central processor, thereby converting the cluster into one broadcast channel with global knowledge, to one where only user channel states are shared among TPs in a cluster so that each user can be served by only one TP but downlink transmission parameters (such as beamvectors and precoders) can still be jointly optimized. In addition, distributed methods to realize joint scheduling as well as the impact of imperfections in the transmitter end channel state information have also been investigated. Our goal in this work is to verify whether the wisdom accrued from all these works about substantial performance gains being possible if interference is managed via coordinated resource allocation is valid over real HetNets. The challenges over realistic networks are threefold, namely, (i) the need for low complexity resource allocation algorithms that can be implemented in very fine time-scales (ii) incomplete/inaccurate channel feedback from the users and (iii) real propagation environments. Clearly, since no such real HetNets have yet been deployed, we have to rely on accurate modeling. Here, to capture the latter two challenges, we rely on the emulation of such networks as specified by the 3GPP LTE standards body which has considered HetNet deployments in a very comprehensive manner. In this context, we note that essentially all next generation wireless networks will be based on the LTE standard which is periodically updated (with each update referred to as a release) to support more advanced schemes. Coordinated transmission and reception (CoMP) among multiple TPs in a cluster will be supported starting from Release 11 and feedback and feedforward signalling procedures to support such scheduling as well as detailed channel models and network topologies have been finalized.

The simplest "baseline" approach then to manage dynamic coordination within a cluster is to associate each user with one TP within the cluster from which it receives the strongest average signal power (referred to as its "anchor" TP), and then perform separate single-point scheduling for each TP with full reuse. While this approach might appear simplistic and deficient with respect to degree of freedom metrics which assume a fully connected network, over realistic networks it captures almost all of the average spectral efficiency gains promised by cell splitting. Indeed, after a year long simulation campaign conducted by all leading wireless companies as part of the Release 11 standardization, the expectation from more sophisticated joint scheduling schemes in a cluster is mainly to achieve significant gains in the 5 percentile spectral efficiency while retaining the average spectral efficiency gains of the baseline, thereby attaining the goal of improved user experience by ensuring good data rates irrespective of user location. Towards realizing this expectation, we focus on CoMP schemes where each user receives data from at-most one TP on any time-frequency resource. This restriction is indeed useful since receiving data simultaneously from multiple TPs on the same frequency requires additional feedback from the users to enable coherent combining, which unfortunately has not yet been provisioned for. We then formulate a resource allocation problem which incorporates the main constraints and proceed to develop a constant-factor approximation algorithm based on a novel approach referred to as format balancing. To meet the low-complexity benchmark, we adopt an iterative framework and develop three approximation algorithms all of which yield constant factor

TABLE 1

Spectral Efficiency (bps/Hz) of joint versus baseline single-point scheduling. Relative gains are over the baseline.

| Scheduling scheme | DPS | CS/CB | Baseline |
|---|---|---|---|
| cell average | 1.9187 (−8.01%) | 1.9955 (−4.33%) | 2.0858 (0%) |
| 5% cell-edge | 0.0281 (−36.57%) | 0.0292 (−34.09%) | 0.0443 (0%) |
| cell average* | 2.3981 (−1.30%) | 2.4461 (0.67%) | 2.4297 (0%) |
| 5% cell-edge* | 0.0976 (21.09%) | 0.0898 (11.41%) | 0.0806 (0%) | approximations for a fixed cluster size. In the process we discovered a useful connection between the combinatorial auction problem with fractionally sub-additive valuations and the submodular set-function maximization problem, which is of independent interest.

Evaluations of our approximation algorithms over simplistic fully connected networks with i.i.d. Rayleigh fading and perfect channel state information, proved their superiority over other heuristics and demonstrated their competitive performance. However, system evaluations using the methodology fully conforming to the 3GPP standard revealed quite a different picture. Indeed, this is depicted in Table 1, wherein the first two columns pertain to joint scheduling and the third one considers the single-point scheduling baseline alluded to earlier. In the results given in the first two rows we only exploited the per-user channel feedback provisioned in the standard and the results were catastrophic in that joint scheduling yielded much worse results than the single-point scheduling baseline. Detailed investigations led to insights that are captured as observations in the sequel. Eventually, we could obtain the results in the last two rows of Table 1, where we see that substantial 5% spectral efficiency gains have been achieved via joint scheduling. This improvement is also fully compliant with the feedback provisioned in the standard, as is explained in the sequel.

2 System Model

We consider a downlink heterogenous network with universal frequency reuse wherein a cluster of B coordinated transmission points (TPs) can simultaneously transmit on N orthogonal resource blocks (RBs) during each scheduling interval. Each TP can be a high power macro base station or a low power radio remote head and can be equipped with multiple transmit antennas. Each RB is a bandwidth slice and represents the minimum allocation unit. Together, these B TPs serve a pool of K active users. We assume a typical HetNet scenario (as defined in the 3GPP LTE Rel. 11) wherein these B TPs are synchronized and can exchange messages over a fibre backhaul. Next, the signal received by a user k on RB n can be written as $$y_k(n) = \sum_{j=1}^{B} H_{k,j}(n) x_j(n) + z_k(n), \quad (1)$$

where $H_{k,j}(n)$ models the MIMO channel between TP j and user k on RB n (which includes small-scale fading, large-scale fading and path attenuation), while $z_k(n)$ is the additive circularly-symmetric Gaussian noise vector and $x_j(n)$ denotes the signal vector transmitted by TP j on the $n^{th}$ RB.[1]

[1] Notice that the model in (1) holds for the case of orthogonal frequency-division-multiple access (OFDMA) if the maximum signal delay is within the cyclic prefix.

Considering the signal transmitted by a TP, we impose the common restriction that each TP is allowed to serve at-most one user on each RB.[2] Then, the signal transmitted by TP q on RB n can then be expressed as $$x_q(n) = W_{q,u}(n) b_{q,u}(n), \quad (2)$$

where $b_{q,u}(n)$ is the complex symbol vector transmitted by TP q on RB n intended for some user u using the precoding matrix $W_{q,u}(n)$ which satisfies a norm (power) constraint. The number of symbols in $b_{q,u}(n)$, the constellation(s) from which these symbols are drawn and the underlying outer code as well as the precoding matrix $W_{q,u}(n)$ (whose columns represent directions in a signal space along which the symbols are sent), all represent parameters which are included in the scheduling decision obtained as the output of a scheduling algorithm. Notice that due to the broadcast nature of the wireless channel, the signal intended for user u is received as interference by all other co-scheduled users as well on RB n. This factor significantly complicates the scheduling problem since it is no longer meaningful to define a per-user utility that depends on the resources allocated to that user alone.

[2] This restriction is referred to as SU-MIMO per TP and provides robustness against imperfect and coarse channel feedback from the users.

In order to abstract out the details while retaining usefulness, we adopt the notion of a transmission hypothesis. In particular, we define $\underline{e} = (u, f, b)$ as an element, where u: $1 \leq u \leq K$ denotes a user, $f \in \mathcal{F} = \{1, \ldots, J\}$ denotes a format drawn from a finite set $\mathcal{F}$ of such formats having a cardinality $J = |\mathcal{F}|$ and b: $1 \leq b \leq B$ denotes a transmission point (TP). Each such element $\underline{e} = (u, f, b)$ represents a transmission hypothesis, i.e., the transmission from TP b using format f intended for user u. Next, we let $\underline{\Omega} = \{\underline{e} = (u, f, b) : 1 \leq u \leq K, f \in \mathcal{F}, 1 \leq b \leq B\}$ denote the ground set of all possible such elements. For any such element we adopt the convention that $$\underline{e} = (u, f, b) \Rightarrow u_{\underline{e}} = u, f_{\underline{e}} = f, b_{\underline{e}} = b,$$

Then, we let $r : 2^{\underline{\Omega}} \times \mathcal{N} \rightarrow \mathbb{R}_+$ denote the weighted sum rate utility function. For any subset $\underline{A} \subseteq \underline{\Omega}$ and any RB $n \in \mathcal{N}$, $r(\underline{A}, n)$ yields the weighted sum rate obtained upon transmission using the hypotheses in $\underline{A}$ on RB n. The weight associated with each element $\underline{e}$ (or equivalently user $u_{\underline{e}}$) is an input to the scheduler and is in turn updated using the resulting scheduling decision. In order to disallow the possibility of the same TP serving multiple users on the same RB as well as the possibility of the same user receiving data from multiple TPs on the same RB, we adopt the convention that $$\exists \underline{e} \neq \underline{e}' \in \underline{\mathcal{A}} : u_{\underline{e}} = u_{\underline{e}'} \text{ or } b_{\underline{e}} = b_{\underline{e}'} \Rightarrow r(\underline{\mathcal{A}}, n) = 0. \quad (3)$$

Further, for any $\underline{\mathcal{A}} \subseteq \underline{\Omega}$ we can expand $$r(\underline{\mathcal{A}}, n) = \sum_{\underline{e} \in \underline{\mathcal{A}}} r_{\underline{e}}(\underline{\mathcal{A}}, n), \quad (4)$$

where $r_{\underline{e}}(\underline{\mathcal{A}}, n)$ is the weighted rate obtained for element $\underline{e}$ or equivalently the user $u_{\underline{e}}$ and where we set $r_{\underline{e}}(\underline{\mathcal{A}}, n)=0 \forall \underline{e} \in \underline{\mathcal{A}}$ whenever $r(\underline{\mathcal{A}}, n)=0$. Notice from (1) and (2) that on any RB and for any given choice of transmission hypotheses we have a Gaussian interference channel formed by the TPs and users contained in those hypotheses. Implicit in this formulation is the assumption that given the choice of transmission hypotheses on an RB, the aforementioned parameters (such as the precoders, constellations etc.) are also determined, using which we can compute the weighted sum rate over the corresponding Gaussian interference channel. Throughout this paper, we will assume that the weighted sum rate utility function satisfies a natural sub-additivity assumption which says that the rates of elements in a set will not decrease if some elements are expurgated from that set. In particular, for any subset $\underline{\mathcal{A}} \subseteq \underline{\Omega}$ and any element $\underline{e} \in \underline{\mathcal{A}}$, defining $\underline{\mathcal{C}} = \underline{\mathcal{A}} \setminus \underline{e}$ we assume that for each $n \in \mathcal{N}$ $$r_{\underline{e}''}(\underline{\mathcal{C}}, n) \geq r_{\underline{e}''}(\underline{\mathcal{A}}, n), \forall \underline{e}'' \in \underline{\mathcal{C}}. \quad (5)$$

We consider three different coordinated multi-point transmission/reception schemes.

Coordinated Silencing/Coordinated Beamforming (CS/CB): In this scheme each scheduled user can be served data only by its pre-determined "anchor" TP. In other words, the user set $\{1, \ldots, K\}$ is partitioned into B non-overlapping sets $\cup_{j=1}^{B} \mathcal{G}_j$, where $\mathcal{G}_j$ is the set of users whose anchor TP is the $j^{th}$ TP. Consequently, any $\underline{e} \in \underline{\Omega}$ must satisfy $u_{\underline{e}} \in \mathcal{G}_{b_{\underline{e}}}$. Interference mitigation can be achieved via proper selection of overlapping UEs (i.e. UEs co-scheduled on the same resource block) and their transmission formats. Notice that silencing, i.e., muting some TPs on an RB is also possible as a special case.

Dynamic Point Selection (DPS): In this scheme a user can be served by any TP. Interference mitigation can be achieved as in CS/CB via proper user and format selection. In addition, DPS allows for an increase in received signal strength by exploiting short-term fading via per-RB serving TP selection, where by serving TP we mean the TP that serves data to the user.

Constrained Dynamic Point Selection (CDPS): In this constrained form of DPS, a user can be served by any TP as long as only one TP serves it on all its assigned RBs. Notice that the un-constrained DPS allows for more scheduling freedom and offers the possibility to exploit the frequency selectivity in the short-term fading. CDPS can potentially reduce the signaling overhead at the expense of limited scheduling flexibility. Both DPS and CDPS include CS/CB as a special case.

We now proceed to formulate our resource allocation problem as in (6).

$$\max_{\substack{X_{\underline{\mathcal{A}},n} \in \{0,1\}, \\ \forall \underline{\mathcal{A}} \subseteq \underline{\Omega}, n \in \mathcal{N}}} \sum_{\underline{\mathcal{A}} \subseteq \underline{\Omega}} \sum_{n \in \mathcal{N}} r(\underline{\mathcal{A}}, n) X_{\underline{\mathcal{A}},n} \quad (6)$$

$$\sum_{\underline{\mathcal{A}} \subseteq \underline{\Omega}} X_{\underline{\mathcal{A}},n} \leq 1, \forall n$$

$$\left(\sum_{n \in \mathcal{N}} X_{\underline{\mathcal{A}},n}\right)\left(\sum_{n \in \mathcal{N}} X_{\underline{\mathcal{B}},n}\right) = 0, \forall \underline{\mathcal{A}}, \underline{\mathcal{B}} \subseteq \underline{\Omega} : \exists \underline{e} \in \underline{\mathcal{A}}, \underline{e}' \in \underline{\mathcal{B}} \ \& \ u_{\underline{e}} = u_{\underline{e}'}, f_{\underline{e}} \neq f_{\underline{e}'};$$

$$\left(\sum_{n \in \mathcal{N}} X_{\underline{\mathcal{A}},n}\right)\left(\sum_{n \in \mathcal{N}} X_{\underline{\mathcal{B}},n}\right) = 0, \forall \underline{\mathcal{A}}, \underline{\mathcal{B}} \subseteq \underline{\Omega} : \exists \underline{e} \in \underline{\mathcal{A}}, \underline{e}' \in \underline{\mathcal{B}} \ \& \ u_{\underline{e}} = u_{\underline{e}'}, b_{\underline{e}} \neq b_{\underline{e}'}, \text{ [for CDPS]}$$

Note that in (6) the first constraint ensures that at-most one transmission hypotheses is selected on each RB. The second constraint ensures that each scheduled user is assigned only one format. The third constraint which is imposed only in the case of CDPS is that a scheduled user is served by only one TP over all its assigned RBs.

Before proceeding to design approximation algorithms for (6) and deriving their guarantees, we point out the flexibility inherent in the formulation in (6). Each format can for instance be defined as the number of symbol streams assigned, in which case the constraint of at-most one format per scheduled user captures the main constraint in the LTE standard which is that each scheduled user be assigned the same number of streams on all its assigned RBs. In this case, on any RB for a given transmission hypotheses we have a Gaussian interference channel where the number of streams for each transceiver link is now given so that the rate utility can be evaluated assuming point-to-point Gaussian codes for each link and any suitable transmit precoding such as SLNR based, interference alignment based, etc. Alternatively, each format can also include up-to two QAM constellations in which case we incorporate another LTE constraint that each scheduled user can be assigned at-most two distinct QAM constellations.[3] Our first result is that (6) is unlikely to be optimally solved by a low (polynomial) complexity algorithm.

[3] The mapping of each constellation to one or more streams can be done using the codeword-to-stream mapping defined in LTE.

Theorem 1.

The optimization problem in (6) is NP hard. Specifically, for any fixed N≥1 & J≥2, the optimization problem in (6) is strongly NP hard. For any fixed B≥1 & J≥2, the optimization problem in (6) is NP hard.

In Algorithm I, referred to as the format balancing algorithm, we offer an approximation algorithm for (6). This format balancing algorithm is conceptually simple in that the best transmission hypotheses is determined separately for each RB. Then, a balancing step is performed on a per-user basis to ensure that each scheduled user is assigned one format each. The balancing is done in a "polite" manner in that a user is assigned a format and then scheduled only on RBs where it was originally assigned a higher format. The notion adopted here is that a lower format represents a less aggressive choice with respect to the other co-scheduled users. We will show that Algorithm I offers a constant approximation under the following additional assumption on the utility function that is satisfied by some physically meaningful utilities.

Assumption 1.

For any subset $\underline{\mathcal{A}} \subseteq \underline{\Omega}$ and any element $\underline{e} \in \underline{\mathcal{A}}$, define an element $\underline{e}' = (u_e, f, b_e)$ for any format $f \leq f_e$ and construct the set $\underline{\mathcal{B}} = \underline{e}' \underline{\mathcal{A}} \setminus \underline{e}$. Then, for each $n \in \mathcal{N}$ we have that $$r_{\underline{e}''}(\underline{\mathcal{B}}, n) \geq r_{\underline{e}''}(\underline{\mathcal{A}}, n), \forall \underline{e}'' \in \underline{\mathcal{B}} : \underline{e}'' \neq \underline{e}'$$

$$r_{\underline{e}'}(\underline{\mathcal{B}}, n) \geq \alpha_{f, f_e} r_{\underline{e}}(\underline{\mathcal{A}}, n), \tag{7}$$

for some constant $\alpha_{f, f_e} \in [0, 1]$ where $\alpha_{f, f} = 1$, $\forall f$. This assumption says that upon replacing any one element in $\underline{\mathcal{A}}$ with another element containing the same user and TP but having a smaller (less aggressive) format, the rate obtained for any other element in $\underline{\mathcal{A}}$ will not decrease and the rate obtained for the newly inserted element will be at-least a fraction of the one obtained previously for the replaced element. Further, specializing this assumption to the case of $\underline{\mathcal{C}} = \underline{\mathcal{A}} \setminus \underline{e}$, we get that the sub-additivity condition in (5) is true.

Next, to derive the approximation factor of Algorithm I, we define a matrix $M \in \mathbb{R}_+^{J \times J}$, with $M_{i,j}$ denoting its $(i,j)^{th}$ member, as follows $$M_{i,j} = \begin{cases} \alpha_{i,j}, & \text{If } i \leq j \\ 0 & \text{Otherwise} \end{cases} \tag{8}$$

Notice that since M is upper triangular with unit diagonal elements, its determinant is equal to 1 so that $M^{-1}$ exists. Then, we let $M^{-1} 1 \succeq 0$ denote the case when $M^{-1}$ exists and the vector $M^{-1} 1$ is componentwise non-negative.

Theorem 2.

The Format Balancing algorithm offers a solution to (6) that has a worst-case guarantee of at-least $\Delta$ when the assumption in (7) holds and where $\Delta$ satisfies $$\Delta \geq \frac{1}{J}$$

and is obtained as the solution to a linear program, $$\Delta = \min_{x \in \mathbb{R}_+^J, \theta \in \mathbb{R}_+} \{\theta\} \tag{9}$$

$$\text{s.t. } 1^T x = S$$

$$\sum_{j=1}^{J} M_{i,j} x_j \leq \theta S, \forall i,$$

for any arbitrarily fixed constant S>0. In the special case when $M^{-1} 1 \succeq 0$, $\Delta$ can be obtained in closed form as $$\Delta = \frac{1}{1^T M^{-1} 1}. \tag{10}$$

Proof.

Let us analyze the performance of Algorithm I supposing that the assumption in (7) (and hence (5)) holds. Clearly the weighted sum rate $\sum_{n \in \mathcal{N}} r(\underline{\mathcal{A}}^{(n)}, n)$ is an upper bound on the optimal value of (6) since the per-user format constraint is ignored in the former case. Next consider format-balancing for a user $u \in \{1, \ldots, K\}$ which is present in an element of at-least one set $\underline{\mathcal{A}}^{(n)}$ for some $n \in \mathcal{N}$. Then for such a user u, for each format f let us define $$\tilde{R}(u, f) = \sum_{n: \exists \underline{e} \in \underline{\mathcal{A}}^{(n)}: u_e = u \ \& \ f_e = f} r_{\underline{e}}(\underline{\mathcal{A}}^{(n)}, n), \tag{11}$$

with the understanding that $\tilde{R}(u, f) = 0$ if such an element cannot be found on any RB n. Note then that the weighted rate obtained for user u (after step 5 of Algorithm I) is equal to $\sum_{f=1}^{J} \tilde{R}(u, f)$ and indeed $\sum_{u=1}^{K} \sum_{f=1}^{J} \tilde{R}(u, f) = \sum_{n \in \mathcal{N}} r(\underline{\mathcal{A}}^{(n)}, n)$. Invoking the second inequality in (7) we can deduce that for each format f, the weighted rate R(u, f) computed in Algorithm I satisfies $$R(u, f) \geq \sum_{f': f' \geq f} \alpha_{f, f'} \tilde{R}(u, f'). \tag{12}$$

Thus upon selecting $\tilde{f} = \arg \max_{f: 1 \leq f \leq J} R(u, f)$ we can ensure that user u gets a rate at-least $$\max_{f: 1 \leq f \leq J} \sum_{f': f' \geq f} \alpha_{f, f'} \tilde{R}(u, f'). \tag{13}$$

In addition, since as per $\{\underline{\mathcal{B}}^{(n)}\}_{n \in \mathcal{N}}$ user u is scheduled only on RBs where it was originally assigned a format no less that $\tilde{f}$, invoking (7) and (5) we can deduce that on each such RB the rates of co-scheduled users are not decreased. Consequently, irrespective of whether the format balancing is done sequentially across users or in parallel for all users, we can conclude that the worst-case approximation guarantee of Algorithm I for the given instance is at-least $$\min_u \frac{\max_{f: 1 \leq f \leq J} \sum_{f': f' \geq f} \alpha_{f, f'} \tilde{R}(u, f')}{\sum_{f=1}^{J} \tilde{R}(u, f)} = \tag{14}$$

$$\min_u \frac{\max_{f: 1 \leq f \leq J} \sum_{f'=1}^{J} M_{f, f'} \tilde{R}(u, f')}{\sum_{f=1}^{J} \tilde{R}(u, f)}$$

where the outer minimization is over all users who were scheduled on at-least one RB as per the sets $\{\underline{\mathcal{A}}^{(n)}\}_{n \in \mathcal{N}}$. Thus, the worst-case approximation guarantee of Algorithm I ove r all instances can be lower bounded using the solution to the problem $$\min_{x \in IR_+^J} \frac{\max_{f: 1 \leq f \leq J} \sum_{f'=1}^{J} M_{f,f'} x_{f'}}{\sum_{f=1}^{J} x_f} \quad (15)$$

Clearly, since $M_{f,f}=1$, $\forall f$ we see that the minimal value in (15) can be no less than $1/J$. The remaining parts of the theorem follow upon invoking Proposition 1.

Proposition 1.

For any matrix $M \in IR_+^{J \times J}$, where $J \geq 1$ is a fixed positive integer, the solution to $$\min_{x \in IR_+^J} \frac{\max_{i: 1 \leq i \leq J} \sum_{j=1}^{J} M_{i,j} x_j}{\sum_{i=1}^{J} x_i} \quad (16)$$

can be found by solving a quasi-convex minimization problem. More importantly, the solution to (16) can also be found by solving the following linear program for any constant $S>0$, $$\min_{x \in IR_+^J, \theta \in IR_+} \{\theta\} \quad (17)$$

s.t. $1^T x = S$ $$\sum_{j=1}^{J} M_{i,j} x_j \leq \theta S, \forall i.$$

Furthermore, in the special case of $M^{-1} 1 \succeq 0$, the solution to (16) can be obtained in closed form as $$\min_{x \in IR_+^J} \frac{\max_{i: 1 \leq i \leq J} \sum_{j=1}^{J} M_{i,j} x_j}{\sum_{i=1}^{J} x_i} = \frac{1}{1^T M^{-1} 1} \quad (18)$$

Proof.

Consider the optimization problem in (16) and suppose $\tilde{x}$ is an optimal solution with $\max_{i: 1 \leq i \leq J} \sum_{j=1}^{J} M_{i,j} \hat{x}_j = \hat{\alpha}$ and $1^T \hat{x} = \hat{S}$ so that $$\frac{\hat{\alpha}}{\hat{S}}$$

is the optimal value for (16). Then, consider the following convex minimization problem for any constant $S>0$, $$\min_{x \in IR_+^J; 1^T x = S} \left\{ \frac{1}{S} \max_{i: 1 \leq i \leq J} \sum_{j=1}^{J} M_{i,j} x_j \right\} \quad (19)$$

Clearly $\tilde{x} = \gamma \hat{x}$, where $$\gamma = \frac{S}{\hat{S}},$$

is feasible for (19) and yields a value $$\frac{\hat{\alpha}}{\hat{S}}.$$

This implies that the optimal value of (19) is no greater than $$\frac{\hat{\alpha}}{\hat{S}}.$$

However, an optimal value of (19) which is strictly less than $$\frac{\hat{\alpha}}{\hat{S}}$$

would result in a contradiction since it would imply that the optimal value of (16) is also strictly less than $$\frac{\hat{\alpha}}{\hat{S}}.$$

Consequently, for arbitrarily fixed $S>0$ the optimal value of (19) is identical to that of (16). Then, (19) can be re-formulated as in (17). Clearly since the constraints and objective in (17) are affine, it is a convex optimization problem which implies that any solution to the K.K.T conditions is also globally optimal. Next, the K.K.T conditions for (17) are given by $$1^T x = S; x \in IR_+^J; \theta S \geq \sum_{j=1}^{J} M_{i,j} x_j \forall i \quad (20)$$

$$\beta^T 1 = \frac{1}{S}; \beta^T M = \lambda^T + \delta 1^T; \beta \in IR_+^J; \lambda \in IR_+^J$$

$$\lambda \odot x = 0; \beta \odot (Mx - \theta S 1) = 0; \delta \in IR,$$

where $\odot$ denotes the Hadamard product. Next, suppose that $M^{-1} 1 \succeq 0$. Then, consider a particular choice $$x = (\theta S) M^{-1} 1; \theta = \frac{1}{1^T M^{-1} 1} \quad (21)$$

$$\delta = \frac{1}{S 1^T M^{-1} 1}; \lambda = 0; \beta^T = \delta 1^T M^{-1}.$$

It can be verified that the choice in (21) satisfies all the K.K.T. conditions in (20) and hence must yield a global optima for

(17) and thus the optimal value for (16). This optimal value can be verified to be $$\frac{1}{1^T M^{-1} 1}.$$

We have the following important corollary to Theorem 2. It pertains to a particular value for matrix M which is obtained when a format i, $1 \leq i \leq J$ implies an assignment of i symbol streams and when the rate function on each RB for a given hypotheses is computed assuming point-to-point Gaussian codes for each transceiver link, single-user decoding at each user and a transmit precoding method from a class of transmit precoding methods (which includes both SLNR and interference alignment based precoding).

Corollary 1.

Consider the upper-triangular matrix $M \in \mathbb{R}_+^{J \times J}$, where $J \geq 1$ is a fixed positive integer, defined as $$M_{i,j} = \begin{cases} \frac{i}{j}, & \text{If } 1 \leq i \leq j \leq J \\ 0 & \text{Otherwise} \end{cases} \quad (22)$$

Then its inverse is a bi-diagonal matrix given by $L = M^{-1}$ where $$L_{i,j} = \begin{cases} 1, & \text{If } i = j \\ -\frac{i}{j}, & \text{If } i = j-1 \\ 0, & \text{Otherwise} \end{cases} \quad (23\text{o})$$

Further, in this case $L1 \succeq 0$ and we have that $$\Delta = \frac{1}{\sum_{j=1}^{J} \frac{1}{j}}. \quad (24)$$

Notice from (24) that the approximation factor decays with J as $$\frac{1}{\ln(J)}$$

which is much slower than $1/J$.

We note that while Algorithm I is conceptually simple and can offer a constant-factor approximation, its implementation complexity can be quite high. Indeed, its complexity is $O(N(KJ)^B)$ and is not feasible in many scenarios. In this context, we note that since the problem in (6) subsumes the strongly NP hard maximum weight independent set (MWIS) problem, an exponential complexity with respect to B is the likely price we have to pay in order to obtain a approximation factor independent of B. Consequently, henceforth we will adopt an iterative framework to design approximation algorithms which will make the complexity polynomial in even B but will introduce a penalty of 1/B in the approximation guarantees.

To design the iterative algorithms, we first define an incremental rate function. In particular, for any $n \in \mathcal{N}$, any $\mathcal{A} \subseteq \underline{\Omega}$ and any $\underline{e} \in \underline{\Omega}$ we define $$\tilde{r}(\underline{e}, \mathcal{A}, n) = (r(\underline{e} \cup \mathcal{A}, n) - r(\mathcal{A}, n))^+ \quad (25)$$

where $(x)^+ = \max\{0, x\}$, $x \in \mathbb{R}$. Notice that as a consequence of (3), $\tilde{r}(\underline{e}, \mathcal{A}, n) = 0$ if there exists an element $\underline{e}' \in \mathcal{A}$ such that $b_{\underline{e}} = b_{\underline{e}'}$ or $u_{\underline{e}} = u_{\underline{e}'}$. We now define a per-step scheduling problem which will be approximately solved in each iteration step. Given a set of elements scheduled on each RB thus far, $\{\underline{A}^{(n)}\}_{n=1}^{N}$, along with a set of elements $\underline{B}$ from which new elements can be selected, the per-step scheduling problem is defined as $$\max_{\substack{\{X_{\underline{e},n} \in \{0,1\}: \\ \underline{e} \in \underline{B}, n \in N\}}} \sum_{\underline{e} \in \underline{B}} \sum_{n \in N} \tilde{r}(\underline{e}, \underline{A}^{(n)}, n) X_{\underline{e},n} \quad (26)$$

$$\sum_{\underline{e} \in \underline{B}} X_{\underline{e},n} \leq 1, \forall n$$

$$\left(\sum_{n \in N} X_{\underline{e},n}\right)\left(\sum_{n \in N} X_{\underline{e}',n}\right) = 0, \forall \underline{e}, \underline{e}' \subseteq \underline{B}: u_{\underline{e}} = u_{\underline{e}'}, f_{\underline{e}} \neq f_{\underline{e}'};$$

$$\left(\sum_{n \in N} X_{\underline{e},n}\right)\left(\sum_{n \in N} X_{\underline{e}',n}\right) = 0, \forall \underline{e},$$

$$\underline{e}' \subseteq \underline{B}: u_{\underline{e}} = u_{\underline{e}'}, b_{\underline{e}} \neq b_{\underline{e}'}, \text{ [for CDPS]}$$

Next, we define a family of sets $\mathcal{I}$ as follows. All singleton elements in $\underline{\Omega}$ are members of $\mathcal{I}$. In addition, For CS/CB or DPS: $\mathcal{A} \in \mathcal{I}$ If and only if $$\forall \underline{e}, \underline{e}' \in \mathcal{A}, u_{\underline{e}} = u_{\underline{e}'} \Rightarrow f_{\underline{e}} = f_{\underline{e}'} \quad (27)$$

For CDPS: $\mathcal{A} \in \mathcal{I}$ If and only if $\forall \underline{e}, \underline{e}' \in \mathcal{A}, u_{\underline{e}} = u_{\underline{e}'} \Rightarrow \underline{e}'. \quad (28)$ The family defined above possesses the following property which follows from the basic definitions.

Proposition 2.

The family of sets defined in (27) or (28) is an independence family. Consequently $(\underline{\Omega}, \mathcal{I})$ is a matroid.

Next, given subsets $\{\underline{A}^{(n)} \subseteq \underline{\Omega}\}_{n \in \mathcal{N}}$ and any $\underline{S} \subseteq \underline{\Omega}$, we define another set function $$g(\underline{S} | \{\underline{A}^{(n)}\} n \in \mathcal{N}) = \sum_{n \in N} \max_{\underline{e} \in \underline{S}} \{\tilde{r}(\underline{e}, \underline{A}^{(n)}, n)\} \quad (29)$$

Notice that the set function g(.) collects the best possible incremental gain on each RB. We are now ready to describe two of our iterative algorithms. We offer Algorithm II which is a simple iterative algorithm (referred to as the iterative submodular algorithm) to approximately solve (6). In addition, when the CoMP scheme is either CS/CB or DPS, we also provide Algorithm III, referred to as the iterative format balancing algorithm, which is another simple approach to approximately solve (6). Notice that in each iteration of either iterative algorithm, decisions made in the previous iterations are kept fixed. New assignments of RBs, serving TPs and formats to users are made by solving the "per-step" scheduling problem of (26) and the obtained result ensures an improvement in system utility while maintaining feasibility. The main difference between the two algorithms is in the method used to approximately solve the per-step scheduling problem. Regarding the non applicability of Algorithm III for CDPS, we note that the balancing in each iteration of Algorithm III is with respect to the format of a user. While such a balancing can also be done with respect to the serving TP of a user, in general no provable guarantees can then be derived since the channels seen by a user from any two different TPs in the cluster can be arbitrarily different. Also, the pruning step in either algorithm, given a selected subset $\underline{S}$, is done as follows.

$$\underline{B} = \begin{cases} B \setminus \{\underline{e} \in \Omega : \exists \underline{e}' \in \underline{S}, u_{\underline{e}} = u_{\underline{e}'} \& f_{\underline{e}} \neq f_{\underline{e}'}\}, & \text{If } CS/CB \text{ or } DPS \\ B \setminus \{\underline{e} \in \Omega : \exists \underline{e}' \in \underline{S}, u_{\underline{e}} = u_{\underline{e}'} \& \underline{e} \neq \underline{e}'\}, & \text{If } CDPS \\ B \setminus \{\underline{e} \in \Omega : \exists \underline{e}' \in \underline{S}, u_{\underline{e}} = u_{\underline{e}'}\}, & \text{If aggressive} \end{cases} \quad (30)$$

Notice that the aggressive pruning option subsumes the CS/CB or DPS pruning as well as the CDPS one and hence is applicable, if enabled, in all cases. Next, specializing the utility to the single user case we have the following inequalities:

$$r(\underline{e}',n) \geq \beta_{f_{\underline{e}}f_{\underline{e}'}} r(\underline{e},n), \forall \underline{e},\underline{e}' \in \Omega \quad (31)$$

for some constants $\beta_{i,j}$, $1 \leq i,j \leq J$ with $\beta_{i,i}=1$, $\forall i$. We then define the matrix $G \in \mathrm{IR}_{+,J \times J}$, where $$G_{i,j} = \beta_{i,j}, \text{ where } \beta_{i,j} \in [0,1], \forall 1 \leq i,j \leq J. \quad (32)$$

Notice that since we can always set $\beta_{i,j}=0$, (31) itself results in no loss of generality. We note that here we allow for the possibility of $\beta_{i,j} > 0$ for $i > j$ so that the matrix G need not be upper triangular. Further, whenever (7) holds we can deduce that $\beta_{i,j} \geq \alpha_{i,j} \forall 1 \leq i \leq j \leq J$. The following result on the approximation guarantees for these two algorithms holds whether or nor aggressive pruning is enabled.

Theorem 3.

The iterative submodular algorithm offers a solution that has a worst-case guarantee of at-least $$\frac{1}{2B}.$$

For CS/CB or DPS the iterative format balancing algorithm offers a solution that has a worst-case guarantee of at-least $$\frac{\Gamma}{B},$$

where $\Gamma$ satisfies $$\Gamma \geq \frac{1}{J}$$

and can be determined via a linear program $$\Gamma = \min_{x \in \mathrm{IR}_+^J, \theta \in \mathrm{IR}_+} \{\theta\} \quad (33)$$

$$s.t. 1^T x = S$$

$$\sum_{j=1}^{J} G_{i,j} x_j \leq \theta S, \forall i$$

for any arbitrarily fixed $S>0$ and with the matrix G being defined in (32). Furthermore, when $G^{-1}1 \succeq 0$ we have that $$\Gamma = \frac{1}{1^T G^{-1} 1}.$$

Proof.

We first note that since the utility function is sub-additive (i.e., satisfies (5)), for any set $\underline{A} \subseteq \underline{\Omega}$ and any $n \in \mathcal{N}$ we have that $r(\underline{A}, n) \leq B \max_{\underline{e} \in \underline{A}} r(\underline{e}, n)$. Then, given any optimal solution for (6) we can retain the best element (yielding the highest single-user weighted rate) on each RB and the resulting weighted sum rate will be within a fraction $1/B$ of the optimal one. Moreover, since the solution so obtained is a feasible solution for the per-step scheduling problem in (26) with $\underline{B} = \underline{\Omega}$ and $\underline{A}^{(n)} = \phi$, $\forall n$, we can conclude that the optimal solution to the per-step scheduling problem with $\underline{B} = \underline{\Omega}$ and $\underline{A}^{(n)} = \phi$, $\forall n$ will at-least be within $1/B$ of the one optimal for (6). Also, any feasible solution of (26) is clearly feasible for (6).

Let us now consider the iterative submodular algorithm. Then, note that the per-step scheduling problem in (26) can be re-formulated as $$\max_{\underline{S} \subseteq \underline{B} : \underline{S} \in I} g(\underline{S} | \{A^{(n)}\} n \in \mathcal{N}) \quad (34)$$

Notice that since each step of the iterative algorithm yields a monotonic improvement in the utility function along with a solution that is feasible for (6), it is sufficient to show that the weighted sum rate obtained after the first step is within $\frac{1}{2}$ its corresponding optimal, i.e., the optimal solution to the per-step scheduling problem with $\underline{B} = \underline{\Omega}$ and $\underline{A}^{(n)} = \phi$, $\forall n$. Towards this end, we note that the function $g: \mathrm{IR}_+$ is a monotonic submodular set function and invoking Proposition 2 we see that the problem in (34) (with $\underline{B} = \underline{\Omega}$ and $\underline{A}^{(n)} = \phi$, $\forall n$) is that of maximizing a monotonic set function over a matroid. It is well known that for this problem a simple greedy algorithm yields a $\frac{1}{2}$ approximation. Algorithm II is indeed an adaptation of that greedy algorithm to the problem at hand and hence yields a $\frac{1}{2}$ approximation.

Now let us consider the iterative format balancing algorithm and suppose that the selected CoMP scheme is either CS/CB or DPS. Here again we note that each step of the iterative algorithm yields a monotonic improvement in the utility function along with a solution that is feasible for (6). Consequently, we focus on the first step with $\underline{B} = \underline{\Omega}$ and $\underline{A}^{(n)} = \phi$, $\forall n$. Notice that a key difference between the format balancing procedures in Algorithms I and III is that in the latter case on any RB we allow for the possibility of assigning a higher format to a user than the one tentatively assigned to that user after the maximization step that ignores the per-user format constraint, as long as the overall weighted sum rate obtained on that RB is improved. Then, using arguments similar to those made to prove Theorem 2 we can show that the solution obtained yields a weighted sum rate within at-least a fraction F of its optimal counterpart, where $\Gamma$ is given by (33).

We have the following important corollary to Theorem 3 when specialized to the iterative format balancing algorithm. It pertains to a particular value for matrix G which is obtained when a format i, $1 \leq i \leq J$ implies an assignment of i symbol streams and when the single user rate function on each RB for a given format is computed assuming point-to-point Gaussian code, single-user decoding at each user and a precoding method from the aforementioned class of precoding methods (which includes optimal single-user precoding when restricted to the single-user case).

Corollary 2.

Consider the matrix $G \in IR_+^{J \times J}$, where $J \geq 1$ is a fixed positive integer, defined as $$G_{i,j} = \frac{\min\{i, j\}}{\max\{i, j\}}, \ 1 \leq i, j \leq J. \tag{35}$$

Its inverse is a tri-diagonal matrix given by $L = G^{-1}$ where $$L_{i,j} = \begin{cases} -\frac{j(j-1)}{2j-1}, & \text{If } i = j-1 \\ \frac{4j^3}{4j^2-1}, & \text{If } i = j \\ -\frac{j(j+1)}{2j+1}, & \text{If } i = j \\ 0, & \text{Otherwise} \end{cases} \tag{36}$$

Further, in this case $L1 \succeq 0$ and we have that $$\Gamma = \frac{1}{\sum_{j=1}^{J} \frac{1}{2(j-1)+1}}. \tag{37}$$

Notice from (37) that the approximation factor decays with J as $$\frac{2}{\ln(J)}.$$

Also using (37) we can deduce that for all $J \leq 7$ we have $\Gamma > \frac{1}{2}$ so that in this regime the iterative format balancing algorithm offers a superior guarantee than the iterative submodular algorithm.

2.1 Implementation Issues

We now briefly discuss some features that can be used to speed up the run time and/or improve the performance of Algorithms II and III.

Aggressive Pruning:

The aggressive pruning option is the most aggressive option in terms of pruning the pool of elements (that can be chosen) after each iteration and hence achieves complexity reduction. Indeed, under this option all elements containing a user that has been selected before are removed. In our simulations we observed that while this option causes negligible degradation in the performance of CS/CB, both DPS and CDPS actually benefit from this option since it tends to avoid highly sub-optimal local maxima.

Lazy Evaluations:

Recall that in each iteration of Algorithm II we employ a greedy method to approximately maximize a submodular function. Then the technique of lazy evaluations which exploits the decreasing marginal gains property of submodular set functions, can be used to achieve speed up.

Suboptimal Evaluation of Incremental Rate Function:

Here we note that proper evaluation of the incremental rate function would require recomputing the parameters such as transmit precoders even for the users selected in the previous iterations on an RB. Instead, a sub-optimal evaluation can be done in the intermediate iterations wherein these parameters associated with previous decisions are not changed.

Post Processing:

Upon termination of Algorithms II and III, each scheduled user is assigned a format, a set of RBs and a serving TP on each such RB. Then, by retaining the format (and the serving TP in case of CDPS) assigned to each scheduled user and by assigning the most robust format f=1 to the ones not scheduled and allowing such users to be served only by their anchor TPs, we can refine the hypotheses selected on each RB. Since each user is now assigned one format (and one serving TP in case of CDPS), the refinement can be done independently across RBs without violating the at-most one format per scheduled user constraint (and the at-most one serving TP constraint in case of CDPS). Any simple refinement rule can be used as long as it ensures monotonic improvement. In our simulations we employed sub-optimal incremental rate evaluation in the intermediate iterations along with a simple greedy refinement in the post-processing step. We observed that the benefit from such refinement is largest when the selected CoMP schemes are either DPS or CDPS.

3 Finite Buffers: Combinatorial Auction

We now incorporate finite buffers into our optimization problem. We will assume that either CS/CB or CDPS is used as the CoMP scheme. This assumption is made for convenience in exposition and we note that all the following results also hold for DPS. Then, letting $Q_u$, $\theta_u$ denote the buffer size (in bits) of user u and its scheduling weight[4], respectively, we obtain the optimization problem given by $$\max_{\substack{\{X_{A,n} \in \{0,1\}: \\ A \subseteq \Omega, n \in N\}}} \sum_{u:u \in \{1, \ldots, K\}} \min \tag{38}$$

$$\left\{ \sum_{\underline{e} \in \Omega: u_{\underline{e}} = u} \sum_{A \subseteq \Omega: \underline{e} \in A} \sum_{n \in N} r_{\underline{e}}(A, n) X_{A,n}, \vartheta_u Q_u \right\} \sum_{A \subseteq \Omega} X_{A,n} \leq 1,$$

$$\forall n \left( \sum_{n \in N} X_{A,n} \right) \left( \sum_{n \in N} X_{B,n} \right) = 0, \forall \underline{A}, \underline{B} \subseteq \Omega : \exists \underline{e} \in \underline{A},$$

$$\underline{e}' \in \underline{B} \ \& u_{\underline{e}} = u_{\underline{e}'}, f_{\underline{e}} \neq f_{\underline{e}'};$$

$$\left( \sum_{n \in N} X_{A,n} \right) \left( \sum_{n \in N} X_{B,n} \right) = 0, \forall \underline{A},$$

$$\underline{B} \subseteq \Omega : \exists \underline{e} \in \underline{A}, \underline{e}' \in \underline{B} \ \& u_{\underline{e}} = u_{\underline{e}'} b_{\underline{e}} \neq b_{\underline{e}'}, \text{ for CDPS}$$

In order to approximately solve (38) we introduce another simpler problem given by $$\max_{\substack{\{X_{\underline{e},n} \in \{0,1\}: \\ \underline{e} \subseteq \Omega, n \in N\}}} \sum_{u:u \in \{1, \ldots, K\}} \min \left\{ \sum_{\underline{e} \in \Omega: u_{\underline{e}} = u} \sum_{n \in N} r_{\underline{e}}(\underline{e}, n) X_{\underline{e},n}, \vartheta_u Q_u \right\} \sum_{\underline{e} \subseteq \Omega} X_{\underline{e},n} \leq \tag{39}$$

-continued $$1, \forall n \left(\sum_{n \in N} X_{\underline{e},n}\right)\left(\sum_{n \in N} X_{\underline{e}',n}\right) = 0,$$

$$\forall \underline{e}, \underline{e}' \subseteq \Omega : u_{\underline{e}} = u_{\underline{e}'},$$

$$f_{\underline{e}} \neq f_{\underline{e}'}; \left(\sum_{n \in N} X_{A,n}\right)\left(\sum_{n \in N} X_{B,n}\right) = 0, \forall \underline{e},$$

$$\underline{e}' \subseteq \Omega : u_{\underline{e}} = u_{\underline{e}'}, b_{\underline{e}} \neq b_{\underline{e}'}, \text{ for } CDPS$$

The relation between the optimal solutions to (38) and (39) is given by the following result.

[4] Without loss of optimality, we can assume that the user weights are normalized to lie in [0,1].

Proposition 3.

The optimal solution to (39) is feasible for (38) and yields a value that is no less than a factor 1/B times that yielded by the optimal solution to (38).

Proof.

Consider then an optimal allocation to (38), say $\{\underline{\hat{A}}^{(n)}\}_{n \in \mathcal{N}}$, and for that solution let $\mathcal{G}'_b$ denote the set of users served by TP b where b=1, . . . , B. Under both CS/CB and CDPS we have that these sets are non overlapping, i.e., $\mathcal{G}'_k \cap \mathcal{G}'_j = \phi$, $\forall k \neq j$. Further, the overall utility can be expanded as $\Sigma_{b=1}^B R_b$, where $R_b$ is the weighted sum of rates of all users in $\mathcal{G}'_b$ wherein the per-user finite buffer constraints are included. Next, consider a TP b and suppose that on each RB n∈$\mathcal{N}$ a genie removes the interference caused to the user being served by TP b from co-scheduled transmissions by other TPs. Invoking the property in (5), we can see the resulting weighted sum rate $\hat{R}_b$ will be at-least as large as $R_b$. However, $\hat{R}_b$ can be achieved by a particular solution to (39) derived from $\{\underline{\hat{A}}^{(n)}\}_{n \in \mathcal{N}}$, wherein only the element containing a user $\mathcal{G}'_b$ in is retained in each $\underline{\hat{A}}^{(n)}$ (notice that there can only be one such element in each $\underline{\hat{A}}^{(n)}$) and the others are expurgated. This implies that the optimal solution to (39) yields a value that is an upper-bound to each $\tilde{R}_b$, b=1, . . . , B, which in turn allows us to conclude that the theorem is true.

We now offer the following proposition. We will use per-user utility and valuations interchangeably.

Proposition 4.

The problem in (39) is a combinatorial auction problem with fractionally sub-additive valuations.

Proof.

We introduce a utility function h: $\{1, \ldots, K\} \times 2^{\mathcal{N}} \mathrm{IR}_+$ defined with some abuse of notation as $$h(u, \mathcal{R}) = \qquad (40)$$

$$\begin{cases} \min\left\{\vartheta_u Q_u, \max_{f \in \mathcal{F}} \sum_{n \in \mathcal{R}} r((u, f, b), n)\right\}, & CS/CB b: u \in \mathcal{G}_b \\ \min\left\{\vartheta_u Q_u, \max_{f \in \mathcal{F}, b \in \{1, \ldots, B\}} \sum_{n \in \mathcal{R}} r((u, f, b), n)\right\}, & CDPS \end{cases}$$

Then, we can re-formulate the problem in (39) as $$\max_{\substack{\{\tilde{X}_{u,\mathcal{R}} \in [0,1]: \\ u \in \{1, \ldots, K\}, \mathcal{R} \subseteq N\}}} \sum_{u \in \{1, \ldots, K\}} \sum_{\mathcal{R} \subseteq N} h(u, \mathcal{R}) \tilde{X}_{u,\mathcal{R}} \qquad (41)$$

$$\sum_{\mathcal{R}: n \in \mathcal{R}} \sum_{u} \tilde{X}_{u,\mathcal{R}} \leq 1, \forall n \in \mathcal{N}$$

$$\sum_{\mathcal{R}} \tilde{X}_{u,\mathcal{R}} \leq 1, \forall u \in \{1, \ldots, K\}.$$

Clearly the problem in (41) is in the form of a standard combinatorial auction problem (a.k.a. welfare maximization problem) where objects in $\mathcal{N}$ have to assigned in an non-overlapping manner to the K users. Then, it remains to be shown that for each user u, the set function h(u, :) is fractionally sub-additive. Invoking the definition of such a function, we have to prove that the following property holds. For any given set $S \subseteq \mathcal{N}$ and any fractional cover $\{\eta_q, \mathcal{T}_q\}$ of S, i.e., $\eta_q \in [0,1]$, $\mathcal{T}_q \subseteq \mathcal{N} \forall q$ and $\Sigma_{q:n \in \mathcal{T}_q} \eta_q \geq 1$, $\forall n \in S$, we have to prove that $$h(u, S) \leq \sum_q \eta_q h(u, \mathcal{T}_q). \qquad (42)$$

To prove (42) let e=(u, f, b) be an element that is optimal for the user u and set S, i.e.

$$h(u, S) = \min\left\{\vartheta_u Q_u, \sum_{n \in S} r(\underline{e}, n)\right\}. \qquad (43)$$

Consider first the case that h(u, S)=$\Sigma_{n \in S} r(\underline{e}, n) \leq \vartheta_u Q_u$. Using the inequality $$h(u, \mathcal{T}_q) \geq \min\left\{\vartheta_u Q_u, \sum_{n \in \mathcal{T}_q} r(\underline{e}, n)\right\} \geq \min\left\{\vartheta_u Q_u, \sum_{n \in \mathcal{T}_q \cap S} r(\underline{e}, n)\right\} = \qquad (44)$$

$$\sum_{n \in \mathcal{T}_q \cap S} r(\underline{e}, n),$$

we have that $$\sum_q \eta_q h(u, \mathcal{T}_q) \geq \sum_q \eta_q \sum_{n \in \mathcal{T}_q \cap S} r(\underline{e}, n) = \qquad (45)$$

$$\sum_{n \in S} r(\underline{e}, n) \underbrace{\sum_{q:n \in \mathcal{T}_q} \eta_q}_{\geq 1} \geq \sum_{n \in S} r(\underline{e}, n) = h(u, S),$$

which proves (42) for this case. Then, it remains to prove (42) when h(u, S)=$\vartheta_u Q_u \leq \Sigma_{n \in S} r(\underline{e}, n)$. In this case we can find a subset $\mathcal{R} \subseteq S$ such that $\Sigma_{n \in \mathcal{R}} r(\underline{e}, n) \geq \vartheta_u Q_u$ but all its strict subsets $\mathcal{A} \subset \mathcal{R}$ satisfy $\Sigma_{n \in \mathcal{A}} r(\underline{e}, n) < \vartheta_u Q_u$. Upon obtaining such an $\mathcal{R}$, we can divide the cover $\{\mathcal{T}_q\}$ into two parts $\{\mathcal{T}_q\}_{q \in \mathcal{I}_1} : \mathcal{R} \subseteq \mathcal{T}_q \forall q \in \mathcal{I}_1$ and the remaining sets of the cover are in $\{\mathcal{T}_q\}_{q \in \mathcal{I}_2}$. Clearly, we have that since $\Sigma_{n \in \mathcal{T}_q} r(\underline{e}, n) \geq \vartheta_u Q_u \forall q \in \mathcal{I}_1$, $h(u, \mathcal{T}_{q_q}) = \vartheta_u Q_u \forall q \in \mathcal{I}_1$. Consequently, $$\sum_q \eta_q h(u, \mathcal{T}_q) \geq \vartheta_u Q_u \sum_{q:q\in\mathcal{I}_1} \eta_q + \sum_{q:q\in\mathcal{I}_2} \eta_q \sum_{n\in\mathcal{T}_q\cap\mathcal{R}} r(\underline{e}, n) = \qquad (46)$$

$$\vartheta_u Q_u \beta + \underbrace{\sum_{n\in\mathcal{R}} r(\underline{e}, n) \sum_{q\in\mathcal{I}_2: n\in\mathcal{T}_q} n_q}_{\geq \vartheta_u Q_u}$$

Notice that if $\beta \geq 1$ the desired inequality is already proved. On the other hand, if $\beta < 1$ then exploiting the fact that $\{\eta_q, \mathcal{T}_q\}$ is a fractional cover of S, we can deduce that for each $n \in \mathcal{R}$, $\sum_{q\in\mathcal{I}_2: n\in\mathcal{T}_q} \eta_q \geq 1 - \sum_{q\in\mathcal{I}_1: n\in\mathcal{T}_q} \eta_q \geq 1 - \beta$ which using (46) yields the desired result.

We now offer an important result which is of independent interest. It has been proved that any fractionally sub-additive set function can be expressed as a maximum over linear set functions. In particular, this means that there exist T linear functions $g^{(j)}: \{1, \ldots, K\} \times \mathcal{N} \to \mathbb{R}_+, 1 \leq j \leq T$ such that $$h(u, \mathcal{R}) = \max_j \left\{ \sum_{n\in\mathcal{R}} g^{(j)}(u, n) \right\}, \forall u \in \{1, \ldots, K\} \& \mathcal{R} \subseteq \mathcal{N}. \qquad (47)$$

The property in (47) leads to the following result.

Proposition 5.

The combinatorial auction problem with fractionally sub-additive valuations can be re-formulated as the maximization of a monotonic sub-modular set function subject to one matroid constraint.

Proof.

Let us first define a set $\Psi = \{(u, j): 1 \leq u \leq K \ \& \ 1 \leq j \leq T\}$ and a set function $\tilde{h}: 2^\Psi \to \mathbb{R}_+$ as $$\tilde{h}(A) = \sum_{n\in\mathcal{N}} \max_{(u,j)\in A} \{g^{(j)}(u, n)\}, \forall A \subseteq \Psi. \qquad (48)$$

It can be shown that the set-function $\tilde{h}(.)$ is a monotonic sub-modular set function. Then, we define a partition of $\Psi$ as $\Psi = \cup_{u=1}^K \Psi_u$ where $\Psi_u = \{(u, j): 1 \leq j \leq T\}$, $\forall u$. Using this partition we can define a family of subsets of $\Psi$, denoted by $\tilde{\mathcal{I}}$, as $$\mathcal{A} \subseteq \Psi: |\mathcal{A} \cap \Psi_u| \leq 1 \forall u \Rightarrow \mathcal{A} \in \tilde{\mathcal{I}} \qquad (49)$$

It can be proved that the family $\tilde{\mathcal{I}}$ is an independence family and hence $(\Psi, \tilde{\mathcal{I}})$ is a matroid, a partition matroid in particular. With these facts in hand we can obtain a reformulation of (41) as $$\max_{A: A\in\tilde{\mathcal{I}}} \tilde{h}(A) \qquad (50)$$

which yields the desired proof.

The key benefit of this re-formulation is that (50) can be approximately solved with an $\frac{1}{2}$ approximation using a simple greedy algorithm. Indeed, the interested reader will note that such a re-formulation was already exploited in the iterative submodular algorithm. In this context we note that an algorithm with $\frac{1}{2}$ approximation was developed earlier for combinatorial auction with valuations of the form in (47) (referred to there as XOS valuations). However, the re-formulation in Proposition 5 is more useful since algorithms for the maximization of submodular functions under a variety of constraints (such as multiple knapsacks, p-system) are now available. The caveat unfortunately is that T may depend exponentially on $|\mathcal{N}|$ which means that even the greedy algorithm may not have polynomial complexity. Indeed, this happens to be the case for our per-user utility in (40) and hence obtaining a polynomial time greedy algorithm seems challenging. Nevertheless, another approach described below yields a polynomial time randomized algorithm.

We first state the following lemma follows directly from the oblivious rounding procedure developed in prior art.

Lemma 1.

Given any feasible solution to the LP relaxation of (41), which is $$\max_{\substack{\{\tilde{x}_{u,\mathcal{R}}\in[0,1]:\\ u\in\{1,\ldots,K\},\mathcal{R}\subseteq\mathcal{N}\}}} \sum_{u\in\{1,\ldots,K\}} \sum_{\mathcal{R}\subseteq\mathcal{N}} h(u, \mathcal{R})\tilde{x}_{u,\mathcal{R}} \qquad (51)$$

$$\sum_{\mathcal{R}: n\in\mathcal{R}} \sum_u \tilde{x}_{u,\mathcal{R}} \leq 1, \forall n \in \mathcal{N}$$

$$\sum_{\mathcal{R}} \tilde{x}_{u,\mathcal{R}} \leq 1, \forall u \in \{1, \ldots, K\},$$

a solution feasible for (41) can be obtained such that its corresponding value is no less than a factor $(1-1/e)$ times the one corresponding to the solution feasible for the LP (51).

Separation Oracle:

Given any set of prices $p_n \in \mathbb{R}_+, \forall n \in \mathcal{N}$, for each user u a separation oracle returns the subset $\hat{S} = \arg\max_{S\subseteq\mathcal{N}} \{h(u, S) - p(S)\}$, where we let $p(S) = \sum_{n\in S} p_n$.

It seems intractable to construct such an oracle for our per-user utility function. Nevertheless, under the reasonable assumption that for each element $\underline{e}\in\Omega$ and $n\in\mathcal{N}$ the weighted rate $r(\underline{e}, n)$ is bounded by a constant,[5] it is possible to construct an approximate separation oracle as shown in the following result. We assume that the cardinality of the format set $\mathcal{F}$ as well as the number of TPs B remain fixed.

[5]This assumption is reasonable since in many practical systems the maximum input alphabet size is bounded above by 64 (corresponding to 64 QAM).

Proposition 6.

There exists an approximate separation oracle that for arbitrarily chosen constants $\epsilon, \delta \in (0, 1)$, any user u and any given set of prices $p_n \in \mathbb{R}_+, \forall n \in \mathcal{N}$ returns a set $\hat{S}$ such that $$h(u, \hat{S}) - p(\hat{S}) \geq (1-\epsilon)\max_{S\subseteq\mathcal{N}}\{h(u, S) - p(S)\} - \delta,$$

The complexity of the approximate separation oracle scales polynomially in each of $$K, |\mathcal{N}|, \frac{1}{\epsilon} \ \& \ \frac{1}{\delta}$$

Proof.

Notice that since the cardinality of the format set $\mathcal{F}$ as well as the number of TPs B remain fixed, it suffices to show the existence of an approximate separation oracle that for any element $\underline{e} = (u, f, b) \in \Omega$ can return a set $\hat{S}$ such that $$\min\left\{\vartheta_u Q_u, \sum_{n \in \hat{S}} r(\underline{e}, n)\right\} - p(\hat{S}) \geq \quad (52)$$

$$(1-\epsilon)\max_{S \subseteq \mathcal{N}}\left\{\min\left\{\vartheta_u Q_u, \sum_{n \in S} r(\underline{e}, n)\right\} - p(S)\right\} - \delta.$$

Towards this end, notice first that such an oracle can be trivially obtained when $\sum_{n \in \mathcal{N}} r(\underline{e}, n) \leq \vartheta_u Q_u$ in which case we can indeed determine the optimal subset. Accordingly we suppose that $\sum_{n \in \mathcal{N}} r(\underline{e}, n) \geq \vartheta_u Q_u$ and consider the problem $$\max_{S \subseteq \mathcal{N}}\left\{\min\left\{\vartheta_u Q_u, \sum_{n \in S} r(\underline{e}, n)\right\} - p(S)\right\}. \quad (53)$$

Then, it can be seen that (53) can be solved by solving the two following sub-problems:

$$\max_{S \subseteq \mathcal{N}: \sum_{n \in S} r(\underline{e},n) \leq \vartheta_u Q_u}\left\{\sum_{n \in S}(r(\underline{e}, n) - p_n)\right\} \quad (54)$$

and $$\max_{S \subseteq \mathcal{N}: \sum_{n \in S} r(\underline{e},n) > \vartheta_u Q_u}\{\vartheta_u Q_u - p(S)\}. \quad (55)$$

The problem in (54) is the classical knapsack problem for which there exists an FPTAS so that a solution $\hat{S}_1$ with an approximation factor $1-\epsilon$ can be recovered. On the other hand, (55) is equivalent to a min-knapsack problem. Here, to approximately solve (55), we leverage the fact that each $r(\underline{e}, n)$ is bounded above by a constant. This allows us to use the demand-based dynamic program for the knapsack problem and recover in polynomial time a solution $\hat{S}_2$ for which min $\{\vartheta_u Q_u, \sum_{n \in \hat{S}_2} r(\underline{e}, n)\} - p(\hat{S}_2)$ is no less than $\max_{S \subseteq \mathcal{N}: \sum_{n \in S} r(\underline{e},n) > \vartheta_u Q_u}\{\vartheta_u Q_u - p(S)\} - \delta$. Then, by selecting the better option among $\hat{S}_1, \hat{S}_2$ we can obtain a set that offers the guarantee in (52). The remaining part follows from the complexities of the FPTAS and the demand-based dynamic program.
Proposition 7.

The LP (51) can be approximately solved in polynomial time to obtain a solution whose value is no less than $(1-\epsilon)\hat{V}^{LP}-\delta$, where $\hat{V}^{LP}$ denotes the optimal value for the LP (51).
Proof.

Notice that the LP (51) has an exponential number of variables. A key result that was discovered earlier in prior art was that such an LP can be optimally solved in polynomial time given a separation oracle. In particular, the dual of this LP can be solved in polynomial time via the ellipsoid method given a separation oracle. Then retaining only the constraints encountered while solving the dual (which are polynomially many) we can get its primal LP counterpart which now has polynomially many variables and hence can be solved in polynomial time. This reduced variable LP (which essentially is the same as (51) but where all but a small subset of variables are fixed to zero) yields an optimal solution to (51). This argument with some minor changes was also shown to work recently for an β-approximate separation oracle, where β is the approximation factor. Indeed, it is verified next that the same approach also works for an approximate oracle of the form in (52). The key difference is that upon using the ellipsoid method to solve the dual of (51) with our approximate separation oracle, we obtain a value $\hat{D}$ upon convergence such that the optimal dual value (and hence the optimal primal value) lies in the interval $$\left[\hat{D}-\epsilon', \frac{\hat{D}+\delta}{1-\epsilon}\right],$$

where $\epsilon'>0$ is the tolerance to decide the convergence of the ellipsoid method. Further, re-solving the modified dual wherein only the constraints encountered in the first run of the ellipsoid method are retained, yields the same value $\hat{D}$ upon convergence and hence we can deduce that the true value of this modified dual and hence its primal counterpart also lies in the interval $$\left[\hat{D}-\epsilon', \frac{\hat{D}+\delta}{1-\epsilon}\right].$$

This primal counterpart which is the same as (51) but where all but a small subset of polynomially many variables are fixed to zero, can be solved optimally in polynomial time to obtain a solution feasible for (51) and which yields a value in the aforementioned internal. Then, since this value, say $\hat{V}$, and the optimal value for (51), $\hat{V}^{LP}$, both lie in $$\left[\hat{D}-\epsilon', \frac{\hat{D}+\delta}{1-\epsilon}\right],$$

we can deduce that $\hat{V} \geq (1-\epsilon)\hat{V}^{LP}-\delta-\epsilon'$. Since the run time scales polynomially in each of $$\frac{1}{\epsilon}, \frac{1}{\epsilon'} \text{ and } \frac{1}{\delta},$$

we obtain the desired result.

We are now ready to offer our approximation algorithm for solving (38), which we refer to as the LP-rounding based approximation algorithm. The LP-rounding based approximation algorithm consists of the following steps.

1. Approximately solve the LP (51) using the Ellipsoid method and the approximate separation oracle
2. Use the oblivious rounding procedure to recover a solution feasible for (41).
3. Iteratively improve the solution while retaining feasibility with respect to (38)

We note that the third step above can be done for instance using the approach used in Algorithms II and III. In the following result we do not assume any such iteration, i.e., the approximation guarantee is obtained after the first two steps itself.
Theorem 4.

The LP-rounding based approximation algorithm yields a solution for (38) whose corresponding value is no less than $$\frac{1}{B}(1-1/e)(1-\epsilon)\hat{V}^{opt}-\delta,$$

where $\hat{V}^{opt}$ denotes the optimal value for (38), and its complexity scales polynomially in each of $$K, |\mathcal{N}|, \frac{1}{\epsilon} \ \& \ \frac{1}{\delta}$$

Proof.

Notice first that the optimal value for the LP in (51), $\hat{V}^{LP}$, is an upper bound to the optimal value of (39) and hence upon invoking Proposition 3 we can conclude that $$\hat{V}^{LP} \geq \frac{\hat{V}^{opt}}{B}.$$

From Proposition 7 and

TABLE 2

Simulation Parameters

| Parameter | Value used for evaluation |
|---|---|
| Network and cell layout | 19 sites, 3 sectors per site, wrap around; heterogeneous network with low power RRHs within the macrocell; uniformly distributed 4 RRHs per macrocell. |
| Carrier frequency | 2 GHz |
| Transmission bandwidth | 10M Hz |
| Channel model | Macrocell: ITU UMA with UE speed 3 km/s; RRH: ITU UMi |
| Antenna configuration | ULA; Macro/RRH nT = 4; UE nR = 2 |
| Traffic model | Full buffer |
| CQI/PMI feedback interval | 5 TTIs |
| Feedback delay | 4 TTIs |
| CSI feedback scheme | per TP PMI/CQI/RI; fallback serving TP CQI/PRI/RI |
| Transmission scheme | DPS/CSCB/SU-MIMO |
| CoMP set threshold | 9 dB |
| UE distribution | configuration 4b with ⅓ macrocell UEs and ⅔ RRH UEs; |
| Number of UEs | 30 UEs per cluster |
| Channel estimation | Ideal at UE; eNB approximates the channel based on UE feedback |

Lemma 1 we can conclude that a solution feasible for (39) and hence (38) can be recovered in polynomial time yielding a value no less than $(1-1/e)(1-\epsilon')\hat{V}^{LP}-\delta'$, which upon setting $\epsilon'=\epsilon$ and $$\delta' = \frac{\delta}{1 - 1/e}$$

then proves the theorem.

4 System Simulations

In this section we conduct a detailed evaluation of our algorithms. Our focus is on the practical gains that are possible by using these scheduling algorithms over real networks.

In the following set of simulations we considered CoMP scenario 4b which is particularly conducive to coordinated scheduling. Here 57 cells are emulated (with wraparound) and in each cell one Macro base station and four remote radio heads are deployed. Each cluster covers a cell and thus comprises of M=5 TPs. 30 users on an average are dropped in each cluster (cell) using a specific distribution. The major simulation assumptions are summarized in Table 2. The simulations were carried out for a full buffer traffic model and the results are obtained over $N_{TTI}$=500 TTIs, where each TTI represents a scheduling interval.

4.1 Channel Feedback

In FDD systems the central scheduler must rely on the feedback from the users in order to obtain estimates or approximations of their respective downlink channels. Since the uplink resources available for such feedback are limited the following low overhead feedback signalling scheme is supported.

A measurement set of TPs, which is any subset of $\{1, \ldots, M\}$, is configured separately for each user based on slowly varying large-scale fading parameters such as path-loss, shadowing etc. Each user only estimates channels from TPs in its measurement set whereas the TPs not in its measurement set together with those outside the cluster are treated as interferers or un-coordinated TPs. The idea is that depending on its location the user may receive useful signal strength (above a configurable threshold) only from a few TPs in the cluster.

For each TP in its measurement set, the user computes the associated per-point channel state information (CSI) as follows. It first estimates the corresponding channel on each subband (which in turn comprises of a set of contiguous RBs) and then "whitens" it. This whitening operation is done via a linear filter obtained using the interference covariance and accounts for the interference the user will see from the un-coordinated TPs.

Each whitened channel matrix is quantized into a set of good directions using a matrix drawn from a precoding codebook and a set of gains. The number of directions (or columns in the matrix) is referred to as the rank and is invariant across all sub-bands. The user then reports the rank, the per-subband selected matrix along with the per-subband gains, which together constitute the per-point CSI for that TP.

In addition, the user also reports a "fallback" CSI which is computed by estimating the channel from the anchor TP and whitening it after considering interference from all other TPs. This fall back CSI is provided to allow simple un-coordinated per-point scheduling. One approach to reduce the feedback, which is investigated here, is to further impose a common rank restriction across all TPs wherein a user first computes its fallback CSI and then computes the other per-point CSI under the restriction that the rank contained in each per-point CSI be identical to that in the fallback CSI.

The size of a sub-band (frequency granularity) and the periodicity (time granularity) of feedback are configurable parameters. We assumed a fairly fine granularity by setting a sub-band size of 5 RBs and a periodicity of 4 ms. The central scheduler collects all the reported feedback and uses it to construct channel approximations. In particular, for each user, for each TP in that user's measurement set and for each subband, the central scheduler collects the corresponding reported gains in a diagonal matrix D and uses the associated precoder matrix, say V, to approximate the channel as $D^{1/2}V^{\dagger}$. Note here that V is semi-unitary ($V^{\dagger}V=I$) so that a symbol transmitted along the $i^{th}$ column of V will see a gain of $d_i$. This channel approximation is used for all RBs in that sub-band. The channels from all TPs not in the user's measurement set are assumed to be zero. One other aspect that needs to be emphasized is the choice of receiver at each user since it has an impact on the gains that can be achieved via CoMP schemes. We first assume a simple receiver at each user wherein the interference covariance is estimated by just measuring the interference power per-receive antenna which is equivalent to restricting the interference covariance estimate to be a diagonal matrix. This receiver is referred to as the MMSE option-1 receiver in the standard and is used as the baseline receiver in all evaluations. Later we will assume a more advanced receiver. In all the following simulations the per-point scheduling scheme is used as the baseline in which the scheduling is done separately for each TP using the fallback CSI and an algorithm that is obtained by specializing Algorithm II to one iteration and a single TP. Further, the aggressive pruning in Algorithms II and III was used for all cases.

4.2 Results and Observations

We send forth our first results in Tables 3 and 4 where we employ the iterative sub-modular algorithm and the iterative format balancing algorithm, respectively, for coordinated scheduling. We note that a serving TP balancing step is also incorporated in Algorithm III when the selected CoMP scheme is CDPS. In each case the relative percentage gains are over the baseline. From Tables 3 and 4 it is seen that CoMP schemes yield a catastrophically poor performance compared to the baseline per-point scheduling. It would seem that inspite of provisioning additional feedback from the users to enable CoMP schemes, the system incurs a loss which is highly undesirable.

Observation 1.

The performance of CoMP schemes is highly sensitive to the quality of feedback received from the users.

Fortunately, another form of feedback is also available in the form of ACK/NACK feedback that is received from each user. This feedback has been successfully used in the traditional single cell scheduling.

TABLE 3

Spectral Efficiency (bps/Hz) of CoMP schemes with iterative submodular algorithm.

| Scheduling scheme | DPS | CDPS | CS/CB | Baseline |
|---|---|---|---|---|
| cell average | 1.9187 (−8.01%) | 1.9238 (−7.77%) | 1.9955 (−4.33%) | 2.0858 (0%) |
| 5% cell-edge | 0.0281 (−36.57%) | 0.0295 (−33.41%) | 0.0292 (−34.09%) | 0.0443 (0%) |
| Actual BLER | 34.97% | 34.81% | 31.98% | 25.78% |
| Empty RB ratio | 8% | 8% | 0% | 0% |

TABLE 4

Spectral Efficiency (bps/Hz) of CoMP schemes with iterative format balancing algorithm.

| Scheduling scheme | DPS | CDPS | CS/CB | Baseline |
|---|---|---|---|---|
| cell average | 1.9202 (−7.94%) | 1.9239 (−7.76%) | 1.9909 (−4.55%) | 2.0858 (0%) |
| 5% cell-edge | 0.0264 (−40.41%) | 0.0280 (−36.79%) | 0.0291 (−34.31%) | 0.0443 (0%) |
| Actual BLER | 34.86% | 34.82% | 32.53% | 25.78% |
| Empty RB ratio | 8% | 8% | 0% | 0% |

We leverage this feedback to refine the channel approximations at the central schedular in the following manner. For each user k and a given transmission hypotheses involving user k, the approximations of all channels seen by user k from TPs in its measurement set are obtained as before. Then, on each subband the channel approximation corresponding to the TP involved in serving data to user k (if any, under the given hypotheses) is scaled by a factor $c_k$ which represents the correction factor associated with user k. This scaling factor is continually updated based on the sequence of ACK/NACKs received from that user. While the update procedure is proprietary, it follows the principle that every ACK increases the factor whereas every NACK decreases it.

We offer our results incorporating ACK/NACK based refinement in Tables 5 and 6.

From Tables 5 and 6 we see that the performance of CoMP schemes has dramatically improved due to the ACK/NACK based refinement and more importantly, CoMP schemes now yield their promised cell-edge gains. Indeed very significant cell edge gains are obtained by all three CoMP schemes with the DPS and CDPS gains being outstanding. Notice that in both the latter schemes the empty (or muted) RB ratio is high which means that these schemes exploit RB silencing (or muting) more aggressively to reduce interference.

Observation 2.

Exploiting ACK/NACK feedback to refine channel approximations pays rich dividends and is necessary to realize CoMP gains.

Henceforth, unless otherwise mentioned, in all the following simulations we exploit the ACK/NACK

TABLE 5

Spectral Efficiency (bps/Hz) of CoMP schemes with iterative submodular algorithm and ACK/NACK refinement.

| Scheduling scheme | DPS | CDPS | CS/CB | Baseline |
|---|---|---|---|---|
| cell average | 2.3981 (−1.30%) | 2.3988 (−1.27%) | 2.4461 (0.67%) | 2.4297 (0%) |
| 5% cell-edge | 0.0976 (21.09%) | 0.0962 (19.35%) | 0.0898 (11.41%) | 0.0806 (0%) |
| Actual BLER | 6.02% | 6.01% | 5.54% | 5.13% |
| Empty RB ratio | 7% | 6% | 0% | 0% |

TABLE 6

Spectral Efficiency (bps/Hz) of CoMP schemes with iterative format balancing algorithm and ACK/NACK refinement.

| Scheduling scheme | DPS | CDPS | CS/CB | Baseline |
|---|---|---|---|---|
| cell average | 2.4006 (−1.20%) | 2.3974 (−1.33%) | 2.4617 (1.32%) | 2.4297 (0%) |
| 5% cell-edge | 0.0962 (19.35%) | 0.0953 (18.24%) | 0.0856 (6.20%) | 0.0806 (0%) |
| Actual BLER | 6.00% | 6.01% | 5.55% | 5.13% |
| Empty RB ratio | 7% | 7% | 0% | 0% | feedback. We now investigate a more expanded feedback scheme wherein the common fallback rank restriction is removed. We remark that by imposing the fallback rank restriction we bias a CoMP UE (i.e., a user with more than one TP in its measurement set) to report per-point CSI with a lower rank. This is because the fallback CSI is computed under the assumption of interference from all non-anchor TPs and hence will choose a lower rank. Put another way, a CoMP user is likely to be a cell-edge user under fallback single-point scheduling and hence will support a lower rank. Clearly, imposing this fallback rank restriction on all per-point CSI will result in disabling higher-rank transmission for a CoMP user, which might potentially lower the rate. However, it also has a key advantage. Note that under rank restriction for each per-point CSI, the user first determines the optimal un-quantized channel approximation of the given rank and then quantizes it. Then, an important fact is that given a fixed quantization load (decided by the codebook size) quantization error is smaller for lower ranks. The net effect of this is that the first few dominant singular vectors (which represent preferred directions) along with the corresponding singular values are more accurately reported by the user at the expense of not reporting the remaining ones at all. In the case without rank restriction the user will typically pick a larger set of singular vectors to quantize. This results in the central scheduler knowing more directions and associated gains, albeit more coarsely.

We provide the results to highlight the impact of rank restriction in Table 7. For brevity we consider two CoMP schemes and the iterative submodular algorithm. From the results we see that fallback rank

TABLE 7

Spectral Efficiency (bps/Hz) of CoMP schemes with iterative submodular algorithm, ACK/NACK refinement, with (RR = 1) and without (RR = 0) rank restriction.

| Scheduling scheme | DPS (RR = 1) | DPS (RR = 0) | CS/CB (RR = 1) | CS/CB (RR = 0) |
|---|---|---|---|---|
| cell average | 2.3981 (1.70%) | 2.3579 | 2.4461 (0.26%) | 2.4397 |
| 5% cell-edge | 0.0976 (2.20%) | 0.0955 | 0.0898 (−0.44%) | 0.0902 |
| Actual BLER | 6.02% | 7.08% | 5.54% | 6.10% |
| Empty RB ratio | 7% | 7% | 0% | 0% |

TABLE 8

Spectral Efficiency (bps/Hz) of CoMP schemes with iterative submodular algorithm, ACK/NACK refinement, rank restriction and MMSE-IRC receiver.

| Scheduling scheme | DPS | CDPS | CS/CB | Baseline |
|---|---|---|---|---|
| cell average | 2.717 (−3.00%) | 2.7148 (−3.08%) | 2.7512 (−1.78%) | 2.8011 (0%) |
| 5% cell-edge | 0.1288 (21.74%) | 0.1271 (20.13%) | 0.1112 (5.10%) | 0.1058 (0%) |
| Actual BLER | 5.28% | 5.30% | 5.12% | 4.78% |
| Empty RB ratio | 9% | 8% | 0% | 0% | restriction results in almost no degradation which suggests that accurately knowing a fewer directions from each CoMP user allows the newtork to better manage interference thereby offsetting the loss due to disabling higher rank transmission to those users.

Observation 3.

Rank restriction is a useful feedback reduction strategy under limited quantization load.

Recall that hitherto we have assumed a simple receiver at each user. We now consider a more advanced receiver at each user in which the interference covariance is estimated without any restrictions. This resulting receiver is referred to as the MMSE-IRC receiver. Our results are reported in Tables 8 and 9 where we note that both ACK/NACK based refinement and rank restriction have been imposed. An interesting observation is that while the performance of all schemes has substantially improved compared to their counterparts in Tables 5 and 6, the relative gains over the baseline per-point scheduling have decreased. This is due to the fact that the scenario favorable for large CoMP gains over per-point scheduling is one where the central scheduler has good network CSI but the user receivers have limited interference rejection capabilities. On the other hand, the worst scenario would be the one where the network CSI at the scheduler is poor but the users have powerful receivers in which case CoMP schemes would be detrimental. The scenario emulated in Tables 8 and 9 is more closer to the latter case since compared to the one in Tables 5 and 6, the total feedback overhead is identical but the receivers are more robust. We thus have the following observation

TABLE 9

Spectral Efficiency (bps/Hz) of CoMP schemes with iterative format balancing algorithm, ACK/NACK refinement, rank restriction and MMSE-IRC receiver

| Scheduling scheme | DPS | CDPS | CS/CB | Baseline |
|---|---|---|---|---|
| cell average | 2.7168 (−3.01%) | 2.7135 (−3.13%) | 2.7656 (−1.27%) | 2.0811 (0%) |
| 5% cell-edge | 0.1289 (21.83%) | 0.1288 (21.74%) | 0.1087 (2.74%) | 0.1058 (0%) |
| Actual BLER | 5.28% | 5.28% | 5.11% | 4.78% |
| Empty RB ratio | 9% | 8% | 0% | 0% |

TABLE 10

Spectral Efficiency (bps/Hz) of CoMP schemes with iterative submodular algorithm, MMSE-IRC receiver, ACK/NACK refinement, with (RR = 1) and without (RR = 0) rank restriction.

| Scheduling scheme | DPS (RR = 1) | DPS (RR = 0) | CS/CB (RR = 1) | CS/CB (RR = 0) |
|---|---|---|---|---|
| cell average | 2.7170 (1.76%) | 2.6700 | 2.7512 (0.67%) | 2.7328 |
| 5% cell-edge | 0.1284 (1.10%) | 0.1274 | 0.1112 (2.87%) | 0.1081 |
| Actual BLER | 5.28% | 6.00% | 5.12% | 5.70% |
| Empty RB ratio | 9% | 9% | 0% | 0% |

Observation 4.

Improving user receivers without commensurate enhancements in CSI feedback leads to smaller CoMP gains.

In Table 10 we simulate a scenario without the ACK/NACK based refinement. The results demonstrate that ACK/NACK based refinement is indeed necessary and thus the observation 2 is true even with more powerful user receivers.

Finally, in Table 11 we retain ACK/NACK based refinement but remove the rank restriction. It is seen that observation 3 holds true even for these robust receivers.

[Algorithm I: Format Balancing Algorithm]

1. Initialize $\mathcal{B}^{(n)} = \phi, \forall n \in \mathcal{N}$
2. FOR each $n \in \mathcal{N}$ DO
3. Solve $$\max_{\mathcal{A} \subseteq \Omega} r(\mathcal{A}, n) \quad (56)$$

4. Denote the obtained solution by $\mathcal{A}^{(n)}$.
5. END FOR
6. FOR each user u DO
7. FOR each format f DO
8. Set R(u, f) = 0
9. FOR each RB n for which $\exists \underline{e} \in \mathcal{A}^{(n)}: u_e = u$ & $f_e \geq f$ DO
10. Set $\mathcal{B} = \mathcal{A}^{(n)} \setminus \underline{e}$ and $\underline{e}' = (u, f, b_e)$
11. Compute $r_{e'}(\mathcal{B} \cup \underline{e}', n)$ and increment R(u, f) = R(u, f) + $r_{e'}(\mathcal{B} \cup \underline{e}', n)$
12. END FOR
13. END FOR
14. Determine $\hat{f} = \arg\max_f \{R(u, f)\}$
15. FOR each RB n for which $\exists \underline{e} \in \mathcal{A}^{(n)}: u_e = u$ & $f_e \geq \hat{f}$ DO -continued

[Algorithm I: Format Balancing Algorithm]

16. Set $\underline{e}' = (u, \hat{f}, b_e)$ and expand $\mathcal{B}^{(n)} = \mathcal{B}^{(n)} \cup \underline{e}'$
17. END FOR
18. Output the final scheduling decisions $\mathcal{B}^{(n)} \forall n \in \mathcal{N}$

[Algorithm II: Iterative Submodular Algorithm]

1. Initialize $\mathcal{B} = \Omega$, $\{\mathcal{A}^{(n)} = \phi\}_{n \in \mathcal{N}}$, done = false and Iter = 1.
2. WHILE (done = false) and (Iter ≤ IterMax)
3. $\mathcal{S} = \phi$, $\mathcal{G} = \mathcal{B}$
4. REPEAT
5. Solve $$\max_{e \in \mathcal{G}: \mathcal{S} \cup e \in \mathcal{I}} g(\mathcal{S} \cup e \mid \{\mathcal{A}^{(n)}\}_{n \in \mathcal{N}}) \quad (57)$$

and let $\hat{e}$, $\hat{v}$ denote the optimal solution and the optimal value.
6. If $\hat{v} > 0$ THEN update $$\mathcal{S} \to \mathcal{S} \cup \hat{e}, \mathcal{G} \to \mathcal{G} \setminus \hat{e}. \quad (58)$$

7. END IF
8. UNTIL $\{e \in \mathcal{G}: \mathcal{S} \cup e \in \mathcal{I}\} = \phi$ or $\hat{v} = 0$
9. IF $\mathcal{S} = \phi$ THEN set done = true
10. ELSE
11. Update Iter → Iter + 1.
12. FOR each $n \in \mathcal{N}$ DO
13. Determine $\hat{e}^{(n)} = \arg\max_{e \in \mathcal{S}} \tilde{r}(e, \mathcal{A}^{(n)}, n)$ and let $\hat{v}^{(n)}$ be the corresponding optimal value.
14. IF $\hat{v}^{(n)} > 0$ THEN
15. Increment $\mathcal{A}^{(n)} = \mathcal{A}^{(n)} \cup \hat{e}^{(n)}$
16. END IF
17. END FOR
18. END IF
19. Prune $\mathcal{B}$ using the obtained set $\mathcal{S}$
20. END WHILE
21. Output $\{\mathcal{A}^{(n)}\}$, $n \in \mathcal{N}$

[Algorithm III: Iterative Format Balancing Algorithm for CS/CB or DPS]

11. FOR each RB n for which $\hat{v}^{(n)} > 0$ & $u_{\hat{e}^{(n)}} = u$ DO
12. Set $e = (u, f, b_{\hat{e}^{(n)}})$
13. IF $e \in \mathcal{B}$ THEN
14. Increment R(u, f) = R(u, f) + $\tilde{r}(e, \mathcal{A}^{(n)}, n)$
15. END IF
16. END FOR
17. END FOR
18. Determine $\hat{f} = \arg\max_{f} \{R(u, f)\}$
19. FOR each RB n for which $\hat{v}^{(n)} > 0$ & $u_{\hat{e}^{(n)}} = u$ DO
20. Set $e' = (u, \hat{f}, b_{\hat{e}^{(n)}})$
21. IF $\tilde{r}(e', \mathcal{A}^{(n)}, n) > 0$ THEN
22. Expand $\mathcal{A}^{(n)} = \mathcal{A}^{(n)} \cup e'$
23. Set done = false.
24. END IF
25. END FOR
26. END FOR
27. Prune $\mathcal{B}$ using the obtained set $\mathcal{S}$
28. END WHILE

TABLE 11

Spectral Efficiency (bps/Hz) of CoMP schemes with iterative submodular algorithm, MMSE-IRC receiver, rank restriction but without ACK/NACK refinement.

| Scheduling scheme | DPS | CDPS | CS/CB | Baseline |
|---|---|---|---|---|
| cell average | 2.3956 (−8.72%) | 2.4026 (−8.45%) | 2.4711 (−5.84%) | 2.6244 (0%) |
| 5% cell-edge | 0.0729 (−23.02%) | 0.0732 (−22.70%) | 0.0754 (−20.38%) | 0.0947 (0%) |
| Actual BLER | 26.13% | 25.92% | 23.59% | 16.76% |
| Empty RB ratio | 9% | 9% | 0% | 0% |

[Algorithm III: Iterative Format Balancing Algorithm for CS/CB or DPS]

1. Initialize $\mathcal{B} = \Omega$, $\{\mathcal{A}^{(n)} = \phi\}_{n \in \mathcal{N}}$, done = false and Iter = 1.
2. WHILE (done = false) and (Iter ≤ IterMax)
3. Set done = true.
4. FOR each $n \in \mathcal{N}$ DO
5. Solve $$\max_{e \in \mathcal{B}} \tilde{r}(e, \mathcal{A}^{(n)}, n) \quad (59)$$

6. Denote the obtained solution by $\hat{e}^{(n)}$ and the value by $\hat{v}^{(n)}$.
7. END FOR
8. FOR each user u DO
9. FOR each format f DO
10. Set R(u, f) = 0

Further System Details B

I. Introduction

In order to accommodate the explosive growth in data traffic network operators are increasingly relying on cell splitting, wherein multiple transmission points (TPs) are placed in a cell traditionally covered by a single macro base station. Each such transmission point can be a high power macro enhanced base-station but is more likely to be a low-power remote radio head of more modest capabilities. The networks formed by such disparate transmission points are referred to as heterogeneous networks (a.k.a. HetNets) and are rightly regarded as the future of all next generation wireless networks. In the HetNet architecture the basic coordination unit is referred to as a cluster which consists of multiple TPs. Coordinated resource allocation within a cluster must be accomplished at a very fine time scale, typically once every millisecond. This in turn implies that all TPs within each cluster must have fiber connectivity and hence the formation of clusters (a.k.a. clustering) is dictated by the available fiber connectivity among TPs. On the other hand, coordination among different clusters is expected to be done on a much slower time-scale. Consequently, each user can be associated with only one cluster and the association of users to clusters needs to be done only once every few seconds.

In this paper our interest is on the dynamic coordination within each cluster. Since user association and clustering happen on time scales which are several orders of magnitude coarser, we assume them to be given and fixed. The design of joint resource allocation within a cluster of multiple TPs has been considered in depth in recent years. These techniques range from assuming global knowledge of user channels states and their respective data at a central processor, thereby converting the cluster into one broadcast channel with global knowledge, to one where only user channel states are shared among TPs in a cluster so that each user can be served by only one TP but downlink transmission parameters (such as beamvectors and precoders) can still be jointly optimized. Our goal in this work is to verify whether the wisdom accrued from all these works about substantial performance gains being possible if interference is managed via coordinated resource allocation is valid over real HetNets. The challenges over realistic networks are threefold, namely, (i) the need for low complexity resource allocation algorithms that can be implemented in very fine time-scales (ii) incomplete/inaccurate channel feedback from the users and (iii) real propagation environments. Clearly, since no such real HetNets have yet been deployed, we have to rely on accurate modeling. Here, to capture the latter two challenges, we rely on the emulation of such networks as specified by the 3GPP LTE standards body which has considered HetNet deployments in a very comprehensive manner. The simplest "baseline" approach then to manage dynamic coordination within a cluster is to associate each user with one TP within the cluster from which it receives the strongest average signal power (referred to as its "anchor" TP), and then perform separate single-point scheduling for each TP with full reuse. While this approach might appear simplistic and deficient with respect to degree of freedom metrics, over realistic networks it captures almost all of the average spectral efficiency gains promised by cell splitting. Indeed, the expectation from more sophisticated joint scheduling schemes in a cluster is mainly to achieve significant gains in the 5 percentile spectral efficiency while retaining the average spectral efficiency gains of the baseline. Towards realizing this expectation, we formulate a joint resource allocation problem and proceed to develop a constant-factor approximation algorithm based on a novel approach that combines submodular welfare maximization and a technique referred to as format balancing. The key aspect is that the formulated resource allocation problem can accommodate important practical constraints and specific choices of transmission parameters. Consequently, the designed algorithm is directly applicable to practically important scenarios and indeed shows promising gains when evaluated under realistic conditions.

II. System Model

We consider the downlink in a HetNet with universal frequency reuse and focus on a cluster of B coordinated TPs which can simultaneously transmit on N orthogonal resource blocks (RBs) during each scheduling interval. Each RB is a bandwidth slice and represents the minimum allocation unit. Together, these B TPs serve a pool of K active users. Each TP as well as each user can be equipped with multiple antennas. We assume a typical HetNet scenario (as defined in the 3GPP LTE Rel. 11) wherein these B TPs are synchronized and can exchange messages over a fiber backhaul. Next, the signal received by a user k on RB n can be written as $$y_k(n) = \sum_{j=1}^{B} H_{k,j}(n) x_j(n) + z_k(n), \quad (1)$$

where $H_{k,j}(n)$ models the MIMO channel between TP j and user k on RB n (which includes small-scale fading, large-scale fading and path attenuation), while $z_k(n)$ is the additive circularly-symmetric Gaussian noise vector and $x_j(n)$ denotes the signal vector transmitted by TP j on the $n^{th}$ RB.[1] Considering the signal transmitted by a TP, we impose the common restriction that each TP is allowed to serve at-most one user on each RB. This restriction provides robustness against imperfect and coarse channel feedback from the users. Then, the signal transmitted by TP q on RB n can then be expressed as $$x_q(n) = W_{q,u}(n) b_{q,u}(n), \quad (2)$$

where $b_{q,u}(n)$ is the complex symbol vector transmitted by TP q on RB n intended for some user u using the precoding matrix $W_{q,u}(n)$ which satisfies a norm (power) constraint. Notice that due to the broadcast nature of the wireless channel, the signal intended for a user transmitted by some TP on an RB is received as interference by all other co-scheduled users on that RB. This factor significantly complicates the scheduling problem since it is no longer meaningful to define a per-user utility that depends on the resources allocated to that user alone.

[1]Notice that the model in (1) holds for the case of orthogonal frequency-division-multiple access (OFDMA) if the maximum signal propagation delay is within the cyclic prefix.

In order to abstract out the details while retaining usefulness, we adopt the notion of a transmission hypothesis. In particular, we define $\underline{e} = (u, f, b)$ as an element, where u: $1 \le u \le K$ denotes a user, $f \in \mathcal{F} = \{1, \ldots, J\}$ denotes a format drawn from a finite set $\mathcal{F}$ of such formats having a cardinality $J = |\mathcal{F}|$ and b: $1 \le b \le B$ denotes a transmission point (TP). Each such element $\underline{e} = (u, f, b)$ represents a transmission hypothesis, i.e., the transmission from TP b using format f intended for user u. Next, we let $\underline{\Omega} = \{\underline{e} = (u, f, b): 1 \le u \le K, f \in \mathcal{F}, 1 \le b \le B\}$ denote the ground set of all possible such elements. For any such element we adopt the convention that $$\underline{e} = (u, f, b) \Rightarrow u_{\underline{e}} = u, f_{\underline{e}} = f, b_{\underline{e}} = b.$$

Then, letting $\mathcal{N} = \{1, \ldots, N\}$ denote the set of RBs, we let r: $2^{\underline{\Omega}} \times \mathcal{N} \to \mathbb{R}_+$ denote the weighted sum rate utility function. For any subset $\underline{A} \subseteq \underline{\Omega}$ and any RB $n \in \mathcal{N}$, $r(\underline{A}, n)$ yields the weighted sum rate obtained upon transmission using the hypotheses in $\underline{A}$ on RB n. The hypotheses in $\underline{A}$ can contain multiple hypothesis, for instance selecting $\underline{A} = \{\underline{e}, \underline{e}'\}$ on an RB n implies that on RB n, TP $b_{\underline{e}}$ will transmit a signal intended for user $u_{\underline{e}}$ using format $f_{\underline{e}}$ and simultaneously TP $b_{\underline{e}'}$ will transmit a signal intended for user $u_{\underline{e}'}$ using format $f_{\underline{e}'}$. The weight associated with each element $\underline{e}$ (or equivalently user $u_{\underline{e}}$) is an input to the scheduler and is in turn updated using the resulting scheduling decision. In order to disallow the possibility of the same TP serving multiple users on the same RB as well as the possibility of the same user receiving data from multiple TPs on the same RB,[2] we adopt the convention that $$\exists \underline{e} \ne \underline{e}' \in \underline{A}: u_{\underline{e}} = u_{\underline{e}'} \text{ or } b_{\underline{e}} = b_{\underline{e}'} \Rightarrow r(\underline{A}, n) = 0. \quad (3)$$

Further, for any $\underline{A} \subseteq \underline{\Omega}$ we can expand $$r(\underline{A}, n) = \sum_{\underline{e} \in \underline{A}} r_{\underline{e}}(\underline{A}, n), \quad (4)$$

where $r_{\underline{e}}(\underline{A}, n)$ is the weighted rate obtained for element $\underline{e}$ or equivalently the user $u_{\underline{e}}$ using the hypotheses in $\underline{A}$ on RB n and where we set $r_{\underline{e}}(\underline{A}, n)=0 \forall \underline{e} \in \underline{A}$ whenever $r(\underline{A}, n)=0$. Notice that upon selecting any hypotheses in $\underline{A}$ on any RB n, we have an interference channel formed by the TPs and users contained in those hypotheses. Then, any pre-determined rule to compute the weighted sum rate can be used. Throughout this paper, we will assume that the weighted sum rate utility function satisfies a natural sub-additivity assumption which says that the rates of elements in a set will not decrease if some elements are expurgated from that set. In particular, for any subset $\underline{A} \subseteq \underline{\Omega}$ and any element $\underline{e} \in \underline{A}$, defining $\underline{C} = \underline{A} \setminus \underline{e}$ we assume that for each $n \in \mathcal{N}$ $$r_{\underline{e}''}(\underline{C}, n) \geq r_{\underline{e}''}(\underline{A}, n), \forall \underline{e}'' \in \underline{C}. \quad (5)$$

[2] This latter restriction is required since enabling reception of data simultaneously from multiple TPs on the same frequency requires additional feedback from the users to allow coherent combining, which is not available.

We assume that any one of the two following coordinated multi-point (CoMP) schemes is selected for each user. We emphasize that the association of a user with a CoMP scheme is pre-determined and fixed.

Coordinated Silencing/Coordinated Beamforming (CS/CB):

A user associated with this scheme can be served data only by its pre-determined "anchor" TP so that no real-time sharing of that user's data among TPs is needed. Thus, for a CS/CB user u, any $\underline{e} \in \underline{\Omega}$ with $u_{\underline{e}} = u$ must satisfy that TP $b_{\underline{e}}$ is the anchor TP of u.

Dynamic Point Selection (DPS):

A user associated with this scheme can be served by any TP on any RB.

Notice that for both the CoMP schemes interference mitigation can be achieved via proper user and format selection. In addition, DPS allows for an increase in received signal strength by exploiting short-term fading via per-RB serving TP selection, where serving TP means the TP that serves data to the user. Then, letting $Q_u, \vartheta_u$ denote the buffer size (in bits) of user u and its scheduling weight[3], respectively, we formulate the optimization $$\max_{\substack{\{X_{\underline{A},n} \in \{0,1\}: \\ \underline{A} \subseteq \underline{\Omega}, n \in N\}}} \sum_{u: u \in \{1, \ldots, K\}} \min\left\{\sum_{\underline{e} \in \underline{\Omega}: u_{\underline{e}} = u} \sum_{\underline{A} \subseteq \underline{\Omega}: \underline{e} \in \underline{A}} \sum_{n \in N} r_{\underline{e}}(\underline{A}, n) X_{\underline{A},n}, \vartheta_u Q_u\right\} \quad (6)$$

$$\sum_{\underline{A} \subseteq \underline{\Omega}} X_{\underline{A},n} \leq 1, \forall n;$$

$$\left(\sum_{n \in N} X_{\underline{A},n}\right)\left(\sum_{n \in N} X_{\underline{B},n}\right) = 0,$$

$$\forall \underline{A}, \underline{B} \subseteq \underline{\Omega}: \exists \underline{e} \in \underline{A}, \underline{e}' \in \underline{B} \& u_{\underline{e}} = u_{\underline{e}'}, f_{\underline{e}} \neq f_{\underline{e}'};$$

problem given by (6). Note that in (6) the objective function incorporates the finite buffer limits, whereas the first constraint ensures that at-most one transmission hypotheses is selected on each RB. The second constraint ensures that each scheduled user is assigned only one format. For a given number of users (K), TPs (B), RBs (N) and formats (J), an instance of (6) is a set of user weights and buffer sizes $\{\vartheta_u, Q_u\}_{u=1}^{K}$ together with the set of all weighted sum rate utility values for all possible hypotheses on all RBs. Before proceeding to design an approximation algorithm for (6), we consider a specific example of a format along with the rule to compute the weighted sum rate. A format can for instance be defined as the number of symbol streams assigned, in which case on any RB and for a given transmission hypotheses, we have an interference channel where the number of streams for each transceiver link is now given. The rule to evaluate the weighted sum rate can then be the one which assumes a Gaussian input alphabet for each transceiver link and a transmit precoding method such as the one based on interference alignment. Notice that the constraint of at-most one format per scheduled user then captures the main constraint in the LTE standard which is that each scheduled user be assigned the same number of streams on all its assigned RBs. Our first result is that (6) is unlikely to be optimally solved by a low (polynomial) complexity algorithm. It follows upon reducing (6) to two special cases and exploiting their known hardness.

[3] Without loss of optimality, we can assume that the user weights are normalized to lie in [0, 1].

Theorem 1.

The optimization problem in (6) is NP hard. Specifically, for any fixed N≥1 & J≥2, in (6) is strongly NP hard. For any fixed B≥1 & J≥1, (6) is APX hard.

Theorem 1 implies that not only is the existence of an efficient optimal algorithm for (6) highly improbable, an exponential complexity with respect to B is the likely price we have to pay in order to obtain a approximation factor independent of B. Here, we adopt an iterative framework to design an approximation algorithm which will make the complexity polynomial in even B but will introduce a penalty of 1/B in the approximation guarantee. Accordingly, we introduce another simpler problem given by (7) The relation between the weighted sum rates obtained using the optimal solutions to (6) and (7) is given by the following result.

$$\max_{\substack{\{X_{\underline{e},n} \in \{0,1\}: \\ \underline{e} \in \underline{\Omega}, n \in N\}}} \sum_{u: u \in \{1, \ldots, K\}} \min\left\{\sum_{\underline{e} \in \underline{\Omega}: u_{\underline{e}} = u} \sum_{n \in N} r(\underline{e}, n) X_{\underline{e},n}, \vartheta_u Q_u\right\} \sum_{\underline{e} \in \underline{\Omega}} X_{\underline{e},n} \leq 1, \quad (7)$$

$$\forall n;$$

$$\left(\sum_{n \in N} X_{\underline{e},n}\right)\left(\sum_{n \in N} X_{\underline{e}',n}\right) = 0,$$

$$\forall \underline{e}, \underline{e}' \subseteq \underline{\Omega}: u_{\underline{e}} = u_{\underline{e}'}, f_{\underline{e}} \neq f_{\underline{e}'};$$

Proposition 1.

The optimal solution to (7) is feasible for (6) and yields a value that is no less than a factor 1/B times that yielded by the optimal solution to (6).

Proof:

We first assume that the CoMP scheme associated with all users is CS/CB. Consider then an optimal solution to (6), say $\{\underline{A}^{(n)}\}_{n \in \mathcal{N}}$, and for that solution let $\mathcal{G}'_b$ denote the set of users served by TP b where b=1, ..., B. Since CS/CB is used for all users, we can deduce that these sets are non overlapping, i.e., $\mathcal{G}'_k \cap \mathcal{G}'_j = \phi, \forall k \neq j$. Further, the overall utility can be expanded as $\Sigma_{b=1}^{B} R_b$, where $R_b$ is the weighted sum of rates of all users in $\mathcal{G}'_b$ wherein the per-user finite buffer constraints are included. Next, consider a TP b and suppose that on each RB $n \in \mathcal{N}$ a genie removes the interference caused to the user being served by TP b from co-scheduled transmissions by other TPs. Invoking the property in (5), we can see the resulting weighted sum rate $\hat{R}_b$ will be at-least as large as $R_b$. However, $\hat{R}_b$ can be achieved by a particular solution to (7) derived from $\{\hat{\underline{A}}^{(n)}\}_{n\in\mathcal{N}}$, wherein only the element containing a user in $\mathcal{G}'_b$ is retained in each $\hat{\underline{A}}^{(n)}$ (notice that there can only be one such element in each $\hat{\underline{A}}^{(n)}$) and the others are expurgated. This implies that the optimal solution to (7) yields a value that is an upper-bound to each $\hat{R}_b$, b=1, . . . , B, which in turn allows us to conclude that the theorem is true. Now consider the general case where DPS is adopted as the CoMP scheme for some users while CS/CB is adopted for the remaining ones. In this case, let us split each DPS user u into B users $u^{(i)}$, i=1, . . . , B with identical weights, channels and queue sizes and with the understanding that the $i^{th}$ such user is a CS/CB user whose anchor is TP i so that it can only be served data by TP i. Let us collect this enlarged pool of $\check{K}$>K users and pose the problem in (6) over this larger pool, wherein all users are CS/CB users and the buffer constraint is imposed separately on each user. Clearly the optimal value of the latter problem is an upper bound on that of the original one with K users. Moreover, upon noticing that each TP can be the anchor of no more than K users from the enlarged pool and invoking the arguments made before, we can assert that the optimal value of (7) is no less than 11B times that of the latter problem, which is the desired result.

For any given set $\underline{A}\subseteq\Omega$, any element $\underline{e}\in\Omega$, any RB n∈ $\mathcal{N}$ and any non-negative scalar Δ together with $$\max_{\substack{X_{\underline{e},n}:X_{\underline{e},n}\in[0,1]\\ n\in\mathcal{R}_u,\underline{e}\in\underline{B}_{u,f}}}\left\{\sum_{\underline{e}\in\underline{B}_{u,f}}\sum_{n\in\mathcal{R}_u}\left(r_{\underline{e}}(\mathcal{A}^{(n)}\cup\underline{e},n)-\sum_{\underline{e}'\in\mathcal{A}^{(n)}}(r_{\underline{e}'}(\mathcal{A}^{(n)},n)-r_{\underline{e}'}(\mathcal{A}^{(n)}\cup\underline{e},n))\psi_{u_{\underline{e}'}}\right)X_{\underline{e},n}\right\} \quad (8)$$

s.t. $\sum_{\underline{e}\in\underline{B}_{u,f}}\sum_{n\in\mathcal{R}_u}r_{\underline{e}}(\mathcal{A}^{(n)}\cup\underline{e},n)X_{\underline{e},n}\leq\Delta_u$; $\sum_{\underline{e}\in\underline{B}_{u,f}}X_{\underline{e},n}\leq 1\forall n\in\mathcal{R}_u$.

scalars $\psi_u\in[0,1]\forall u\in\{1,\ldots,K\}$, we define $\tilde{g}(\underline{e},\underline{A},n,\Delta)=\min\{\Delta,r_{\underline{e}}(\underline{A}\cup\underline{e},n)\}-\sum_{\underline{e}'\in\underline{A}}(r_{\underline{e}'}(\underline{A},n)-r_{\underline{e}'}(\underline{A}\cup\underline{e},n))\psi_{u_{\underline{e}'}}$ We note here that $\tilde{g}(\underline{e},\underline{A},n,\Delta)$ represents the overall incremental weighted rate gain (or loss) that is obtained by scheduling element $\underline{e}$ on RB n given that elements in $\underline{A}$ are already scheduled on that RB. Further, in defining this incremental rate we use Δ as a weighted rate margin, i.e., the weighted rate gain obtained for user $u_{\underline{e}}$ cannot exceed Δ. The purpose of this margin is to enforce the buffer constraint on user $u_{\underline{e}}$ with the understanding that user $u_{\underline{e}}$ has already obtained a weighted rate of $\vartheta_u Q_u-\Delta$ as a result of being scheduled on other RBs. Also, the scalars $\psi_u\in[0,1]\forall u$ are discount factors which again are used to incorporate buffer constraints. For instance, the term $r_{\underline{e}}(\underline{A},n)-r_{\underline{e}}(\underline{A}\cup\underline{e},n)$ represents the loss in weighted rate of user $u_{\underline{e}'}$ due to the increased interference arising from scheduling an additional element $\underline{e}$. However, this loss is the maximum possible loss which occurs only when the buffer constraint for $u_{\underline{e}'}$ is inactive. If the buffer constraint for that user is active (as a result of all RBs that have been assigned to $u_{\underline{e}'}$) we discount the loss by a factor $\psi_{u_{\underline{e}'}}$. We now proceed to offer Algorithm I to approximately solve (6). Note that this Algorithm adopts an iterative framework. Notice that in each outer iteration of the algorithm (comprising of all steps within the outer Repeat-Until loop), decisions made in the previous iterations are kept fixed. New assignments of RBs, serving TPs and formats to users are made by first using a simple greedy approach (comprising of all steps within the inner While-Do loop) while ignoring the at-most one format per-user constraint. Then, a balancing step is done with respect to the formats of a user to ensure that the user is scheduled with only one format. The obtained result ensures an improvement in system utility while maintaining feasibility. The format balancing routine in Step 16 of Algorithm I for a user u: $\mathcal{R}_u\neq\phi$ is implemented as follows. For a given subset $\underline{B}\subseteq\Omega$ and $\{\underline{A}^{(n)}\}$, we consider each format f∈$\mathcal{F}$ and solve the problem in (8), where $\underline{B}_{u,f}=\{\underline{e}\in\underline{B}:u_{\underline{e}}=u\,\&\,f_{\underline{e}}=f\}$. Notice that (8) is a multiple choice knapsack problem and hence can be solved for instance via dynamic programming or using efficient approximation algorithms.

Next, let $\hat{f}$ denote the format whose associated solution results in the highest objective function value for (8). Let $S_u\subseteq\mathcal{R}_u$ denote the set of RBs that are assigned in the solution associated with $\hat{f}$ and let $\hat{\underline{e}}^{(n)}$, n∈$S_u$ be the corresponding elements. Then, we further check if there exists an $\hat{n}\in\mathcal{R}_u\setminus S_u$ and element $\hat{\underline{e}}\in\underline{B}_{u,\hat{f}}$ such that $r_{\underline{e}}(\underline{A}^{(\hat{n})}\cup\hat{\underline{e}},\hat{n})\geq\Delta_u-\Sigma_{n\in S_u}r_{\underline{e}^{(n)}}(\underline{A}^{(n)}\cup\underline{e}^{(n)},n)$ and $\Delta_u-\Sigma_{n\in S_u}r_{\underline{e}^{(n)}}(\underline{A}^{(n)}\cup\hat{\underline{e}}^{(n)},n)>\Sigma_{\underline{e}'\in\underline{A}^{(\hat{n})}}(r_{\underline{e}'}(\underline{A}^{(\hat{n})},\hat{n})-r_{\underline{e}'}(\underline{A}^{(\hat{n})}\cup\hat{\underline{e}},\hat{n}))\psi_{u_{\underline{e}'}}$. In case, these two conditions are not met, we return $\{\hat{\underline{e}}^{(n)}\}_{n\in S_u}$ as the format balanced solution. Otherwise, we add $\hat{n}$ to $S_u$ and set $\hat{\underline{e}}^{(\hat{n})}=\hat{\underline{e}}$ before returning $\{\hat{\underline{e}}^{(n)}\}_{n\in S_u}$ as the format balanced solution. Finally, the pruning step, given a selected subset $\underline{S}$, is done as follows.

$$\underline{B}=\begin{cases}\underline{B}\setminus\{\underline{e}\in\Omega:\exists\,\underline{e}'\in\underline{S},u_{\underline{e}}=u_{\underline{e}'}\}, & \text{If aggressive}\\ \underline{B}\setminus\{\underline{e}\in\Omega:\exists\,\underline{e}'\in\underline{S},u_{\underline{e}}=u_{\underline{e}'}\,\&\,f_{\underline{e}}\neq f_{\underline{e}'}\}, & \text{Otherwise}\end{cases}$$

Notice that the aggressive pruning option subsumes the other option. The performance guarantee derived below holds for both pruning options. We note that the complexity per-iteration of Algorithm I is $O(KJBN^2)$.

We now proceed to derive the approximation guarantee for Algorithm I. Towards this end, specializing the utility to the single user case we assume the following mild inequalities to hold:

$$r(\underline{e}',n)\geq G_{f_{\underline{e}},f_{\underline{e}}}r(\underline{e},n),\forall\underline{e},\underline{e}'\in\Omega:u_{\underline{e}'}=u_{\underline{e}}\,\&\,b_{\underline{e}'}=b_{\underline{e}}, \quad (9)$$

for some constants $G_{i,j}\in[0,1]$, $1\leq i,j\leq J$ with $G_{i,i}=1$, $\forall i$. We then define the matrix $G=[G_{i,j}]\in\mathbb{R}_+^{J\times J}$. Notice that since we can always set $G_{i,j}=0$, (9) itself results in no loss of generality. However $G_{i,j}>0$ would mean that changing the format from j to i guarantees a weighted rate greater than a fraction $G_{i,j}$ times the original weighted rate for all users, on all RBs and in all instances. We note that for the format example presented before $$G_{i,j}=\frac{\min\{i,j\}}{\max\{i,j\}},$$

$\forall i,j$.

Theorem 2.

Algorithm I offers a solution to (6) that has a worst-case guarantee of at-least $$\frac{\Gamma}{2B},$$

i.e., the weighted sum rate value obtained using the solution yielded by it is no less than $$\frac{\Gamma}{2B}$$

times that obtained using the optimal solution of (6). Further, $\Gamma$ satisfies $$\Gamma \geq \frac{1}{J}$$

and can be determined via the following LP for any arbitrarily fixed S>0

$$\Gamma = \min_{x \in IR_+^J, \theta \in IR_+} \{\theta\} \qquad (10)$$

$$\text{s.t. } 1^T x = S; \sum_{j=1}^{J} G_{i,j} x_j \leq \theta S, \forall i.$$

Also, when $G^{-1} 1 \succeq 0$ we have $$\Gamma = \frac{1}{1^T G^{-1} 1}.$$

Proof:
Denote the optimal value of (7) by $v^{opt}$. We will consider the first outer iteration of Algorithm I (initialized with $\mathcal{A}^{(n)} = \phi \forall n$ and $\mathcal{B} = \Omega$) and show that the system weighted sum rate value obtained after the first iteration itself is at-least a factor $\Gamma/2$ times $v^{opt}$. This along with the fact that each iteration of Algorithm I results in an improvement in system utility, together with Proposition I proves the theorem.

Then, let us define a function h': $\{1, \ldots, K\} \times 2^{\mathcal{N}} \to IR_+$ as $$h'(u, \mathcal{R}) = \min\left\{\vartheta_u Q_u, \sum_{n \in \mathcal{R}} \max_{e \in \Omega: u_e = u} r(e, n)\right\}, \qquad (11)$$

where $u \in \{1, \ldots, K\}$ and $\mathcal{R} \subseteq \mathcal{N}$. Our first observation is that for any user u, the set function h'(u, :) is a monotonic sub-modular set function, i.e., for any $\mathcal{R} \subseteq S \subseteq \mathcal{N}$ and any $n \in \mathcal{N}$, we have that $0 \leq h'(u, \mathcal{R}) \leq h'(u, S)$ and $$h'(u, \mathcal{R} \cup \{n\}) - h'(u, \mathcal{R}) \geq h'(u, S \cup \{n\}) - h'(u, S).$$

Next, consider the following problem, $$\max_{\substack{\tilde{X}_{u,\mathcal{R}} \in \{0,1\}: \\ u \in \{1,\ldots,K\}, \mathcal{R} \subseteq \mathcal{N}}} \sum_{u \in \{1,\ldots,K\}} \sum_{\mathcal{R} \subseteq \mathcal{N}} h'(u, \mathcal{R}) \tilde{X}_{u,\mathcal{R}} \qquad (12)$$

$$\sum_{\mathcal{R}: n \in \mathcal{R}} \sum_u \tilde{X}_{u,\mathcal{R}} \leq 1, \forall n \in \mathcal{N}$$

$$\sum_{\mathcal{R}} \tilde{X}_{u,\mathcal{R}} \leq 1, \forall u \in \{1, \ldots, K\}.$$

The problem in (12) is a combinatorial auction problem (a.k.a. welfare maximization problem) with monotonic sub-modular per-user utilities or valuations. Notice that since the per-user format constraint is dropped in (12), its optimal value is an upper bound on $v^{opt}$. More importantly, any combinatorial auction problem with monotonic submodular valuations can be approximately solved (with ½ approximation) via a greedy algorithm. Indeed, the inner While-Do loop implements such a greedy routine as a consequence of which after Step 14 we have that $\mathcal{R}_u \cap \mathcal{R}_{u'} = \phi \forall u \neq u'$ and $$\sum_{u=1}^{K} h'(u, \mathcal{R}_u) \geq v^{opt}/2. \qquad (13)$$

Now, let us consider the format balancing routine for a user u: $\mathcal{R}_u \neq \phi$. For such a user u and for each format f let us define $$\tilde{R}(u, f) = \sum_{n \in \mathcal{R}_u: \exists e^{(n)} = \mathcal{A}^{(n)} \& f_e(n) = f} r(e^{(n)}, n), \qquad (14)$$

with the understanding that $\tilde{R}(u, f) = 0$ if such an element cannot be found on any RB $n \in \mathcal{R}$. Note then that the weighted rate obtained for user u (after step 14 of Algorithm I) is equal to $\min\{\vartheta_u Q_u, \Sigma_{f=1}^{J} \tilde{R}(u, f)\}$ and indeed is equal to h'(u, $\mathcal{R}_u$). Then, upon selecting $\hat{f}$ as per the format balancing method described above and invoking the inequality in (9), we can ensure that user u gets a rate at-least $$\max_{\hat{f}: 1 \leq \hat{f} \leq J} \min\left\{\vartheta_u Q_u, \sum_{f'=1}^{J} G_{f, f'} \tilde{R}(u, f')\right\}. \qquad (15)$$

In addition, since users are assigned non-overlapping RBs, we can conclude that the worst-case approximation guarantee of the format balancing routine for the given instance is at-least $$\min_u \frac{\max_{f: 1 \leq f \leq J} \min\left\{\vartheta_u Q_u, \sum_{f'=1}^{J} G_{f, f'} \tilde{R}(u, f')\right\}}{\min\left\{\vartheta_u Q_u, \sum_{f=1}^{J} \tilde{R}(u, f)\right\}}$$

where the outer minimization is over all users u: $\mathcal{R} \neq \phi$. Then, the worst-case approximation guarantee over all instances can be lower bounded by $\Gamma$, which is the solution to the problem $$\min_{x \in IR_+^J} \frac{\max_{f: 1 \leq f \leq J} \min\left\{\vartheta_u Q_u, \sum_{f'=1}^{J} G_{f, f'} x_{f'}\right\}}{\min\left\{\vartheta_u Q_u, \sum_{f=1}^{J} x_f\right\}} \qquad (16)$$

Clearly, since $G \in [0, 1]1^{J \times J}$ & $G_{f,f} = 1$, $\forall f$ we see that the minimal value in (16) can be no less than 1/J. The remaining parts of the theorem follow upon invoking Proposition 2 proved in Appendix A.

In Tables I and II we provide evaluation results for Algorithm I, where the evaluations were done on a fully calibrated system simulator which emulates a HetNet (scenario 4b). In particular, a HetNet with 19 cell-sites (with wraparound) and 3 sectors per cell-site is emulated, where each sector represents a cluster comprising of 5 TPs one Macro base-station and 4 low power radio heads each with 4 transmit antennas. Each sector serves an average of 10 users (each with 2 receive antennas) and a full buffer model is assumed. In Table I we assume that each user employs a simple receiver without inter-cell interference (ICI) rejection capabilities, whereas in Table II a more robust MMSE-IRC receiver is employed. In each case we suppose that all users are either DPS users or that all users are CS/CB users. Also, the feedback obtained from each user was further refilled using the ACK/NACK feedback and we hasten to add that only the feedback provisioned has been employed. From the tables, where the percentage gains are over the baseline single point scheduling, we see

---

[Algorithm I: Iterative Algorithm for CS/CB or DPS: Finite Buffers]

1) Initialize $\mathcal{B} = \Omega$, $\{\mathcal{A}^{(n)} = \phi\}_{n \in \mathcal{N}}$, $\{\psi_u = 1, \Delta_u = Q_u\}$ $\forall$ u and Iter = 0.
2) REPEAT
3) Set $\mathcal{S} = \mathcal{N}$, Iter = Iter + 1, done = false and $\mathcal{R}_u = \phi$, $\Theta_u = \Delta_u$ $\forall$ u.
4) WHILE (done = false) DO
5) Determine $$\max_{e \in \mathcal{B}, n \in \mathcal{S}} \{\tilde{g}(e, \mathcal{A}^{(n)}, n, \Theta_{u_e})\} \quad (17)$$

and let $\hat{v}$, $\hat{n}$ and $\hat{e}$ denote the optimal value and the corresponding RB and element, respectively.

6) IF $\hat{v} > 0$ THEN
7) Update $\mathcal{R}_{u_{\hat{e}}} \to \mathcal{R}_{u_{\hat{e}}} \bigcup \hat{n}$, $\mathcal{S} \to \mathcal{S} \setminus \hat{n}$ and $\Theta_{u_{\hat{e}}} = \left(\Theta_{u_{\hat{e}}} - r_{\hat{e}}(\mathcal{A}^{(\hat{n})} \cup \hat{e}, \hat{n})\right)^+$ 8) ELSE
9) done = true
10) END IF
11) IF $\mathcal{S} = \phi$ THEN
12) done = true
13) END IF
14) END WHILE
15) FOR each user u: $\mathcal{R}_u \neq \phi$ DO
16) Determine assigned RB set $\mathcal{S}_u$ and corresponding elements $\hat{e}^{(n)}$, $n \in \mathcal{S}_u$ using the format balancing routine
17) Update $\mathcal{A}^{(n)} \to \mathcal{A}^{(n)} \cup \hat{e}^{(n)}$, $\forall n \in \mathcal{S}_u$
18) END FOR
19) FOR each user u DO
20) Update $\Delta_u = \left(\vartheta_u Q_u - \sum_{n \in \mathcal{N}} \sum_{e \in \mathcal{A}^{(n)}: u_e = u} r_e(\mathcal{A}^{(n)}, n)\right)^+$ and $\psi_u = \dfrac{\min\left\{\vartheta_u Q_u, \sum_{n \in \mathcal{N}} \sum_{e \in \mathcal{A}^{(n)}: u_e = u} r_e(\mathcal{A}^{(n)}, n)\right\}}{\sum_{n \in \mathcal{N}} \sum_{e \in \mathcal{A}^{(n)}: u_e = u} r_e(\mathcal{A}^{(n)}, n)}$ 21) END FOR
22) Prune $\mathcal{B}$ using the set $\bigcup_{n \in \mathcal{N}} \mathcal{A}^{(n)}$
23) UNTIL $\mathcal{S} = \mathcal{N}$ or Iter = IterMax
24) Output $\{\mathcal{A}^{(n)}\}$, $n \in \mathcal{N}$

--- that significant gains in the 5% spectral efficiency (SE) can be obtained via joint scheduling. This in turn would ensure improved user experience irrespective of its location, while retaining most of the cell-splitting average SE gains that have been captured by the baseline. Also, the gains are better when simpler receivers are used since then network aided coordinated transmission is more needed to manage ICI.

III. Conclusions

We considered resource allocation in HetNets. Our detailed analysis and system evaluations show that by exploiting all the available feedback in a certain manner and by using a well-designed algorithm, significant gains can indeed be realized over realistic HetNets.

APPENDIX

A. Appendix: Proposition 2 and Proof

Proposition 2.

For any matrix $G \in [0, 1]^{J \times J}$, where $J \geq 1$ is a fixed positive integer, and any $\Delta > 0$, the solution to $$\min_{x \in \mathbb{R}_+^J} \dfrac{\min\left\{\Delta, \max_{i:1 \leq i \leq J} \sum_{j=1}^{J} G_{i,j} x_j\right\}}{\min\left\{\Delta, \sum_{j=1}^{J} x_j\right\}} \quad (18)$$

can be found by solving the following linear program for any constant $S > 0$, $$\min_{x \in \mathbb{R}_+^J, \theta \in \mathbb{R}_+} \{\theta\} \quad (19)$$

s.t. $1^T x = S$ $\sum_{j=1}^{J} G_{i,j} x_j \leq \theta S, \forall i$ .

Furthermore, in the special case of $G^{-1} \mathbf{1} \succeq 0$, the solution to (18) can be obtained in closed form as $$\dfrac{1}{1^T G^{-1} \mathbf{1}}.$$

Proof:

Denote the optimal value of (18) by $\hat{A}$. Then, using any constant $0 < S \leq \Delta$, it can be upper bounded as $$\hat{A} \leq \min_{x \in \mathbb{R}_+^J: 1^T x = S} \left\{\dfrac{1}{S} \max_{i:1 \leq i \leq J} \sum_{j=1}^{J} G_{i,j} x_j\right\} \quad (20)$$

Furthermore, we see that $$\hat{A} \geq \min_{x \in \mathbb{R}_+^J} \dfrac{\max_{i:1 \leq i \leq J} \sum_{j=1}^{J} G_{i,j} x_j}{\sum_{j=1}^{J} x_j} \quad (21)$$

Now, suppose $\hat{x}$ is an optimal solution to the RHS of (21) with $\max_{i:1\leq i\leq J}\sum_{j=1}^{J}G_{i,j}\hat{x}_j=\hat{\alpha}$ and $1^T\hat{x}=\hat{S}$ so that $$\frac{\hat{\alpha}}{\hat{S}}$$

is the optimal value for the RHS of (21). Then, consider the convex minimization problem in the RHS of (20) for any constant S>0. Clearly $\tilde{x}=\gamma\hat{x}$, where $$\gamma = \frac{S}{\hat{S}},$$

is feasible for the RHS of (20) and yields a value $$\frac{\hat{\alpha}}{\hat{S}}.$$

This implies that the optimal value of the RHS of (20) is no greater than $$\frac{\hat{\alpha}}{\hat{S}}.$$

However, an optimal value of the RHS of (20) which is strictly less than $$\frac{\hat{\alpha}}{\hat{S}}$$

would result in a contradiction since it would imply that the optimal value of the RHS of (21) is also strictly less than $$\frac{\hat{\alpha}}{\hat{S}}.$$

Consequently, for arbitrarily fixed S<0 the optimal value of the RHS of (20) is identical to that of the RHS of (21) which implies that this value is identical to Â. Then, (20) can be re-formulated as in (19). Clearly since the constraints and objective in (19) are affine, it is a convex optimization problem which implies that any solution to the K.K.T conditions is also globally optimal. Next, the K.K.T conditions for (19) are given by $$1^T x = S; x \in IR_+^J; \theta S \geq \sum_{j=1}^{J} G_{i,j}x_j \forall i \quad (22)$$

$$\beta^T 1 = \frac{1}{S}; \beta^T G = \lambda^T + \delta 1^T; \beta \in IR_+^J; \lambda \in IR_+^J$$

$$\lambda \odot x = 0; \beta \odot (Gx - \theta S1) = 0; \delta \in IR,$$

TABLE I

SPECTRAL EFFICIENCY (BPS/HZ) WITH SIMPLE RECEIVER.

| Scheduling scheme | DPS | CS/CB | Baseline |
|---|---|---|---|
| cell average | 2.4006 (−1.20%) | 2.4617 (1.32%) | 2.4297 |
| 5% cell-edge | 0.0962 (19.35%) | 0.0856 (6.20%) | 0.0806 |

TABLE II

SPECTRAL EFFICIENCY (BPS/HZ) WITH MMSE-IRC RECEIVER.

| Scheduling scheme | DPS | CS/CB | Baseline |
|---|---|---|---|
| cell average | 2.7168 (−3.01%) | 2.7656 (−1.27%) | 2.8811 |
| 5% cell-edge | 0.1289 (21.83%) | 0.1087 (2.74%) | 0.1058 | where $\odot$ denotes the Hadamard product. Next, suppose that $G^{-1}1 \succeq 0$. Then, consider a particular choice $$x = (\theta S)G^{-1}1; \theta = \frac{1}{1^T G^{-1}1} \quad (23)$$

$$\delta = \frac{1}{S1^T G^{-1}1}; \lambda = 0; \beta^T = \delta 1^T G^{-1}.$$

It can be verified that the choice in (23) satisfies all the K.K.T. conditions in (22) and hence must yield a global optima for (19) and thus the optimal value for (18). This optimal value can be verified to be $$\frac{1}{1^T G^{-1}1}.$$

Further System Details C
1 Introduction
It has been agreed that three CoMP schemes, namely, joint transmission (JT), coordinated scheduling and beamforming (CS/CB), and dynamic point selection (DPS), will be supported in Rel-11 [6]. In CoMP CS/CB, the data will be transmitted through the transmission point (TP) of the serving cell, same as the case in conventional single cell (without CoMP) systems. Therefore, there is no issue on the PDSCH mapping for CoMP CS/CB. However, in CoMP JT and DPS, the TP or TPs other than that of the serving cell might be involved in the data transmission. In this case some problems arise due to different signalling structures on Physical Downlink Shared Channel (PDSCH) resource element (RE) mapping, e.g., the CRS/PDSCH collision due to different frequency shifts for the CRS RE positions corresponding to different TPs, and the PDSCH start point due to different sizes of the PDCCH regions for different TPs. These issues have been realized and discussed in the CoMP study item stage itself, and have been included in the CoMP WI [6][7].
In RAN1#69, the way to solve the PDSCH RE mapping issues in CoMP has been discussed and additional downlink control signalling might be needed to solve these issues. The following has been agreed in RAN1#69 meeting:
  Provide signalling to indicate the CRS position of at least one cell from which PDSCH transmission may occur
    Signalling identifies at least the frequency shift
    FFS for number of CRS antenna ports
    FFS for MBSFN subframes
  If the signalling is transmitted, PDSCH follows the Rel-10 rate-matching around the indicated CRS of a single cell; otherwise, the UE assumes the CRS positions of the serving cell FFS until RAN1#70 whether the signalling can also indicate up to 3 cells around whose combined CRS patterns the PDSCH is rate-matched.

Several alternatives have been introduced in [8] on the DL control signal for CoMP PDSCH mapping, either semi-statically or dynamically. We provide some detailed signal designs for different alternatives and discussions on these schemes.

2 PDSCH Mapping Operations in CoMP 2.1 PDSCH Mapping Issues in CoMP

In CoMP JT and DPS transmissions, since the transmission points other than the serving cell are involved in the actual data transmissions, the UE does not have the knowledge of the exact PDSCH RE mapping unless a certain assumption or additional DL control signal is specified. The PDSCH mapping for CoMP JT and DPS has the following issues.

The CRS/PDSCH collision or the CRS positions of the transmission points for PDSCH transmissions.

The starting point (OFDM symbol) of the PDSCH due to different sizes of PDCCH regions.

The information of MBSFN subframes.

The details of these issues have been discussed and several alternative solutions have been provided in [8]. We further discuss the PDSCH RE mapping solutions and their necessary DL control signalling.

2.2 PDSCH RE Mapping Solutions in CoMP

The default PDSCH mapping approach for CoMP JT and DPS is that the PDSCH mapping always aligns with the mapping of the serving cell including the PDSCH start point and the assumption on the CRS RE positions. This default approach does not need to introduce additional DL signalling, and thus has minimum standard impact. However, due to mismatched PDCCH regions and CRS/PDSCH collisions, some RE resources can be wasted or experience strong interference from CRS signals of other cells. Thus such default approach can incur large CoMP performance degradation on the spectral efficiency.

Some potential solutions to solve the CRS/PDSCH collision issue in CoMP are summarized in [4], e.g. not using any OFDM symbols that contain CRS REs or only using MBSFN subframe for CoMP JT or DPS transmissions where there is no CRS, as also suggested in [9]. However, these approaches are either not spectrally efficient or are restricted to some specific settings. It is argued in [9] that the approach of using the MBSFN is still spectral efficient in the sense that the CoMP is primarily useful in the high load case. However, it is known that CoMP JT provides larger gains on the cell edge when the system load is low. Some companies also suggested that eNB aligns the CRS positions for the TPs in the CoMP coordinate set by configuring the same CRS frequency shift. However, this approach, if it is implementable at eNB, increases the eNB complexity significantly. On the other hand, it does not solve the issue if the two TPs have different number of CRS ports.

Several alternatives have been provided in [8] to solve the PDSCH mapping issues. The first approach to address the CRS/PDSCH collision issue is based on PDSCH muting, i.e., not transmitting the data symbol on the REs that are collided with the CRS REs from other TPs. The PDSCH mapping information with PDSCH RE muting may then be signalled to the CoMP UE. If we send exact PDSCH mapping to the CoMP UE dynamically, the PDSCH RE muting may not be needed for the CoMP DPS. However, dynamically transmitting the exact PDSCH mapping requires a large signalling overhead. Therefore, the PDSCH muting based on the CoMP measurement set seems a promising alternative solution if the dynamic signalling cannot be accommodated. Here all the PDSCH REs that collide with the CRS REs from any other TP with the corresponding CSI-RS resource in the CoMP measurement set are muted for data transmission. Since the measurement set is semi-statically configured, the PDSCH mapping with muting can be signalled to the UE semi-statically. Also it has been agreed that the maximum size of CoMP measurement size is 3. Thus, PDSCH muting based on the measurement set will not degrade the spectral efficiency performance much.

Alternative 1:

For CoMP JT or DPS, the network semi-statically informs the CoMP UE the union of the CRS RE patterns for the TPs or CSI-RS resources in the CoMP measurement set of the UE, which are excluded from the data transmissions in PDSCH to that UE.

To signal the CoMP UE the union of the CRS RE patterns, we can semi-statically signal the frequency shift, v, and number of port of CRS, p, for M TPs in the measurement set, i.e., $(v_m, p_m), m=1, \ldots, M$. The information of MBSFN subframes from each TP in the measurement set can also be signalled to the CoMP UE semi-statically.

To also accommodate the CoMP CS/CB transmissions which the PDSCH mapping is configured according to that for the serving cell, we then use one additional bit along with the signals of the CRS RE patterns to the UE to indicate that the PDSCH RE mapping is according to the serving cell or around all CRS positions in the measurement set, as shown in Table 1. Note that the union of the CRS REs is the union of the existed CRS RE in that subframe. If the MBSFN subframe configurations are signalled to the CoMP UE, the union of CRS REs do not include the CRS RE pattern for the TP if it is on its MBSFN subframe.

TABLE 1

CoMP PDSCH RE mapping indication for alternative 1.

| CoMP PDSCH Mapping Indicator | CoMP PDSCH RE Mapping |
| --- | --- |
| 0 | Align to the serving cell (TP-1) |
| 1 | RE mapping on a subframe excluding the union of CRS REs of TPs in the measurement set on that subframe. |

A question might be raised whether this semi-static approach is better than the default approach. In the default approach, eNB configures PDSCH RE mapping for any transmitting TP as that for the serving cell. In DPS, when a TP other than the serving TP in the measurement set is transmitting, the PDSCH on the CRS positions for this TP will not be used for data transmission. Since the UE assumes the serving cell PDSCH mapping, it would still try to decode the data on these CRS positions which actually do not carry any data information, which are called dirty data/bits. A simple simulation is performed to evaluate the performance of these scenarios. A length-576 information bits is encoded using the LTE turbo code with rate-½. We assume there are total 5% coded bits affected by CRS/PDSCH collisions. We compare the performance of this rate-½ codes in AWGN channel with puncturing 5% coded bits (PDSCH muting), 5% dirty received data (purely noise), and 2.5% puncturing plus 2.5% dirty data. The results are shown in FIG. 9. We can see with 5% dirty bits, there is significant performance degradation. Even with half of dirty bits on the collided RE positions, there is still an observable performance loss compared to RE muting.

To improve the performance gain over the default approach, we may consider the following semi-static approach.

Alternative 2:

For CoMP JT or DPS, the network semi-statically informs a CoMP UE the CRS information for each TP in the CoMP measurement set of that UE, and the PDSCH mapping that the network will follow to serve that UE.

In this approach, we can first semi-statically signal the UE the frequency shift of the CRS and number of CRS ports for each TP in the measurement set as that in Alternative 1. Again the CRS information is tagged with the TP index. We then signal the UE an indicator for the TP index which the eNB will configure the PDSCH mapping according to. Since there are at most 3 CRS-RS resources in a CoMP measurement set, a two-bit indicator is enough to carry the information. We can also include the option of the PDSCH mapping around of all the CRS REs in a subframe as shown in Table 2. This approach is particularly useful when the cell range expansion is applied to some UEs in the HetNet scenario, in which the network may always configure the macro cell eNB for the DL data transmission.

TABLE 2

CoMP PDSCH RE mapping indication for alternative 2.

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping align to TP-3 in the measurement set |
| 11 | RE mapping excluding the union of CRS REs in the measurement set in a subframe. |

Note that instead of the CRS frequency shift and the number of CRS ports, we may signal the UE the list of cell IDs of the TP in the measurement set and the associated number of CRS ports. If the cell IDs in the measurement set are signalled to the CoMP UE, the interference cancellation can be implemented since the UE is able to decode all the CRS signals in its CoMP measurement set. Also note that with the discussions for FeICIC, it has been agreed that the list of the strong CRS interference will be signalled to the UE so that UE may perform the interference cancellation. Since most probably, the TPs other than the serving TP in the measurement set are included in this list, it is then possible to reuse this list for the CoMP PDSCH mapping to reduce the signal overhead.

The network can also semi-statically inform the UE the PDSCH start point. However for DPS, if there is a mismatch between the PDSCH start points for the TPs in the CoMP measurement set, it will cause spectral efficiency loss. We now consider the following hybrid approach to convey the PDSCH mapping information dynamically.

Alternative 3:

For CoMP JT or DPS, the network semi-statically informs a CoMP UE the CRS information and PDSCH start point for each TP in the CoMP measurement set of that UE in some order. The network then informs the UE dynamically the PDSCH start point and CRS pattern that the PDSCH mapping will follow by conveying the indices corresponding to them.

With this approach, the network first semi-statically signals the UE the CRS information for each TP in the measurement set as in Alternative 1 or Alternative 2, as well as the PDSCH starting point for each TP if PDCCH region changes semi-statically. Then the network dynamically signal the index of the TP that the PDSCH mapping follows including the starting point. Such dynamic signal can be specified in DCI with introducing an additional signal field. The signal is similar to that in Table 2 except that the index for the muting on the union of CRS REs is not necessary. If the PDSCH start points are configured dynamically on each TP in the measurement set. It may be better also dynamically signal the PDSCH start point.

For CoMP JT, more than one TP will be involved in the transmission. For this case, in the hybrid approach with dynamical signalling available, instead of mapping avoiding the CRS positions for all TPs in the cell, we propose the PDSCH RE mapping sequentially occupying all CRS REs, just that on the collided CRS REs, single TP or the subset of TPs (for 3TP JT) might be assigned for the signal transmissions if they are not scheduled all on MBSFN subframe. We then have the following alternative scheme.

Alternative 4:

For CoMP JT or DPS, the network semi-statically informs a CoMP UE the CRS information for each TP in the CoMP measurement set of that UE in some order. The network then informs the UE dynamically the CRS pattern that the PDSCH mapping will follow by conveying the indices corresponding to them or indicating the UE the PDSCH mapping occupying all the CRS RE positions (assuming no CRS).

The dynamic signal for mapping indicator is then given in Table 3. When the PDSCH mapping indicator is set to be 11, the PDSCH starting point can be set with assuming the minimum or maximum size of PDCCH regions (or PDCCH OFDM symbols) of the TPs in the measurement set, which are semi-statically informed to the UE.

TABLE 3

CoMP PDSCH RE mapping indication for alternative 3, 4.

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping align to TP-3 in the measurement set |
| 11 (Alt-4) | PDSCH RE mapping by occupying all CRS REs in the measurement set (assuming no CRS). |

Note that the first three cases (00, 01, 10) in Table 3 can also be applied to the JT with the corresponding indicated TP in non-MBSFN subframe and other TPs in their MBSFN subframe, which can also be indicated with 11. No CRS JT is done in MBSFN case or it might be possible to realize sometimes using eNB compensation for partial JT. For the last case (11) in Table 3, i.e., assuming no CRS, JT can be done in MBSFN case. But it might be possible to realize sometimes using eNB compensation for partial JT, i.e., transmission over single TP or the subset of TPs (for 3TP JT). Also the PDSCH RE mapping assuming no CRS can be included in as a pattern with number of CRS port being 0.

The UE may estimate the channel with the precoded demodulation reference signal (DMRS), then use such estimated channel to demodulate/detect the data symbol for all data symbols in the resource block or the resource group. If we transmit the data symbol on a subset of TPs, with the same precodings as that for the normal JT using all configured JT TPs, there would be channel mismatch which may degrad demodulation performance. To perform partial JT on some REs with and make the UE see the similar combined channel for demodulation as the normal JT on other REs, we may consider to use different precoding on the subset of TPs in the partial JT. We now consider a case of the partial JT for a configured 2TP JT. The precoding for the transmission on the single TP on the collided RE can be obtained as follows. Assume $U_1$ and $U_2$ are two precoding matrices employed on 2 TPs in the JT. The received signal seen at the UE can be written as $$y = H_1 U_1 x + H_2 U_2 x + n.$$

For partial JT with data being transmitted on 1-TP, without loss of generality, assuming TP-2, we have $$\tilde{y} = H_2 U x + n$$

To ensure that the UE sees the same combined channel, we then let $$U = H_2^{-1} H_1 U_1 + U_2,$$

where $H_2^{-1}$ denotes the right inverse of $H_2$, i.e., $H_2^{-1} = H_2^H (H_2 H_2^H)^{-1}$. Denote the $$D_i^{\frac{1}{2}} = \text{diag}\left(\sqrt{\gamma_{i1}}, \ldots, \sqrt{\gamma_{ir}}\right)$$

where $\gamma_{ij}$ as the SINR feedback (e.g. in a quantized form CQI) for the i-th TP(CSI-RS resource) and the j-th layer, accompanied with the preferred precoding $G_i$ of rank r. We assume common rank on 2 TPs for the JT. The network can approximate the channel as $$\tilde{H}_i = D_i^{\frac{1}{2}} G_i^H.$$

We then have $(H_2 H_2^H)^{-1} \approx D_2^{-1}$, and then $$U = U_2 + G_2 D_2^{-\frac{1}{2}} D_1^{\frac{1}{2}} G_1^H U_1. \tag{1}$$

The above precoding scheme can be easily extended to the general case, i.e., the partial JT using a subset of TPs, say m TPs for the normal JT with $M_{JT}$ TPs, m<$M_{JT}$.

The normalized U can then be employed as the precoding matrix for TP-2. Since U is normalized/scaled, the eNB can decide if this scaling result in an acceptable performance or not.

To semi-statically signal the CRS pattern for each TP in the UE measurement set using the number of CRS ports and its frequency shift (instead of cell ID), the 4-bit indices for CRS patterns are summarized in Table 4. With this setting, the MSB $b_3$ of the CRS pattern index defines if the number of CRS port M=1 ($b_3$=0) or M>1 ($b_3$=1). If $b_3$=0, the rest three bits ($b_2 b_1 b_0$) indicate the frequency shift. If $b_3$=1, the $2^{nd}$ MSB $b_2$ is used to differentiate M=2 ($b_2$=0) or M=4 ($b_2$=1), then the rest two bits ($b_1 b_0$) indicate the frequency shift (binary representation). We can see that with the indexing in Table 4, we always have several bits in the index (3 bits for 1 CRS port, 2 bits for 2 or 4 CRS ports) explicitly mapped to the frequency shift of CRS. If the case of no CRS (number of CRS port=0) is also needed to be semi-statically signalled as one of CRS patterns, we can use one of the reserved index, e.g., $b_3 b_2 b_1 b_0$=1111, to convey this information.

TABLE 4

CRS pattern indexes.

| CRS pattern index ($b_3 b_2 b_1 b_0$) | Number of CRS ports | Frequency shift of CRS |
|---|---|---|
| 0000 | 1 | 0 |
| 0001 | 1 | 1 |
| 0010 | 1 | 2 |
| 0011 | 1 | 3 |
| 0100 | 1 | 4 |
| 0101 | 1 | 5 |
| 0110 | Reserved | Reserved |
| 0111 | Reserved | Reserved |
| 1000 | 2 | 0 |
| 1001 | 2 | 1 |
| 1010 | 2 | 2 |
| 1011 | Reserved | Reserved |
| 1100 | 4 | 0 |
| 1101 | 4 | 1 |
| 1110 | 4 | 2 |
| 1111 | Reserved | Reserved |

Based on above discussions, for the semi-static approaches, Alternative-2 seems better as one additional bit signal overhead is not critical for the semi-static signalling. Therefore for the semi-static approach, we propose Proposal 1:

For PDSCH mapping in CoMP, the network semi-statically informs a CoMP UE the CRS information of each TP in its CoMP measurement set, and either an indicator of the PDSCH mapping of the TP from the CoMP measurement set that the network will follow to serve that UE or the PDSCH mapping which excludes the union of the CRS REs of all the TPs in the CoMP measurement set.

If some dynamic signalling (e.g. 2 bits in DCI) can be introduced to handle PDSCH mapping issues, Alternative-4 is preferable. Therefore, we propose the following for the hybrid approach with dynamic signalling given in Table 3. Proposal 2:

For PDSCH mapping in CoMP, the network semi-statically informs a CoMP UE the CRS information of each TP in its CoMP measurement set. The network then informs the UE dynamically the CRS pattern that the PDSCH mapping will follow by conveying an index identifying it or by indicating to the UE that the PDSCH mapping will occupy all the CRS RE positions.

The presented precoding scheme in (1) can be an efficient implementation for partial JT if we transmit some data symbols from a subset of JT TPs on some REs in a JT CoMP transmission.

3 Conclusion

In this document, the PDSCH mapping issues for CoMP JT and DPS have been discussed. We consider the following two alternatives (one with semi-static signaling only and one with dynamic signaling) for the PDSCH mapping in CoMP:
Proposal 1:

For PDSCH mapping in CoMP, the network semi-statically informs a CoMP UE the CRS information of each TP in its CoMP measurement set, and either an indicator of the PDSCH mapping of the TP from the CoMP measurement set that the network will follow to serve that UE or the PDSCH mapping which excludes the union of the CRS REs of all the TPs in the CoMP measurement set.
Proposal 2:

For PDSCH mapping in CoMP, the network semi-statically informs a CoMP UE the CRS information of each TP in its CoMP measurement set. The network then informs the UE dynamically the CRS pattern that the PDSCH mapping will follow by conveying an index identifying it or by indicating to the UE that the PDSCH mapping will occupy all the CRS RE positions.

The presented precoding scheme in (1) can be an efficient implementation for partial JT if we transmit some data symbols from a subset of JT TPs on some REs in a JT CoMP transmission. And also the proposed the CRS pattern indexing in Table 4 has an advantage that have several bits in the index (3 bits for 1 CRS port, 2 bits for 2 or 4 CRS ports) explicitly mapped to the frequency shift of CRS.

Further System Details D

1 Introduction

It has been agreed that three CoMP schemes, namely, joint transmission (JT), coordinated scheduling and beamforming (CS/CB), and dynamic point selection (DPS), will be supported in Rel-11[6]. In CoMP CS/CB, the data will be transmitted through the transmission point (TP) of the serving cell, same as the case in conventional single cell (without CoMP) systems. Therefore, there is no issue on the PDSCH mapping for CoMP CS/CB. However, in CoMP JT and DPS, the TP or TPs other than that of the serving cell might be involved in the data transmission. In this case some problems arise due to different signalling structures on PDSCH RE mapping, e.g., the CRS/PDSCH collision due to different frequency shifts for the CRS RE positions corresponding to different TPs, and the PDSCH start point due to different sizes of the PDCCH regions for different TPs. These issues have been realized and discussed in the CoMP study item stage itself, and have been included in the CoMP WI [6][7].

In RAN1#69, the way to solve the PDSCH RE mapping issues in CoMP has been discussed and additional downlink control signalling might be needed to solve these issues. The following has been agreed in RAN1#69 meeting:

Provide signalling to indicate the CRS position of at least onecell from which PDSCH transmission may occur
Signalling identifies at least the frequency shift
FFS for number of CRS antenna ports
FFS for MBSFN subframes
If the signalling is transmitted, PDSCH follows the Rel-10 rate-matching around the indicated CRS of a single cell; otherwise, the UE assumes the CRS positions of the serving cell
FFS until RAN1#70 whether the signalling can also indicate up to 3 cells around whose combined CRS patterns the PDSCH is rate-matched.

We further discuss the candidate approaches and provide some detailed signal designs.

2 Discussions 2.1 PDSCH Mapping Issues in CoMP

In CoMP JT and DPS transmissions, since the transmission points other than the serving cell are involved in the actual data transmissions, the UE does not have the knowledge of the exact PDSCH RE mapping unless a certain assumption or additional DL control signal is specified. The PDSCH mapping for CoMP JT and DPS has the following issues.

The CRS/PDSCH collision or the CRS positions of the transmission points for PDSCH transmissions.
The starting point (OFDM symbol) of the PDSCH due to different sizes of PDCCH regions.
The information of MBSFN subframes.

2.2 PDSCH RE Mapping Solutions in CoMP

Before discussing the above dynamic signalling alternatives, we first recap the possible semi-static approaches. If dynamic approaches do not provide significant performance gain with additional signal overhead, the semi-static approaches can be a tradeoff solution. For semi-static approach, we consider the PDSCH muting over the CRS collided REs, i.e., all the PDSCH REs that collide with the CRS REs from any other TP with the corresponding CSI-RS resource in the CoMP measurement set are muted for data transmission. Since the measurement set is semi-statically configured, the PDSCH mapping with muting can be signalled to the UE semi-statically. Also it has been agreed that the maximum size of CoMP measurement size is 3. Thus, PDSCH muting based on the measurement set will not degrade the spectral efficiency performance much.

Alternative 1:

For CoMP JT or DPS, the network semi-statically informs the CoMP UE the union of the CRS RE patterns for the TPs or CSI-RS resources in the CoMP measurement set of the UE, which are excluded from the data transmissions in PDSCH to that UE.

To signal the CoMP UE the union of the CRS RE patterns, we can semi-statically signal the frequency shift, v, and number of port of CRS, p, for M TPs in the measurement set, i.e., $(v_m, p_m)$, m=1, ..., M. The information of MBSFN subframes from each TP in the measurement set can also be signalled to the CoMP UE semi-statically.

To also accommodate the CoMP CS/CB transmissions which the PDSCH mapping is configured according to that for the serving cell, we then use one additional bit along with the signals of the CRS RE patterns to the UE to indicate that the PDSCH RE mapping is according to the serving cell or around all CRS positions in the measurement set, as shown in Table 1. Note that the union of the CRS REs is the union of the existed CRS RE in that subframe. If the MBSFN subframe configurations are signalled to the CoMP UE, the union of CRS REs do not include the CRS RE pattern for the TP if it is on its MBSFN subframe.

TABLE 1

CoMP PDSCH RE mapping indication for alternative 1.

| CoMP PDSCH Mapping Indicator | CoMP PDSCH RE Mapping |
| --- | --- |
| 0 | Align to the serving cell (TP-1) |
| 1 | RE mapping on a subframe excluding the union of CRS REs of TPs in the measurement set on that subframe. |

To improve the performance gain over the default approach, we may consider the following semi-static approach.

Alternative 2:

For CoMP JT or DPS, the network semi-statically informs a CoMP UE the CRS information for each TP in the CoMP measurement set of that UE, and the PDSCH mapping that the network will follow to serve that UE.

In this approach, we can first semi-statically signal the UE the frequency shift of the CRS and number of CRS ports for each TP in the measurement set as that in Alternative 1. Again the CRS information is tagged with the TP index. We then signal the UE an indicator for the TP index which the eNB will configure the PDSCH mapping according to. Since there are at most 3 CRS-RS resources in a CoMP measurement set, a two-bit indicator is enough to carry the information. We can also include the option of the PDSCH mapping around of all the CRS REs in a subframe as shown in Table 2. This approach is particularly useful when the cell range expansion is applied to some UEs in the HetNet scenario, in which the network may always configure the macro cell eNB for the DL data transmission.

TABLE 2

CoMP PDSCH RE mapping indication for alternative 2.

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping align to TP-3 in the measurement set |
| 11 | RE mapping excluding the union of CRS REs in the measurement set in a subframe. |

Note that instead of the CRS frequency shift and the number of CRS ports, we may signal the UE the list of cell IDs of the TP in the measurement set and the associated number of CRS ports. If the cell IDs in the measurement set are signalled to the CoMP UE, the interference cancellation can be implemented since the UE is able to decode all the CRS signals in its CoMP measurement set. Also note that with the discussions for FeICIC, it has been agreed that the list of the strong CRS interference will be signalled to the UE so that UE may perform the interference cancellation. Since most probably, the TPs other than the serving TP in the measurement set are included in this list, it is then possible to reuse this list for the CoMP PDSCH mapping to reduce the signal overhead.

The network can also semi-statically inform the UE the PDSCH start point. However for DPS, if there is a mismatch between the PDSCH start points for the TPs in the CoMP measurement set, it will cause spectral efficiency loss.

In the above semi-static approach, for the fourth state, the data is not transmitted on the union of CRS REs in the measurement set. If more indication bits can be assigned, we can include more combinations in term of union of CRS REs in the CoMP measurement set. For example, with the 3-bit indication, i.e., 8 states, the union of CRS REs for any combination of TPs in the measurement set (with maximum size 3) can be accommodated. The PDSCH RE mapping is then followed by excluding the union of CRS RE pattern which is conveyed to the UE by the 3-bit indicator.

This semi-static approach can be further extended to the general case when the information of strong interfering CRS outside the CoMP cluster is available to UE as a feature of FeICIC. We know that some UEs are located on the boundary of the CoMP cluster. Thus the strong interference to those UEs may come from some TPs outside CoMP cluster, while the TPs in a UE's CoMP measurement set may not have comparable interference strength. Although based on the interfering CRS list, the UE can perform interference cancellation to remove the CRS interference to improve the decoding performance, additional complexity is incurred to the UE for including such feature. To reduce the UE complexity, one solution is not to transmit the data over the RE that is interfered by the TP even outside the CoMPs. Then UE does not need to do the interference cancellation or have such feature. Thus the PDSCH mapping can avoid the union of CRS REs include TPs outside CoMPs. Thus the union of CRS REs can be any combination of CRS RE patterns on the list including both TPs in the CoMP measurement set or outside the CoMP measurement set and/or CoMP cluster.

Now we discuss the hybrid approaches with dynamic signalling of PDSCH mapping information.

The Alt-2 as aforementioned uses a 1-bit to indicate 2 states of PDSCH mapping information which can only accommodate two CRS patterns. As the maximum size of the CoMP measurement set for a UE is 3, 1-bit is not enough to convey the CRS pattern and MBSFN subframe information. Although with a high probability, the size of CoMP measurement set is 3, the cases of CoMP measurement set size being one cannot be neglected. Therefore, we prefer the 2-bit dynamic signalling.

We first present the following approach
Alternative 3:

For CoMP JT or DPS, the network semi-statically informs a CoMP UE the CRS information and PDSCH start point for each TP in the CoMP measurement set of that UE in some order. The network then informs the UE dynamically the PDSCH start point and CRS pattern that the PDSCH mapping will follow by conveying the indices corresponding to them.

With this approach, the network first semi-statically signals the UE the CRS information for each TP in the measurement set as in Alternative 1 or Alternative 2, as well as the PDSCH starting point for each TP if PDCCH region changes semi-statically. Then the network dynamically signal the index of the TP that the PDSCH mapping follows possibly including the starting point. Such dynamic signal can be specified in DCI with an additional signal field. The 2-bit dynamic signal is similar to that in Table 2 except that the state for the muting on the union of CRS REs is not necessary. If the PDSCH start points are configured dynamically on each TP in the measurement set. For this approach, the MBSFN subframe configurations are also semi-statically informed to the UE and associated to one TP or one CSI-RS resources. Also, the 2-bit DCI can also indicate the quasi co-location assumption which is along the indicated TP or CSI-RS resource.

TABLE 3

CoMP PDSCH RE mapping indication for alternative 3.

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping align to TP-3 in the measurement set |
| 11 | Reserved. |

Note that the three states (00, 01, 10) in Table 3 can also be applied to the JT with the corresponding indicated TP in non-MBSFN subframe and other TPs in their MBSFN subframe. We can use the $4^{th}$ state to represent no CRS (or equivalently CRS antenna port 0) to indicate JT CoMP on MBSFN for all TPs. With this approach, the semi-static signalling of MBSFN subframe configuration may not be necessary because for any transmission on MBSFN, we can use state-11 for such indication. However, one issue for using state-11 to signal the PDSCH mapping on MBSFN subframe without semi-static information of MBSFN configuration is that it does not support quasi-co-location indication with the 2-bit DCI.

Now the question is that if the MBSFN subframe configuration is semi-statically conveyed, whether state-11 indicating PDSCH mapping assuming no CRS is necessary or not. We think it is still useful. For instance, if JT is scheduled on two or three TPs and all on MBSFN subframe, without state-11, one state of the first three states has to be signalled to the UE, meaning that the UE has to assume the quasi-co-location along some TP. Similarly for frequency selective DPS where the signal may be transmitted along different TPs on the same subframe but on different frequency resources blocks. However, for CoMP JT or frequency selective DPS, it is possible that such partial quasi-co-location indication along one TP may degrade the system performance. Therefore, we propose to use one state, e.g., state-11 in the 2-bit DCI to indicate PDSCH RE mapping assuming no CRS and no quasi-co-location assumption.

Alternative 4:

For PDSCH mapping in CoMP, the network semi-statically informs a CoMP UE the attributes including CRS information and possibly quasi-co-location information of each TP in its CoMP measurement set. The network then informs the UE dynamically the CRS pattern and other attributes by conveying an index identifying them or it indicates to the UE that the PDSCH mapping will occupy all the CRS RE positions (assuming no CRS, e.g. MBSFN subframe) and that no quasi-co-location assumption must be made.

The dynamic signal for mapping indicator is then given in Table 4. The PDSCH starting point and other attributes such as CRS information and quasi-co-location, etc., can be semi-statically associated to the entries of the table.

TABLE 4

CoMP PDSCH RE mapping indication for alternative 4.

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping align to TP-3 in the measurement set |
| 11 | PDSCH RE mapping assuming no CRS (e.g. MBSFN) and no quasi-co-location assumption. |

To semi-statically signal the CRS pattern for each TP in the UE measurement set using the number of CRS ports and its frequency shift (instead of cell ID), the 4-bit indices for CRS patterns are summarized in Table 4. With this setting, the MSB $b_3$ of the CRS pattern index defines if the number of CRS port M=1 ($b_3$=0) or M>1 ($b_3$=1). If $b_3$=0, the rest three bits ($b_2 b_1 b_0$) indicate the frequency shift. If $b_3$=1, the $2^{nd}$ MSB $b_2$ is used to differentiate M=2 ($b_2$=0) or M=4 ($b_2$=1), then the rest two bits ($b_1 b_0$) indicate the frequency shift. If the case no CRS (number of CRS port=0) is also needed to be signalled, we can use one of the reserved index, e.g., $b_3 b_2 b_1 b_0$=1111, to convey this information.

TABLE 5

CRS patterns.

| CRS pattern index ($b_3 b_2 b_1 b_0$) | Number of CRS ports | Frequency shift of CRS |
|---|---|---|
| 0000 | 1 | 0 |
| 0001 | 1 | 1 |
| 0010 | 1 | 2 |
| 0011 | 1 | 3 |
| 0100 | 1 | 4 |
| 0101 | 1 | 5 |
| 0110 | Reserved | Reserved |
| 0111 | Reserved | Reserved |
| 1000 | 2 | 0 |
| 1001 | 2 | 1 |
| 1010 | 2 | 2 |
| 1011 | Reserved | Reserved |
| 1100 | 4 | 0 |
| 1101 | 4 | 1 |
| 1110 | 4 | 2 |
| 1111 | Reserved | Reserved |

One important observation is that using a common table as in Table 4 for all CoMP users, while simplifying system design, is not the best use of signalling resources.

For example, consider a user with a CoMP measurement set size of 2. Then, for such a user, using Table 4 would not be the optimal choice since the entry corresponding to 10 would never be used.

Therefore, one alternative is to design a different table using 1 bit which covers all users with a CoMP measurement set size of 2. Since the CoMP measurement set of a user only changes semi-statically, the choice of the table being used needs to be configured along with the CoMP measurement set only semi-statically.

The other alternative is to have a common size of 2 bits but to make the interpretation of the mapping indication (i.e., the entries in the table) to be dependent on the CoMP measurement set size. This way more information can be conveyed for a user with CoMP measurement set size 2 than what is possible with Table 4.

An example of this approach is the following Table 4b. Here the entry 10 conveys to the user (with CoMP measurement set size 2) that PDSCH mapping for it is done assuming no CRS and also that the user should assume quasi co-location of TP-1. This is beneficial if MBSFN information of TP-1 has not been semi-statically configured for the user. Then, when the user is scheduled to be served data by TP-1 in its MBSFN subframe, the user can be informed using entry 10 so that the user knows that PDSCH mapping for it is done assuming no CRS and it can use the parameters estimated during CSI-RS estimation for TP-1 to initialize its DMRS based estimator and hence achieve improved performance. A similar fact holds for entry 11 with respect to TP-2

TABLE 4b

CoMP PDSCH RE mapping indication

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping by occupying all CRS REs in the measurement set and Quasi Co-location of TP-1 |
| 11 | PDSCH mapping by occupying all CRS REs in the measurement set and Quasi Co-location of TP-2 |

Extending this idea, suppose that the MBSFN information of TP-1 has been semi-statically configured for the user but not that of TP-2. Then the network could employ the following Table 4c TABLE 4c CoMP PDSCH RE mapping indication

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping by occupying all CRS REs in the measurement set and not using any Quasi Co-location |

TABLE 4c-continued

CoMP PDSCH RE mapping indication

| CoMP PDSCH Mapping Indicator | CoMP PDSCH RE Mapping |
|---|---|
| 11 | PDSCH mapping by occupying all CRS REs in the measurement set and Quasi Co-location of TP-2 |

Here, whenever 00 is indicated the user knows that PDSCH mapping for it is done assuming CRS of TP-1 except on the MBSFN of TP-1 when no CRS is assumed. The user now already has the ability to determine whether a frame is MBSFN for TP-1 or not. Consequently the use of entry 10 as in Table 4b is redundant. Thus, in Table 4c we use the entry 10 to inform the user that PDSCH mapping for it is done assuming no CRS and also to not use any quasi co-location information. This covers some cases where the user is served by two TPs (such as in the case of joint transmission (JT) or frequency selective DPS) that have disparate quasi co-location related parameters and where it is not suitable to indicate the partial quasi-co location information of one TP to a user.

Next, suppose that the MBSFN information of both TP-1 and TP-2 have been semi-statically configured. Here an example of Table design could be table 4d TABLE 4d CoMP PDSCH RE mapping indication

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping align to TP-2 in the measurement set |
| 10 | PDSCH mapping by occupying all CRS REs in the measurement set and not using any Quasi Co-location |
| 11 | PDSCH mapping align to the serving cell (TP-1 in the measurement set) and not using any Quasi Co-location |

Here, we use entry 11 to cover the case where the CRS positions of both the TPs are identical (as in the scenario with same cell ID and with identical number of ports for both TPs) and the user is served by both TPs having disparate quasi co-location related parameters and it is not suitable to indicate the partial quasi-co location information to the user.

In a similar vein a user with CoMP set size 1 can be served using the legacy format. Alternatively, it can be served using the DCI with 2 or 1 bit dynamic indication field but where the entries in the corresponding tables are re-interpreted according to rules for CoMP measurement set size 1.

For instance, in this case since the data serving TP is always fixed, with its CRS positions and MBSFN information already known to the user, the entries could be used to indicate PDSCH mapping assuming exclusion of the union of the CRS of the serving TP and the CRS of a strong interferer. Here, the assumption is that a list of interferers and some of their attributes (such as CRS positions etc) are known via some semi-static configuration mechanism between the network and the user. Consider the following table.

TABLE 4e

CoMP PDSCH RE mapping indication

| CoMP PDSCH Mapping Indicator | CoMP PDSCH RE Mapping |
|---|---|
| 00 | PDSCH mapping align to the serving cell (TP-1 in the measurement set) |
| 01 | PDSCH mapping assuming excluding union of TP-1 and $1^{st}$ strongest interferer |
| 10 | PDSCH mapping assuming excluding union of TP-1 and $1^{st}$ and $2^{nd}$ strongest interferers |
| 11 | PDSCH mapping assuming excluding union of TP-1 and $1^{st}$, $2^{nd}$ and $3^{rd}$ strongest interferers |

In Table 4e the entry 01 for example conveys to the user to assume PDSCH mapping excluding the RE positions covered by the union of CRS positions of TP-1 and the $1^{st}$ strongest interferer. This way the user which cannot perform CRS interference cancellation due to complexity or due to inability to accurately estimate parameters needed for such cancellation, might be benefited since it will not try to decode data in positions with strong interference.

Note that the indicator in Table 4e can be reduced to convey only the first two states if 1-bit indicator is adopted.

Finally, for each CoMP measurement set size, a codebook of tables can be defined. Then, the choice of table from that codebook of tables that the network will use can be configured in a semi-static and user specific manner.

What is claimed is:

1. A communications method implemented in a transmission point (TP) used in a coordinated multipoint transmission and reception (CoMP) system, the communications method comprising:
    transmitting, to a user equipment (UE), attributes for up to four indicators indicating at least physical downlink shared channel (PDSCH) resource element (RE) mapping; and
    transmitting, to the UE, one of the four indicators, each of which is conveyed in 2 bits,
    wherein the four indicators comprises '00', '01', '10', and '11' corresponding to a first set, a second set, a third set, and a fourth set of parameters, respectively,
    wherein the attributes include cell-specific reference signal (CRS) information, quasi-co-location information, and a PDSCH start point,
    wherein the attributions are transmitted semi-statically and the indication is transmitted dynamically, and
    wherein the indicator is conveyed in a downlink control information (DCI) format.

2. The communications method as in claim 1,
    wherein indicators '00', '01', and '10' are in accordance with PDSCH RE mapping of a first transmission point (TP-1), a second transmission point (TP-2), and a third transmission point (TP-3) in a measurement set.

3. The communications method as in claim 2, wherein a serving cell includes the first transmission point.

4. The communications method as in claim 1, wherein the transmission point comprises a macro-cell base station (BS) or a low power remote radio head (RRH).

5. A communications method implemented in a user equipment (UE) used in a coordinated multipoint transmission and reception (CoMP) system, the communications method comprising:
    receiving, from a transmission point (TP), attributes for up to four indicators indicating at least physical downlink shared channel (PDSCH) resource element (RE) mapping; and receiving, from the TP, one of the four indicators, each of which is conveyed in 2 bits, wherein the four indicators comprises '00', '01', '10', and '11' corresponding to a first set, a second set, a third set, and a fourth set of parameters, respectively, wherein the attributes include cell-specific reference signal (CRS) information, quasi-co-location information, and a PDSCH start point, wherein the attributions are transmitted semi-statically and the indication is transmitted dynamically, and wherein the indicator is conveyed in a downlink control information (DCI) format.

6. The communications method as in claim 5,
wherein indicators '00', '01', and '10' are in accordance with PDSCH RE mapping of a first transmission point (TP-1), a second transmission point (TP-2), and a third transmission point (TP-3) in a measurement set.

7. The communications method as in claim 6, wherein a serving cell includes the first transmission point.

8. The communications method as in claim 5, wherein the transmission point comprises a macro-cell base station (BS) or a low power remote radio head (RRH).

9. A communications method implemented in a coordinated multipoint transmission and reception (CoMP) system, the communications method comprising:

transmitting, from a transmission point (TP) to a user equipment (UE), attributes s for up to four indicators indicating at least physical downlink shared channel (PDSCH) resource element (RE) mapping; and transmitting, from the TP to the UE, one of the four indicators, each of which is conveyed in 2 bits, wherein the four indicators comprises '00', '01', '10', and '11' corresponding to a first set, a second set, a third set, and a fourth set of parameters, respectively, wherein the attributes include cell-specific reference signal (CRS) information, quasi-co-location information, and a PDSCH start point, wherein the attributions are transmitted semi-statically and the indication is transmitted dynamically, and wherein the indicator is conveyed in downlink control information (DCI) format.

10. The communications method as in claim 9,
wherein indicators '00', '01', and '10' are in accordance with PDSCH RE mapping of a first transmission point (TP-1), a second transmission point (TP-2), and a third transmission point (TP-3) in a measurement set.

11. The communications method as in claim 10, wherein a serving cell includes the first transmission point.

12. The communications method as in claim 9, wherein the transmission point comprises a macro-cell base station (BS) or a low power remote radio head (RRH).

13. A transmission point (TP) used in a coordinated multipoint transmission and reception (CoMP) system, the transmission point comprising:

a first transmitter to traansmit, to a user equipment (UE), attributes for up to four indicators indicating at least physical downlink shared channel (PDSCH) resource element (RE) mapping; and a second transmitter to transmit, to the UE, one of the four indicators, each of which is conveyed in 2 bits, wherein the four indicators comprises '00', '01', '10', and '11' corresponding to a first set, a second set, a third set, and a fourth set of parameters, respectively, wherein the attributes include cell-specific reference signal (CRS) information, quasi-co-location information, and a PDSCH start point, wherein the attributions are transmitted semi-statically and the indication is transmitted dynamically, and wherein the indicator is conveyed in downlink control information (DCI) format.

14. A user equipment (UE) used in a coordinated multipoint transmission and reception (CoMP) system, the user equipment comprising:

a first receiver to receive, from a transmission point (TP), attributes for up to four indicators indicating at least physical downlink shared channel (PDSCH) resource element (RE) mapping; and a second receiver to receive, from the TP, one of the four indicators, each of which is conveyed in 2 bits, wherein the four indicators comprises '00', '01', '10', and '11' corresponding to a first set, a second set, a third set, and a fourth set of parameters, respectively, wherein the attributes include cell-specific reference signal (CRS) information, quasi-co-location information, and a PDSCH start point, wherein the attributions are transmitted semi-statically and the indication is transmitted dynamically, and wherein the indicator is conveyed in downlink control information (DCI) format.

15. A coordinated multipoint transmission and reception (CoMP) system comprising:

a user equipment (UE); and a transmission point (TP) to transmit, to a user equipment (UE), attributer; attributes for up to four indicators indicating at least physical downlink shared channel (PDSCH) resource element (RE) mapping, wherein the UE receives, from the TP, one of the four indicators, each of which is conveyed in 2 bits, and wherein the four indicators comprises '00', '01', '10', and '11' corresponding to a first set, a second set, a third set, and a fourth set of parameters, respectively, wherein the attributes include cell-specific reference signal (CRS) information, quasi-co-location information, and a PDSCH start point, wherein the attributions are transmitted semi-statically and the indication is transmitted dynamically, and wherein the indicator is conveyed in downlink control information (DCI) format.

* * * * *